(12) United States Patent
Ben-Shmuel

(10) Patent No.: US 8,653,482 B2
(45) Date of Patent: Feb. 18, 2014

(54) RF CONTROLLED FREEZING

(75) Inventor: Eran Ben-Shmuel, Ganei Tikva (IL)

(73) Assignee: Goji Limited, Hamilton (BM)

( * ) Notice: Subject to any disclaimer, the term of this patent is extended or adjusted under 35 U.S.C. 154(b) by 998 days.

(21) Appl. No.: 12/527,880

(22) PCT Filed: Aug. 29, 2007

(86) PCT No.: PCT/IL2007/001073
§ 371 (c)(1), (2), (4) Date: Aug. 20, 2009

(87) PCT Pub. No.: WO2008/102334
PCT Pub. Date: Aug. 28, 2008

(65) Prior Publication Data
US 2011/0154836 A1 Jun. 30, 2011

Related U.S. Application Data

(63) Continuation-in-part of application No. PCT/IL2007/000236, filed on Feb. 21, 2007, and a continuation-in-part of application No. PCT/IL2007/000864, filed on Jul. 10, 2007, which is a continuation-in-part of application No. PCT/IL2007/000235, filed on Feb. 21, 2007.

(60) Provisional application No. 60/806,860, filed on Jul. 10, 2006, provisional application No. 60/775,231, filed on Feb. 21, 2006, provisional application No. 60/924,555, filed on May 21, 2007.

(51) Int. Cl.
*F25D 25/00* (2006.01)
*A21D 6/00* (2006.01)
*H05B 6/64* (2006.01)
*A61N 5/00* (2006.01)

(52) U.S. Cl.
USPC .......... 250/492.1; 422/307; 62/378; 426/524; 426/238; 426/393; 99/451; 219/678; 250/433; 250/455.11; 250/506.1; 204/298.38

(58) Field of Classification Search
USPC ........ 422/1, 3, 21–22, 109, 119, 186.04, 307; 62/78, 378, 3.1; 426/524, 238, 393; 99/451; 219/678, 757; 250/433, 250/455.11, 492.1, 506.1; 204/155, 298.38
See application file for complete search history.

(56) References Cited

U.S. PATENT DOCUMENTS 2,489,337 A 11/1949 Sperling
2,543,130 A 2/1951 Robertson
(Continued)

FOREIGN PATENT DOCUMENTS

CN 1968609 5/2007
DE 10200702562 10/2007
(Continued)

OTHER PUBLICATIONS

Adams "Microwave Blood Plasma Defroster", Journal of Microwave Power and Electromagnetic Energy, 26(3): 156-159, 1991.
(Continued)

*Primary Examiner* — Monzer R Chorbaji
(74) *Attorney, Agent, or Firm* — Greenblum & Bernstein, P.L.C.

(57) ABSTRACT

Disclosed is a method of freezing a body or a portion thereof. The method comprises exposing at least a part of the body to a coolant having a temperature below the freezing point of the body, and at the same time operating an electromagnetic heater, as to maintain the at least part of the body at a temperature above its freezing point; and reducing the electromagnetic heating to allow the at least a part of the body to freeze. The electromagnetic heater comprises a resonator, and the heated part of the body is heated inside the resonator.

24 Claims, 30 Drawing Sheets

(56) References Cited

U.S. PATENT DOCUMENTS

| | | |
|---|---|---|
| 2,593,067 A | 4/1952 | Spencer |
| 2,895,828 A | 7/1959 | Kamide |
| 2,917,739 A | 12/1959 | Halpern |
| 3,151,325 A | 9/1964 | Kompfner |
| 3,231,892 A | 1/1966 | Matson et al. |
| 3,633,538 A | 1/1972 | Hoeflin |
| 3,806,689 A | 4/1974 | Kegereis et al. |
| 4,035,599 A | 7/1977 | Kashyap et al. |
| 4,165,454 A | 8/1979 | Carlsson et al. |
| 4,196,332 A | 4/1980 | MacKay et al. |
| 4,250,628 A | 2/1981 | Smith et al. |
| 4,279,722 A | 7/1981 | Kirkbride |
| 4,336,435 A | 6/1982 | Kashyap et al. |
| 4,342,035 A | 7/1982 | Anderson et al. |
| 4,342,896 A | 8/1982 | Teich |
| 4,354,153 A | 10/1982 | Lentz |
| 4,377,733 A | 3/1983 | Yamaguchi et al. |
| 4,431,888 A | 2/1984 | Simpson |
| 4,447,693 A | 5/1984 | Buck |
| 4,475,024 A | 10/1984 | Tateda |
| 4,596,915 A | 6/1986 | Simpson |
| 4,855,555 A | 8/1989 | Adams et al. |
| 4,897,151 A | 1/1990 | Killackey et al. |
| 5,036,172 A | 7/1991 | Kokkeler et al. |
| 5,202,095 A | 4/1993 | Houchin et al. |
| 5,321,222 A | 6/1994 | Bible et al. |
| 5,321,897 A | 6/1994 | Holst et al. |
| 5,451,751 A | 9/1995 | Takimoto et al. |
| 5,468,940 A | 11/1995 | Kang |
| 5,512,736 A | 4/1996 | Kang et al. |
| 5,521,360 A | 5/1996 | Johnson et al. |
| 5,616,268 A | 4/1997 | Carr |
| 5,698,128 A | 12/1997 | Sakai et al. |
| 5,721,286 A | 2/1998 | Lauf et al. |
| 5,798,395 A | 8/1998 | Lauf et al. |
| 5,804,801 A | 9/1998 | Lauf et al. |
| 5,818,649 A | 10/1998 | Anderson |
| 5,828,042 A | 10/1998 | Choi et al. |
| 5,873,254 A | 2/1999 | Arav |
| 5,877,479 A | 3/1999 | Yu |
| 5,927,265 A | 7/1999 | McKee et al. |
| 5,961,871 A | 10/1999 | Bible et al. |
| 5,977,532 A | 11/1999 | Ekemar |
| 5,981,928 A | 11/1999 | Lee |
| 5,998,775 A | 12/1999 | Sung |
| 6,060,701 A | 5/2000 | McKee et al. |
| 6,096,361 A | 8/2000 | Yamane et al. |
| 6,114,677 A | 9/2000 | Idomoto et al. |
| 6,166,551 A | 12/2000 | Scott et al. |
| 6,169,277 B1 | 1/2001 | Feher et al. |
| 6,172,348 B1 | 1/2001 | Yoshino et al. |
| 6,191,402 B1 | 2/2001 | Ekemar |
| 6,225,940 B1 | 5/2001 | Ohlsen |
| 6,249,710 B1 | 6/2001 | Drucker et al. |
| 6,262,406 B1 | 7/2001 | McKee et al. |
| 6,274,859 B1 | 8/2001 | Yoshino et al. |
| 6,320,165 B1 | 11/2001 | Ovadia |
| 6,320,171 B1 | 11/2001 | Kim |
| 6,384,392 B1 | 5/2002 | Lee et al. |
| 6,444,966 B2 | 9/2002 | Mukumoto et al. |
| 6,462,320 B1 | 10/2002 | Fuls et al. |
| 6,476,766 B1 | 11/2002 | Cohen |
| 6,487,950 B2 | 12/2002 | Samland |
| 6,537,492 B1 | 3/2003 | Søgaard |
| 6,563,097 B2 | 5/2003 | Taino et al. |
| 6,576,879 B1 | 6/2003 | Hoh |
| 6,586,714 B2 | 7/2003 | Kawamura et al. |
| 6,590,192 B2 | 7/2003 | Taino et al. |
| 6,614,011 B2 | 9/2003 | Omori et al. |
| 6,657,173 B2 | 12/2003 | Flugstad et al. |
| 6,674,056 B2 | 1/2004 | Lee |
| 6,680,467 B1 | 1/2004 | Whipple, Jr. |
| 6,686,567 B1 | 2/2004 | Hwang |
| 6,713,672 B1 * | 3/2004 | Stickney ............ 174/382 |
| 6,720,541 B2 | 4/2004 | Watanabe et al. |
| 6,770,859 B2 | 8/2004 | Kang |
| 6,812,443 B2 | 11/2004 | Noda et al. |
| 6,815,644 B1 | 11/2004 | Muegge et al. |
| 6,838,648 B2 | 1/2005 | Watanabe et al. |
| 6,861,632 B2 | 3/2005 | Lee |
| 6,867,402 B1 | 3/2005 | Schulte |
| 6,874,495 B2 | 4/2005 | McFadden |
| 6,880,545 B2 | 4/2005 | Heber et al. |
| 6,884,979 B1 | 4/2005 | Törngren et al. |
| 6,914,226 B2 | 7/2005 | Ottaway |
| 6,982,401 B2 | 1/2006 | Hu et al. |
| 7,030,347 B2 | 4/2006 | Lee et al. |
| 7,053,346 B2 | 5/2006 | Cheng et al. |
| 7,055,518 B2 | 6/2006 | McFadden et al. |
| 7,087,872 B1 | 8/2006 | Dobie et al. |
| 7,105,787 B2 | 9/2006 | Clemen, Jr. |
| 7,105,789 B2 | 9/2006 | Ekemar |
| 7,145,119 B1 | 12/2006 | Kim et al. |
| 7,166,824 B2 | 1/2007 | Kanzaki et al. |
| 7,199,341 B2 | 4/2007 | Kaneko et al. |
| 7,208,710 B2 | 4/2007 | Gregoire et al. |
| 7,235,763 B2 | 6/2007 | Christiaansen et al. |
| 7,258,881 B2 | 8/2007 | Jones et al. |
| 7,360,533 B2 | 4/2008 | McFadden |
| 7,388,180 B2 | 6/2008 | Kim et al. |
| 7,409,311 B2 | 8/2008 | Imgram et al. |
| 7,490,538 B2 | 2/2009 | Lowell et al. |
| 7,612,315 B2 | 11/2009 | Corradini |
| 7,626,468 B2 | 12/2009 | Staines |
| 7,629,921 B1 | 12/2009 | Manry et al. |
| 2002/0162836 A1 | 11/2002 | Taino et al. |
| 2004/0134904 A1 | 7/2004 | Clemen, Jr. |
| 2004/0211765 A1 | 10/2004 | McFadden |
| 2004/0216732 A1 | 11/2004 | McFadden |
| 2004/0232140 A1 | 11/2004 | Kanzaki et al. |
| 2005/0005611 A1 * | 1/2005 | Owada ............... 62/3.1 |
| 2005/0080373 A1 | 4/2005 | Wang |
| 2005/0092314 A1 | 5/2005 | Rabas et al. |
| 2006/0049725 A1 | 3/2006 | Simon |
| 2006/0259547 A1 | 11/2006 | Bogatin et al. |
| 2006/0289526 A1 | 12/2006 | Takizaki et al. |
| 2007/0137633 A1 | 6/2007 | McFadden |
| 2007/0215608 A1 | 9/2007 | Yoshino et al. |
| 2007/0215612 A1 | 9/2007 | Hicks et al. |
| 2007/0272684 A1 | 11/2007 | Lee |
| 2007/0278218 A1 | 12/2007 | Claesson et al. |
| 2008/0047959 A1 | 2/2008 | Moriya et al. |
| 2008/0087662 A1 | 4/2008 | Takizaki et al. |
| 2008/0105136 A1 | 5/2008 | McFadden |
| 2008/0105675 A1 | 5/2008 | Choi et al. |
| 2008/0106483 A1 | 5/2008 | McFadden et al. |
| 2008/0193614 A1 | 8/2008 | Greiner et al. |
| 2008/0206420 A1 | 8/2008 | McFadden |
| 2008/0264269 A1 | 10/2008 | Sterzel et al. |
| 2008/0280000 A1 | 11/2008 | Breunig et al. |
| 2008/0290087 A1 | 11/2008 | Ben-Shmuel et al. |
| 2008/0296284 A1 | 12/2008 | McFadden et al. |
| 2009/0014315 A1 | 1/2009 | Chen |
| 2009/0045191 A1 | 2/2009 | Ben-Shmuel et al. |
| 2009/0057302 A1 | 3/2009 | Ben-Shmuel et al. |
| 2009/0236333 A1 | 9/2009 | Ben-Shmuel et al. |
| 2009/0236334 A1 | 9/2009 | Ben-Shmuel et al. |
| 2009/0236335 A1 | 9/2009 | Ben-Shmuel et al. |
| 2009/0256706 A1 | 10/2009 | Brown |
| 2009/0274802 A1 | 11/2009 | Kling et al. |

FOREIGN PATENT DOCUMENTS

| | | |
|---|---|---|
| DE | 102007025245 | 10/2007 |
| DE | 102007025263 | 10/2007 |
| DE | 102007025264 | 10/2007 |
| DE | 102007035357 | 2/2009 |
| DE | 102007035359 | 2/2009 |
| EP | 0429822 | 6/1991 |
| EP | 0268379 | 8/1992 |
| EP | 0615763 | 9/1994 |
| EP | 0752195 | 1/1997 |
| EP | 0934681 | 8/1999 |
| EP | 1447632 | 8/2004 |

(56) References Cited

FOREIGN PATENT DOCUMENTS

| | | | |
|---|---|---|---|
| EP | 1515102 | 3/2005 | |
| EP | 1987288 | 11/2008 | |
| EP | 2053315 | 4/2009 | |
| EP | 2098788 | 9/2009 | |
| GB | 2033587 | 5/1980 | |
| JP | 06-193884 | 7/1994 | |
| JP | 06-310268 | 11/1994 | |
| JP | 08-064359 | 3/1996 | |
| JP | 09-229372 | 9/1997 | |
| JP | 2001-086967 | 4/2001 | |
| JP | EP 1 515 102 A1 * | 11/2003 | ............ F25D 13/00 |
| WO | WO 91/07069 | 5/1991 | |
| WO | WO 95/27387 | 10/1995 | |
| WO | WO 95/27388 | 10/1995 | |
| WO | WO 97/36728 | 10/1997 | |
| WO | WO 99/13688 | 3/1999 | |
| WO | WO 02/23953 | 3/2002 | |
| WO | WO 03/056919 | 7/2003 | |
| WO | WO 2005/027644 | 3/2005 | |
| WO | WO 2005/041672 | 5/2005 | |
| WO | WO 2005/073449 | 8/2005 | |
| WO | WO 2005/106333 | 11/2005 | |
| WO | WO 2006/016372 | 2/2006 | |
| WO | WO 2007/018565 | 2/2007 | |
| WO | WO 2007/095204 | 8/2007 | |
| WO | WO 2007/096877 | 8/2007 | |
| WO | WO 2007/096878 | 8/2007 | |
| WO | WO 2008/007368 | 1/2008 | |
| WO | WO 2008/048497 | 4/2008 | |
| WO | WO 2008/087618 | 7/2008 | |
| WO | WO 2008/102334 | 8/2008 | |
| WO | WO 2008/102360 | 8/2008 | |
| WO | WO 2008/143942 | 11/2008 | |
| WO | WO 2008/145213 | 12/2008 | |
| WO | WO 2008/145214 | 12/2008 | |
| WO | WO 2008/145216 | 12/2008 | |
| WO | WO 2008/145217 | 12/2008 | |
| WO | WO 2009/104191 | 8/2009 | |
| WO | WO 2010/052724 | 5/2010 | |
| WO | WO 2010/052725 | 5/2010 | |

OTHER PUBLICATIONS

Arens et al. "Danger of Overwarming Blood by Microwave", JAMA, 218(7): 1045-1046, 718, Nov. 15, 1971.
Collin "Electromagnetic Theory: Wave Equation", Foundations for Microwave Engineering, IEEE Press Series on Electromagnetic Wave Theory, 2nd Ed., Chap.2.4: 31-32, 2001.
Collin "Transmission Lines and Waveguides", Foundations for Microwave Engineering, IEEE Press Series on Electromagnetic Wave Theory, 2nd Ed., p. 96-99, 2001.
Geedipalli et al. "Heat Transfer in a Combination Microwave-Jet Impingement Oven", Food and Bioproducts Processing, 86: 53-63, 2008.
Hirsch et al. "Indicators of Erythocyte Damage After Microwave Warming of Packed Red Blood Cells", Clinical Chemistry, 49(5): 792-799, 2003.
Hirsch et al. "Temperature Course and Distribution During Plasma Heating With a Microwave Device", Anaesthesia, 58: 444-447, 2003.
Khummongkol et al. "Heat Transfer Between Impinging Air and Impinged Surface: A Factorial Design", The Joint International Conference on 'Sustainable Energy and Environment (SEE)', Hua Hin, Thailand, Dec. 1-3, 2004, 4-003(O): 431-436, 2004.
Marcroft et al. "Flow Field in a Hot Air Jet Impingement Oven—Part I: A Single Impinging Jet", Journal of Food Processing Preservation, 23: 217-233, 1999.
Marcroft et al. "Flow Field in a Hot Air Jet Impingement Oven—Part II: Multiple Impingement Jets", Journal of Food Processing Preservation, 23: 235-248, 1999.
Risco "Microwaves and Vascular Perfusion: Obtaining Very Rapid Organ Cooling", Cryobiology, 49: 294, Abstract No. 11, 2004.
Robinson et al. "Electromagnetic Re-Warming of Cryopreserved Tissues: Effect of Choice of Cryoprotectant and Sample Shape on Uniformity of Heating", Physics in Medicine and Biology, 47: 2311-2325, 2002.
Sherman et al. "A New Rapid Method for Thawing Fresh Frozen Plasma", Transfusion, 14(6): 595-597, Nov.-Dec. 1974.
Söhngen et al. "Thawing of Fresh-Frozen Plasma With a New Microwave Oven", Transfusion, 28(6): 576-580, 1988.
Communication Relating to the Results of the Partial International Search Dated Jul. 10, 2007 From the International Searching Authority Re.: Application No. PCT/IL2007/000236.
Communication Relating to the Results of the Partial International Search Dated Oct. 24, 2007 From the International Searching Authority Re.: Applicaiton No. PCT/IL2007/000864.
Communication Relating to the Results of the Partial International Search Dated Aug. 4, 2008 From the International Searching Authority Re.: Application No. PCT/IL2008/000231.
Communication Relating to the Results of the Partial International Search Dated Jul. 10, 2002 From the International Searching Authority Re.: Application No. PCT/IL2007/000235.
International Preliminary Report on Patentability Dated Aug. 26, 2008 From the International Bureau of WIPO Re.: Application No. PCT/2007/000235.
International Preliminary Report on Patentability Dated May 29, 2008 From the International Preliminary Examing Authority Re.: Application No. PCT/IL2007/000236.
International Preliminary Report on Patentability Dated May 29, 2008 From the International Preliminary Examining Authority Re.: Application No. PCT/IL2007/000236.
International Search Report Dated Sep. 11, 2007 From the International Searching Authority by the Patent Cooperation Treaty Re.: Application No. PCT/IL2007/000235.
International Search Report Dated Nov. 13, 2008 From the International Searching Authority Re.: Application No. PCT/IL2008/000231.
International Search Report Dated May 20, 2008 From the International Searching Authority by the Patent Cooperation Treaty Re.: Application No. PCT/IL2007/001073.
International Search Report Dated Dec. 27, 2007 From the International Searching Authority Re.: Application No. PCT/IL2007/000864.
International Search Report Dated Aug. 31, 2007 From the International Searching Authority by the Patent Cooperation Treaty Re.: Application No. PCT/IL20007/000236.
Written Opinion Dated Nov. 13, 2008 From the International Searching Authority Re.: Application No. PCT/IL2008/000231.
Written Opinion Dated May 20, 2008 From the International Searching Authority Re.: Application No. PCT/IL2007/001073.
Written Opinion Dated Dec. 27, 2007 From the International Searching Authority Re.: Application No. PCT/IL2007/000864.
Written Opinion Dated Aug. 31, 2007 From the International Searching Authority Re.: Application No. PCT/IL2007/000236.
Bird "Antenna Feeds", Encyclopedia of Radiofrequency and Macrowave Engineering, p. 185-217, 2005.
Boström et al. "Rapid Thawing of Fresh-Frozen Plasma With Radio Wave-Based Thawing Technology and Effects on Coagulation Factors During Prolonged Storage at 4° C.", Vox Sanguinis, 97: 34-38, 2009.
Evans "Electromagnetic Rewarming: The Effect of CPA Concentration and Radio Source Frequency on Uniformity and Efficiency of Heating", Cryobiology, 40: 126-138, 2000.
Evans et al. "Design of a UHF Applicator for Rewarming of Cryopreserved Biomaterials", IEEE Transactions on Biomedical Engineering, 39(3): 217-225, Mar. 1992.
Foster et al. "Biological Effects of Radiofrequency Energy As Related to Health and Safety", Encyclopedia of Radiofrequency and Macrowave Engineering, p. 511-523, 1999.
Foster et al. "Biological Effects of Radiofrequency Energy as Related to Health and Safety", Encyclopedia of RF and Microwave Engineering, p. 511-523, 2005.
Foster et al. "Dielectric Properties of Tissues", Handbook of Biological Effects of Electromagnetic Fields, CRC Press, 2nd Ed.(Chap.1): 25-101, 1996.

(56) References Cited

OTHER PUBLICATIONS

Hambling "Forget Lasers, Phasers and Other Beam Weapons—Radiofrequency Devices Are Here, and They're Set to 'Sting'", Tech Watch: Forecasting Pain, 183(12): 32, Dec. 2006.

Herring et al. "OSU Tunes Into a Cooking Innovation", OSU News & Communication Services, Oregon State University, 2 P., Apr. 30, 2004.

Lapin N9GL's RF Safety Column: The Military's New RF Waepon, ARRL Handbook for Radio Amateurs, American Radio Relay League, 3 P., 2001.

Liang et al. "Multiband Characteristics of Two Fractal Antennas", Microwave and Oprical Technology Letters, 23(4): 242-245, Nov. 20, 1999.

Penfold et al. "Control of Thermal Runaway and Uniformity of Heating in the Electromagnetic Rewarming of a Cryopreserved Kidney Phantom", Cryobiology, 30: 493-508, 1993.

Repacholi "Radiofrequency Electromagnetic Field Exposure Standards", IEEE Engineering in Medicine and Biology Magazine, 6: 18-21, Mar. 1987.

Robinson et al. "Rapid Electromagnetic Warming of Cells and Tissues", IEEE Transactions on Biomedical Engineering, 46(12): 1413-1425, Dec. 1999.

Schwan et al. "RF-Field Interactions With Biological Systems: Electrical Properties and Biophysical Mechanisms", Proceedings of the IEEE, 68(1): 104-113, Jan. 1980.

Scott "Understanding Microwaves", A Wiley-Interscience Publication, 1: 326-331, 1993.

Shelley "Inside View on Deep Heat", Eureka Innovative Engineering Design, 2 P., May 14, 2007.

Von Hippel "Theory: A. Macroscopic Properties of Dielectrics. Comples Permittivity and Permeability", Dielectric Materials and Applications, 1: 3-5, 1995.

Walker et al. "Fractal Volume Antennas", Electronics Letters, 34(16): 1536-1537, Aug. 6, 1998.

Wusteman et al. "Vitrification of Large Tissues With Dielectric Warming: Biological Problems and Some Approaches to Their Solution", Cryobiology, 48: 179-189, 2004.

International Search Report and the Written Opinion Dated Jun. 24, 2010 From the International Searching Authority Re.: Application No. PCT/IL2009/001059.

International Preliminary Report on Patentability Dated Jan. 13, 2009 From the International Bureau of WIPO Re.: Application No. PCT/1L2007/000864.

International Preliminary Report on Patentability Dated Jan. 13, 2009 From the International Bureau of WIPO Re.: Application No. PCT/IL2007/000864.

Communication Relating to the Results of the Partial International Search Dated Aug. 3, 2009 From the International Searching Authority Re.: Application No. PCT/IL2009/000199.

Communication Relating to the Results of the Partial International Search Dated Mar. 29, 2010 From the International Searching Authority Re.: Application No. PCT/IL2009/001058.

International Preliminary Report on Patentability Dated Aug. 26, 2009 From the International Bureau of WIPO Re.: Application No. PCT/IL2007/001073.

International Search Report and the Written Opinion Dated Nov. 25, 2009 From the International Searching Authority Re.: Application No. PCT/IL2009/000199.

International Search Report Dated Mar. 3, 2010 From the International Searching Authority Re.: Application No. PCT/IL2009/001057.

Response Dated Feb. 23, 2010 to the Written Opinion of Nov. 25, 2009 From the International Searching Authority Re.: Application No. PCT/IL2009/000199.

Communication Pursuant to Article 94(3) EPC Dated Apr. 29, 2010 From the European Patent Office Re.: Application No. 07706172.9.

Official Action Dated Jun. 3, 2010 From the US Patent and Trademark Office Re.: U.S. Appl. No. 12/217,167.

International Search Report and the Written Opinion Dated Jun. 15, 2010 From the International Searching Authority Re.: Application No. PCT/IL2009/001058.

\* cited by examiner ural filing date of Feb. 21, 2007, which claims the benefit of
RF CONTROLLED FREEZING

RELATED APPLICATIONS

This application is a National Phase of PCT Patent Application No. PCT/IL2007/001073 having International filing date of Aug. 29, 2007, which is a continuation-in-part (CIP) of PCT Patent Application No. PCT/IL2007/000864 having International filing date of Jul. 10, 2007, which is a continuation-in-part (CIP) of PCT/IL2007/000235 having International filing date of Feb. 21, 2007, which claims the benefit of priority of U.S. Provisional Patent Application Nos. 60/806,860 filed on Jul. 10, 2006, and 60/775,231 filed on Feb. 21, 2006.

PCT Patent Application No. PCT/IL2007/000864 also claims the benefit of priority of U.S. Provisional Patent Application Nos. 60/924,555 filed on May 21, 2007 and 60/806,860 filed on Jul. 10, 2006.

PCT Patent Application No. PCT/IL2007/001073 is also a continuation-in-part (CIP) of PCT/IL2007/000236 having International filing date of Feb. 21, 2007, which claims the benefit of priority of U.S. Provisional Patent Application Nos. 60/806,860 filed on Jul. 10, 2006 and 60/775,231 filed on Feb. 21, 2006.

The contents of the above Applications are all incorporated herein by reference.

FIELD OF THE INVENTION

The present invention is generally concerned with freezing RF absorbing bodies, for example bodies comprising biological material

BACKGROUND OF THE INVENTION

The microwave oven is a ubiquitous feature in modern society. However, its limitations are well known. These include, for example uneven heating and slow absorption of heat, especially for defrosting. In fact, ordinary microwave ovens, when used for defrosting and even heating, result in foods in which the outside is generally warm or even partly cooked before the interior is defrosted.

A number of papers have been published in which a theoretical analysis of the problem of warming of a cryogenic sample has been carried out. Because of the difficulties of such analysis, such analysis has only been carried out on regular shapes, such as spherical, and ellipsoidal shapes. Experimental attempts have apparently been made on kidney sized specimens, but results of these experiments do not indicate that a viable solution for defrosting kidneys is available.

Moreover, there does not appear to be a solution for defrosting other organs or foods of more arbitrary shapes.

Prior art publications include:

S. Evans, Electromagnetic Rewarming: The effect of CPA concentration and radio source frequency on uniformity and efficiency of heating, Cryobiology 40 (2000) 126-138

S. Evans, et al., Design of a UHF applicator for rewarming of cryopreserved biomaterials, IEEE Trans. Biomed. Eng. 39 (1992) 217-225

M. P. Robinson, et al., Rapid electromagnetic warming of cells and tissues, IEEE Trans. Biomed. Eng. 46 (1999) 1413-1425

M. P. Robinson, et al., Electromagnetic re-warming of cryopreserved tissues: effect of choice of cryoprotectant and sample shape on uniformity of heating, Phys. Med. Biol. 47 (2002) 2311-2325.

M. C. Wusteman, Martin et al., Vitrification of large tissues with dielectric warming: biological problems and some approaches to their solution, Cryobiology 48 (2004) 179-189.

A paper entitled "Control of Thermal Runaway and Uniformity of Heating in the Electromagnetic Warming of a Cryopreserved Kidney Phantom" by J. D. J. Penfold, et al., in Cryobiology 30, 493-508 (1993) describes a theoretical analysis and experimental results. While some experiments were apparently made with a kidney sized phantom, the main reported results are with a uniform spherical object.

As reported a cavity was fed with electromagnetic energy at 434 MHz from three orthogonal directions (x, y, z). The x and y feeds were provided from a same generator and a phase change was introduced so that the field was circularly polarized. The frequency was varied in steps of 32 kHz (apparently up to about 350 kHz maximum) to match the input impedance as it changed with increasing temperature.

An article by Ramon Risco Delgado, Jorge Aguilar Barrera: *Microwaves and Vascular Perfusion: Obtaining Very Rapid Organ Cooling.* Cryobiology. 2004. Page 294, describes a freezing technique, according to which an organ is cooled by perfusion of its vascular system by a non-polar coolant such as $CF_4$ while at the same time, the organ is heated by microwaves. Microwaves heat all the tissues, but not the coolant in the vessels, due to its non-polar character. Because heating and cooling are simultaneously applied to the organ, the authors express their belief that control of the microwave power and the perfusion rate of coolant makes it possible, in principle, to keep the temperature of the organ constant at, for instance, 37° C., even though the coolant in the vascular system may be very cold, for instance, around −150° C. The authors also express their belief that "If, when this situation has been achieved, the microwaves are suddenly switched off a very high cooling rate will occur and this could, in principle, be enough to vitrify the whole organ".

Generally, water freezing causes crystal growth and expansion that is known to damage tissue. Since crystallization is an exothermic process, a forming crystal can cause thawing of nearby crystals, followed by recrystallization during the freezing process, which may cause additional crystallization induced damage. Since much damage is caused to tissue due to crystallization and recrystallization, rapid freezing, which leaves only little time to these destructive processes to occur, is preferably applied. However, in bulky bodies (e.g. human, bovine or porcine organs, large fish or large portions thereof) rapid freezing is difficult to achieve, since the coolant cools the body from the outside and the inner portions of the body that are distant and separated from the coolant cool only by cooled adjacent portions of the body. One preferred solution that is known in the art is reducing freezing damage by directional freezing, a process where freezing is controlled such that it would take place in a specific direction U.S. Pat. No. 5,873,254, the disclosure of which is incorporated herein by reference, describes a device for freezing biological material by moving the biological material along a temperature gradient.

WO2006/016372, the disclosure of which is incorporated herein by reference, describes directional freezing of biological material placed in tight contact with at least one, preferably between two heat exchangers, and controlling the temperature in at least one of the heat exchangers such that a freezing temperature front propagates in the biological material away from at least one of the two heat exchangers.

WO2003/056919, the disclosure of which is incorporated herein by reference, describes gradually freezing of bulky biological material in a process that may involve directional freezing.

SUMMARY OF THE INVENTION

A broad aspect of some embodiments of the invention concerns freezing a body, which comprises biological material, such that it would be possible to thaw the body damaging some desirable features of the body less than these features are damaged by conventional freezing, and preferably, without causing these features any damage at all.

Desirable features may be, for instance, texture (in case the body was, for example, food), viability (in case the body was, for example, a tissue or organ), or any other feature that is known to be generally destroyed by freezing and thawing a body containing biological material.

An aspect of some embodiments of the invention concerns freezing a critical portion of a body region by region, such that latent heat released from a region during freezing is not large enough to thaw adjacent frozen regions. In an embodiment of the invention, the regions are small enough, such that only small amounts of heat are released during the freezing of the small region. Alternatively or additionally, the adjacent regions are cold enough, such that the heat released from the freezing region is not sufficient to thaw an adjacent region.

In accordance with an aspect of some embodiments of the invention, freezing is done by first bringing a critical portion of the body to a temperature only slightly above its freezing point, and then freezing the critical portion fast enough to avoid or at least reduce damaging the desirable feature. If the temperature of the critical portion is reduced to near freezing before heating is turned off, the amount of heat that needs to be removed from the body to freeze it is minimized and freezing is rapid.

A critical portion is a portion of the body that affects, optionally critically affects, the desirable feature of the body. For instance, if the body to be frozen is a fish, and the desirable feature is the texture of the fish meat, the meat is a critical portion, while the bones are not.

In exemplary embodiments of the invention, a critical portion of a body is brought to a temperature above its freezing point by cooling its surrounding while heating the critical portion with EM energy. Preferably, the heating is just enough to let the critical portion cool while retaining a large temperature difference between the critical portion and its surrounding. When the critical portion is close to its freezing point, EM heating is reduced, preferably stopped, and the critical portion freezes fast due to the large temperature difference between it and its surroundings.

Optionally, cooling is by contacting with heat sink, such as cooling fluid, thermo-conductive blocks, etc. Optionally, a cooling fluid comprises a liquid, for example liquid nitrogen, ethanol, or the like. Additionally or alternatively, a cooling fluid comprises a gas, for example vapor of liquid nitrogen. It is preferable to use a heat sink that is not heated during operation, for instance, a heat sink with no, EM energy absorption in a used frequency range. In this sense, liquid nitrogen is preferable over, for instance, ethanol.

The inventors discovered that electromagnetic radiation of different frequencies heats differently different portion of an object (even if the object is uniform). Thus, trial and error may be used to determine frequency bands that are absorbed to different extents by different portions of the body. Applying electromagnetic radiation of one or more of these frequency bands to the body may provide good differential heating.

Optionally, a critical portion of the body is conceptually divided to regions (for instance, slices), and is frozen one region at a time, where adjacent, not yet frozen, regions of a slice to be frozen are treated as a surrounding of the critical portion. Optionally, the regions are small, such as to reduce the influence of latent heat emitted from a freezing region on adjacent regions. This may reduce thawing of adjacent regions, and thus reduce re-crystallization and damage to desirable features.

An aspect of some embodiments of the invention concerns controlling cooling rate, and optionally also cooling direction, by exposing the body to cold while selectively heating portions of the body with electromagnetic radiation, for instance, with RF and/or microwave.

In exemplary embodiments of the invention, the freezing is optionally from outside the body in. Alternatively or additionally the directionality of the freezing is in the direction of the body. i.e., along a front that moves from one extremity of the body to another. In some exemplary embodiments of the invention, the freezing is along two or more controlled directions, for instance, from two or more extremities to the center.

Preferably, care is taken to ensure that at all times the temperature of the critical portion of the body is not high enough to damage the critical portion (e.g. by cooking or protein denaturation). Normally, it is preferred that the critical portion is heated to a temperature not higher than 30° C., preferably no higher than 20° C. or even 10° C.

When a temperature of the critical portion above the freezing point is established, the selective heating is reduced as to allow freezing of the body, and the body freezes. Optionally, the selective heating is reduced to zero. In the present application, the term "reducing the heat" is used to denote any reduction in the heating power delivered.

Heating power manipulation (increasing or decreasing power) is optionally dependent on the phase of the heated region (i.e. liquid, solid, or under a phase change). For instance, during freezing, electromagnetic heating energy delivered to the freezing portion will slow down the freezing, which is generally destructive to desirable features. Thus, heating a portion that is undergoing a phase change is usually omitted or significantly reduced. Additionally, increasing the temperature of an already frozen region or slowing down its further cooling usually requires delivering to this region less energy than that required to obtain similar results at the same region, when it is at liquid state.

During freezing the heating should be minimal, preferably zero, so as to make the freezing process fastest and least damaging to the desirable features. After freezing occurred, the critical portion is optionally heated again to control the rate at which the critical portion cools further. In exemplary embodiments of the invention, a frozen region is cooled to a temperature sufficiently below its freezing point before an adjacent region is cooled to freeze, such that latent heat released from freezing of the adjacent region will not thaw the frozen region.

A possible advantage of some embodiments of the invention is that they provide different heating intensities to different regions of the body. This way, portions of the body, which under similar heating intensities would freeze in different paces, may freeze together.

Additionally or alternatively, the shape of a freezing front as well as the time development of said shape may be controlled by increasing selective heating applied to body portions where the freezing front is too thick or grows too fast, or decreasing selective heating where the freezing front is too thin or grows too slowly.

In an embodiment of the invention, the body is cooled from the outside, and selective heating is used to prevent the outside of the body from freezing, but still allowing the outside to absorb heat from the inside. This way, cooling from the outside combined with heating the outer regions of a body may be used to directly control the temperature gradient under which freezing occurs.

In an embodiment of the invention, a body or sample is considered bulky if it has a volume of 5 cm$^3$ or more, for instance, 10 cm$^3$, 30 cm$^3$, 1000 cm$^3$ or any other intermediate or larger volume. Optionally, a bulky sample has a surface to volume ratio of $\frac{1}{5}$ cm$^{-1}$ (when all units are measured in cm). Optionally, a bulky sample has a minimal dimension of at least 1 cm, 5 cm, 10 cm or even 25 cm or more in two perpendicular directions.

In an embodiment of the invention, at a first stage, one or more portions of the body are allowed to freeze while other portions are maintained above the freezing point, and at a second stage, heating of the other portions is topped, thus allow further cooling, optionally freezing, of said other regions. For instance, in a cheese-filled pastry the dough may be first frozen, while the cheese kept above freezing point, and then, heating of the cheese is stopped, and the cheese is further cooled due its contact with the frozen dough. Heat transfer within the dough is very efficient, since the dough is solid, and thus, the cheese, which is in direct contact with the dough may cool very quickly. If the dough is sufficiently cold, no or very little re-crystallization occurs, and a phase transition zone of minimal thickness is formed.

Similarly, in a fish, the bones may be first frozen, while the meat is heated by RF so as to remain above its freezing point. Then, heating is stopped, and the meat freezes due to contact with the solid, frozen, bones. This way an internal frozen structure, rather than external heat sink, is used for freezing the fish.

Similarly, blood vessels may be used for circulating a cooling fluid as to provide an internal heat sink.

Similarly, a platter may be frozen (or kept cold), without freezing some predetermined portions thereof, which may even be kept at a warm temperature (e.g. 40-60° C.). This allows, for instance, storing in a platter a warm cake and ice-cream.

The heating is said to be selective to indicate that different portions of the body are heated to different extents.

In accordance with the invention, one way to produce selective heating of a critical portion of a body, when in a cooling environment, comprises applying to the critical portion EM energy at frequencies that are absorbed much more efficiently by the critical portion than by the cooling environment. It should be noted, that the same material may be heated by a first group of RF frequencies when it is frozen, and in a second group when it is un-frozen. In such a case, for instance, in the case of water and ice, it is possible to heat selectively only the material in the solid state or only the material in the liquid state, as the need might be.

In an embodiment of the invention, heating of the entire body is reduced at the same time. Optionally, this is done by shutting off the heating, either abruptly, or gradually, but uniformly over the entire body.

In an embodiment of the invention, heating one region of the body is reduced to allow this region to freeze and create a freezing front between this region and an adjacent region, which is still heated. Optionally, the freezing front is advanced by reducing heat applied to region after region, until the entire body, or the entire critical portion, as the case may be, freezes. In this embodiment the body freezes along the advancement path of the freezing front, and heat flows in the opposite direction.

In an embodiment of the invention, sometimes referred to herein as multi-directional freezing, freezing propagates in two or more predefined directions. This may be achieved by creating hotspots in the critical portion, such that the critical portion freezes from each of these hotspots to an adjacent heat sink. When each hotspot contributes independently to the freezing, freezing is faster than in a unidirectional freezing.

In an embodiment of the invention, reducing the heating from a region of the body comprises shielding this region of the body from the electromagnetic heating. Optionally, shielding comprises moving the body to introduce the region into a shielded area. Optionally, the shielded area is the inside of a cut-off wave guide, which does not support microwave fields at the frequency that is used for heating the body. Alternatively or additionally, the shielded region is the inside a hollow absorbing body, which absorbs microwave of the frequency that is used for heating the body.

In an embodiment of the invention, the heating of various regions of the body is controlled by controlling parameters of the transmitted waves. For instance, it has been found that RF or microwave radiation of different frequencies, heats different portions inside a microwave heater of the type described herein. This may be utilized to control the heater to heat certain regions only and to provide a freezing front. Since embodiments of the invention allow providing very selective RF heating, and since RF heating heats rapidly, and may be manipulated easily, heating according to exemplary embodiments of the invention allows controlling the heating in real time. In comparison, some related art heating methods require contacting the body with a large thermal mass, and/or heating the coolant. These related art methods have much limited possibilities for real-time control of the heating.

In an embodiment of the invention, determining which frequency bands provide desirable selective heating, comprises estimating the amount and distribution of heating for each frequency. This can be estimated using a simulation program or from experimental results. Then, the microwave cavity is energized with a set of waves at frequencies and powers that will result in a desired (e.g. uniform) temperature of the body (e.g. near freezing) in the presence of the cooling environment. The set of frequencies and powers is then adjusted to form a moving front, on one side of which the temperature is below freezing and on the other side of which the temperature is above freezing. It is noted that heating may be applied to one or both sides of the front. Optionally, more than one moving front is created, for instance, fronts from several places at the perimeter of the body may move towards the center.

In yet another embodiment of the invention, a non-absorbing material forms a partition in a cooler, filled with very cold air or the like. A body is irradiated by antennas on one side of the partition to keep its temperature just above freezing. The body is then passed through an aperture in the non-absorbing material (or into a cavity in the material) such that it passes from a region in which the body is heated by the irradiation to one in which it is not heated (or is less heated). As the body is moved a freezing front forms in the body which moves relative to the body as the body moves relative to the partition.

Optionally, when multiple signals are used to warm a region, for instance, when heating a certain region requires application of signals of several different frequencies, the plurality of signals may be summed, Fourier transformed to obtain the summed signal in the time domain, and transferred to an analog signal by a wave generator, also known as a DDS (direct digital synthesizer). The heater is optionally controlled to generate the analog signal obtained this way. This may reduce the total power at each frequency. Alternatively, the plurality of signals may be applied one at a time making a series of frequencies with matching powers.

Optionally, when several frequencies are absorbed by the body to different extents, the intensity at which the various frequencies are transmitted is set such that the overall distribution of the absorbed power at each frequency will fit a predetermined distribution. For instance, to get a uniform temperature, signals that are absorbed more efficiently will be transmitted at a lower intensity. Optionally, this procedure is carried out before the above-described summation.

A broad aspect of some embodiments of the invention relates to controlling the heating of food and/or other objects, such as biological tissue, in a RF oven and/or in a microwave cavity oven. It has been realized that the measures taken by prior art investigators to provide uniform heating were inadequate and could not, by themselves, lead to a viable methodology for uniform heating (or defrosting) of irregular shaped objects such as organs, foods or the like. In particular it was discovered that the prior art suffered from many problems. As used herein, the term irregular means objects that depart from spherical or ellipsoid shape by more than 5% RMS volume.

Conventional microwave ovens are configured to feed into the oven chamber microwave energy that is essentially of a single frequency. Due to device constraints the energy is fed at different frequencies in a small range, normally between 2.4 and 2.5 MHz. The inventors realized that the constraints of using a substantially constant frequency, or even tracking a single dissipation peak in a small frequency range, significantly limited the ability to achieve uniform heating. In fact, heating at a single frequency is found to be one of the main reasons of hotspots. However, using different frequencies (using one or more feeds), may improve the uniformity of heating.

While some proposed prior art heaters did utilize more than one microwave input, the frequency differences between the two inputs are small, less than 6 MHz.

The inventors also found that the structure of the cavity of a conventional microwave oven, and especially the mode structure of the cavity, inherently did not allow achievement of uniform heating. In general, the fields for a given mode in a cavity vary with position and the heating varies with the strength of the fields.

In the art, attempts were made to set the parameters of the microwave oven to match features of a heated object before heating begins. However, during heating features of a heated object (e.g. the tendency to absorb energy of a given frequency) change. Hence the inventors realized that even if a heater was tuned to a heated object before operation, after even a short period of operation the features of the object will have changed and the tuning will no longer be significant.

Another problem is that at times, the absorption at a given location of an object is higher as the temperature increases. This can give rise to a "thermal runaway" problem (even in conventional microwave oven), wherein a relatively hot place absorbs more than a colder one thus continuously increasing the temperature difference. When an effort is made to tune the energy input of the device to the object's impedance, the efficiency of energy delivery into the object may be maximized, but hotspots are also generally increased.

The inventors also noted that known publications dealing with dissipation of energy deal with absorption of energy by the resonator (e.g. surface currents) and not necessarily the object. Furthermore, no attention was drawn to the distribution of dissipation of energy in the object (with the exception of some discussion of penetration depth).

Furthermore, when feeding from multiple directions into a cavity, coupling between the feeds can be a major problem. While for spherical samples these effects are minimal, for even moderate variations from this shape, the coupling between inputs can be quite large. Such coupling caused a number of problems including uneven heating and low power efficiency.

Some exemplary embodiments of the invention deal with one or more of these problems As used herein the term "heating" means delivering electromagnetic (EM) energy into an object. At times, an object may be heated according to the present invention without temperature increase (e.g. when it is concomitantly cooled at a rate that is at least equal to the heating rate or at a phase change where the transmitted energy is taken up for the phase change). Heating includes thawing, defrosting, heating, cooking, drying etc, utilizing electromagnetic energy.

An aspect of some embodiments of the invention deals with more uniform heating of a real life, i.e., non-uniform or irregular geometry object. As used herein the term "object" means any object, including a composition of one or more objects. In an embodiment of the invention, the hottest part of a thawed organ is 6° C. or less, when the coldest part reaches 0° C. This has been confirmed with a cow liver. In experiments with a cow liver, after thawing from −50° C., the range of temperatures in the thawed liver ranged from 8° C. to 10° C. In general, it is desirable to thaw the object such that all parts are above freezing point, to avoid recrystallization. In another embodiment objects are heated to other temperatures (e.g. serving or cooking temperatures, or a subzero temperature being above the temperature of the object before heating), while preserving a post heating uniformity of temperature within 50° C. At times, the uniformity of temperature in a heated (or thawed) object is maintained during heating such that at all times the uniformity of temperature is within 50° C. or even within 10° C. or 5° C.

An aspect of some embodiments of the invention is concerned with sweeping the frequency of the feed (or feeds) over a finite set of frequency sub-bands (i.e. feeding energy into the heater over many frequencies belonging to each sub-band). For example, the dissipation of energy is measured for a band of RF frequencies (e.g. the whole operation range of the heater), and based on the measured results, a finite set of frequency sub-bands is selected. The width of band over which the energy efficiency is measured may for example be up to 2 GHz. At times, the band may have a width between 0.5% (5/1000 [MHz]) and 25% (100/400 [MHz]) of the center frequency.

The measurement may be performed before heating an object, at one or more times during heating the object, or in advance (with a sample object to define the sub-bands for additional essentially identical objects). In an embodiment of the invention, RF energy is fed to the cavity at a plurality of frequencies and power levels responsive to the energy efficiency measurements. For example, the input may be frequency swept. Other methods described below may also be used.

An aspect of some embodiments of the present invention is concerned with assuring the efficiency of the heating process. The heating efficiency is defined as portion of the power generated by an RF energy source (amplifier or other) that is absorbed in a heated object. Higher efficiency of the heating process results in a higher efficiency of the whole process.

In an embodiment of the invention, the power coupled to other feeds at each frequency in certain band ($S_{ij}$) and the return loss at each frequency ($S_{ii}$) are taken into account in determining the heating efficiency and in adjusting certain characteristics of the apparatus, for example, a decision what power at what frequencies to transmit and the timing of transmitting those frequencies at matching powers. Optionally, the absorbed power (input power less coupled power) fed into the system from one feed is adjusted to be the same as the absorbed power fed into each of the other feeds.

In an embodiment of the invention, the width of the efficiency "spectrum" (related to the Q factor) is desirably increased. It is known, from the general theory of RF, that bigger loss in the object (or load) matches lower Q factor. In addition, wide dissipation peak allows for sweeping the frequency about the peak of efficiency, a technique that is believed to further improve the uniformity of heating. Based on the band width, coupling between antennas and surface currents may be reduced. If dissipation is measured (even in an empty chamber) the dissipation peaks caused by antenna's and/or metal components, and/or surface currents appear as narrow dissipation peaks. Thus, by avoiding transmittal in such bands (e.g. width being below 0.25% or even below 0.75%) the energy loss may be reduced. Such measurement may be carried out before and/or during heating of an object or during manufacture of a heater to prevent transmission of such wavelengths. Furthermore, coupling between inputs can be measured during manufacture and bands with high coupling avoided.

In some embodiments of the invention, the power input to the feeds at each transmitted frequency is adjusted to take into account differences in power absorbed by the object being heated, which may serve to provide a uniform or more uniform power absorption. Applicants have found that changing the transmitted frequency in some chosen sub-bands and the input power at each frequency, within a those chosen sub-bands, optionally about the absorption peaks, results in a change in the heating pattern within the heated object. Thus, by sweeping the frequency in chosen sub-bands, while the powers are properly adjusted, various portions of the object are heated. Keeping the total energy absorbed in different locations of an object uniform results in more even heating of the object.

An aspect of some embodiments of the invention is concerned with the design, construction and calibration of a cavity for RF heating. The cavity may be designed in order to meet certain needs of the present invention.

In an embodiment of the invention, the RF heater comprises one, two or more electromagnetic energy feeds that feed energy to the cavity. Optionally, the feeds are antennas, preferably, wideband and/or directional antennae. Optionally the feeds are polarized in different directions to reduce coupling. These characteristics may be used to lower the coupling and provide a higher degree of freedom in working the invention. In an exemplary embodiment of the invention three feeds which are placed parallel to orthogonal coordinates are used. Optionally two or more than three, for example six feeds are used. Optionally, only two (or in some embodiments even one) feeds are provided, when a lesser uniformity is acceptable and utilizing other aspects of the invention provides sufficient uniformity.

In some embodiments, rather than using an antenna having a single main wire, through which the incoming wave reaches all parts of the antenna structure (which can be an array of antennas) several antennas may be used. This group of antennas may be operated as an antenna array by delivering energy to each of the six antennas at a different time, thus matching the phase resulting from the geometrical design of the complex antenna. This allows summing the RF energy on the object versus summing it before the antenna. Among the benefits of such groups of antennas is the potential reduction of production costs (cheaper amplifiers). In addition, a possibility to control the phases of each input dynamically (and independently) provides an additional degree of freedom in controlling the RF (EM) modes.

Furthermore, it is noted that an antenna array would normally have a bigger area than a single antenna. A possible advantage would be reducing the dependence of location of a heated object on the heating protocol. Possibly two or more of the antenna sources are coherent, making the antenna structures have a common behavior. Furthermore, an antenna array may have a higher directionality or bandwidth and may thus provide advantages in working the invention. Furthermore, arrays can often be made steerable, to provide variable directionality of the antenna and to allow better transfer of energy to the object being heated.

In some embodiments of the invention, a wide band solid state amplifier may be used as an RF energy source. Among the potential benefits is the wide band of frequencies that may be introduced by the solid state amplifier.

In an embodiment of the invention, at least one field adjusting element is placed in the cavity to improve one or more parameters of the heating process (e.g., coupling). Optionally more than one field adjusting element is used. Optionally, any of the boundaries of at least one of the field adjusting elements is electrically floating (not touching the metal walls of the cavity). Optionally any part of the boundaries of at least one element are attached to one of the walls of the cavity. In an exemplary embodiment of the invention, at least one of the elements is not fixed in place, so that it can be moved and/or rotated and/or folded/unfolded to improve one or more parameters of the heating process. In an exemplary embodiment, of the invention, at least one of the elements rotates about an axis. In an exemplary embodiment of the invention, the at least one element slides along a wall of the cavity.

In an exemplary embodiment of the invention the field adjusting element is a metal or other conductor. Alternatively, any material, such as a dielectric, optionally loaded with metal, which is known to perturb electromagnetic fields, can be used as a matching element. The size, structure, place and material of a field adjusting element may affect the effectiveness of the field adjusting element. The effect of the size is dependent also on the location of the element. At one location the effect of the element on the measured energy transfer and other heating parameters and in another it is not. In general, when the element is in the direction of the directivity of the antenna it has a relatively large effect.

Additionally, the relation of height to radius of a chamber, and the geometric design (e.g. box shape vs. cylinder shape) are known affect the dissipation pattern of the chamber and the modes within the chamber. In designing a device according to some embodiments of the present invention, a simulation or trial error measurement of dissipation may be used to select a chamber being better suited, e.g. having wider dissipation peaks (low Q factor) in the object, or more adaptable (i.e. enabling a more dramatic change of the dissipation pattern, using similar field adjusting elements, for example as detailed below) for the desired heating.

An aspect of some embodiments of the invention is concerned with feeds used for feeding a cavity. According to an embodiment of the invention, energy is fed into the cavity via a coaxial input and the center conductor of the coaxial input is extended past the wall of the cavity to form a partial loop. In an exemplary embodiment of the invention, the end of the extension is not attached to the wall of the cavity. Optionally, the partial loop comprises an antenna that radiates toward the position of the object being heated to improve power transfer to the object.

According to another embodiment of the invention, the energy is fed into the cavity via a helical antenna optionally fed via a coaxial input. Optionally, the helix period, its diameter and/or its orientation are adjustable, thereby changing the modes and dissipation within the chamber. In some embodiments of the invention, one or more of the inputs utilize a right hand rotating helix while others utilize a left hand rotating helix. This may minimize coupling between the helices. Alternatively, all helices have the same orientation.

According to yet another embodiment of the invention, fractal antennas are used at one or more of the inputs.

According to some additional embodiments of the invention, different antenna types are used at different input ports.

In accordance with some embodiments of the invention antennas are designed according to a wavelength correction factor that converts the free space center wavelength of an antenna to the effective center frequency in the cavity. The inventors have found that this conversion is substantially independent of the shape or size of the object being heated.

An aspect of some embodiments of the invention relates to a method of controlling the input of electromagnetic energy to a cavity of a heater.

In an exemplary embodiment of the invention one or more characteristics of the heater are adjusted during heating of an object, responsive to changes in the object or during initial adjustment of the heater. In an exemplary embodiment at least one of the (i) position and/or orientation of at least one field adjusting element and/or (ii) at the power of transmission in at least one frequency (or sub-band of frequencies) and/or (iii) characteristics of one antenna structure or more and/or (iv) the location of the heated object are adjusted to improve the net power and/or efficiency and/or uniformity of energy transfer to the object being heated. Optionally, two or more of input frequency, position and/or orientation of at least one field adjusting element are adjusted In an exemplary embodiment of the invention, the frequencies of the inputs are substantially different. While in the prior art cited above, the frequencies are allowed to differ by up to 6 MHz, in the exemplary embodiment of the present invention, the frequencies may differ by 10, 20, 50, 100 or even several hundreds of MHz. This allows for greater flexibility in providing power evenly to the object. In prior art, by immersing the object in an anti-freezing liquid, uniformity of the object was achieved. This resulted in a system in which the characteristics of the liquid were dominant, the frequency changed little during heating, but the object itself was not well matched to the microwave environment. Moreover, at times it is preferred not to subject the object to uniformity induction (e.g. exposure to a fluid that might be hazardous to biological material or consumption or damage the taste or structure of food).

Optionally, the chamber environment is controlled using conventional environmental control elements (such as introduction of humidity, cooling or warming), is provided to the outside of the object. Such external cooling may allow avoiding overheating of the outside. Alternatively, some heating may be provided to the outside to start the defrosting process. This may help prevent recrystallization, or in the case of an egg being boiled, the heating would reduce the temperature gradient (and therefore stress) across the egg shell, thus reducing the chances of cracking and bursting. Accordingly, in some embodiments of the invention, heat radiating, concentrating or reflecting elements are provided on the outside or within the object being heated. Control of the humidity can provide moisture to the object being heated to avoid drying out of the object. For some objects, such as meat, it can cause a moisture retaining layer to be formed on the object, to avoid drying out of the object.

In some embodiments of the invention, RF sensitive objects are placed on or near the object being heated. Such object may act as passive sources. Examples of such sources include a rod of metal, which acts as a dipole radiator or a metal powder which may be used as a reflector or a piece of foil which may shield a small portion of the object being heated.

In an aspect of some embodiments of the invention, the end of heating (e.g. the end of defrost or boiling) is automatically detected and the heating stopped. Alternatively, during heating, the characteristics of the heating process may be adjusted to take the dielectric properties into account (e.g., more power is transmitted at the phase change to avoid spending a long time in this process). In an embodiment of the invention, the phase change is sensed by a change in dielectric properties of the object, for example, as they are represented by various measurements of return loss and coupling of the feeds or a desired operating frequency. Optionally, the object may be encased in a bag which will comprise temperature sensors. Optionally, a thermocouple, IR sensor and/or optical sensor are used to determine end of defrost, cooking or other heating processes.

Optionally, during heating, current temperature of an object is determined, based on the amount of RF power needed for a certain kind of an object and an exact measurement of the RF power absorbed in the object, through the continuous knowledge of the efficiency of power transfer and the power into the feeds of the cavity.

An aspect of some embodiments of the invention relates to providing a microwavable package, wrapper, tag, attachment or other indicator including heating instructions which indicate a desired driving profile for RF signals, rather than mere power as a function of time. In an exemplary embodiment of the invention, the indicated profile comprises an index to a table or a simulation which generates RF driving profiles including multiple frequencies. Optionally, at least 3, at least 5 or more distinct frequencies and/or one or more ranges of frequencies are indicated. Optionally, the driving profiles include one or more of number of inputs to use, phase of the input(s), temporal schedule and/or package relative information, such as package thermal and RF behavior.

In an exemplary embodiment of the invention, resonant circuits are embedded in the object and/or on its surface (as for example in a bag in which the object is packaged). Such sensors may be identified by performing a frequency scan and looking for a change in input impedance at the resonant frequency. Such circuits can be used to identify the object.

If the bag is provided with temperature sensitive elements, then they can also be used to determine temperature (and detect the end and/or progress of the heating process). Optionally, the frequency of these circuits is far from frequencies generally used for heating. Alternatively, the heater is configured so as not to transmit power in the frequency that interacts with the specific resonance structure (while potentially transmitting higher and lower frequencies).

Thus, in accordance with an exemplary embodiment of the invention there is provided a method of freezing at least a portion of an RF absorbing body (e.g. a body containing biological matter) comprising:

exposing the exterior of at least a portion of the body to a coolant having a temperature below the freezing point of the body, and at the same time operating an electromagnetic heater comprising a resonator to heat inside said resonator at least a part of said portion of the body, as to maintain said at least part of said portion of the body at a temperature above its freezing point; and reducing the electromagnetic heating to allow said at least a part of the body to freeze.

In accordance with another exemplary embodiment of the invention there is provided a method of freezing at least a portion of an RF absorbing body (e.g. a body containing biological matter) comprising:

exposing the at least a portion of the body to a coolant having a temperature below the freezing point of the body, and at the same time operating an electromagnetic heater comprising a resonator to heat inside said resonator the at least a portion of the body, as to maintain the at least a portion of the body at a temperature above its freezing point; and reducing electromagnetic heating, to which a part of the at least a portion of the body is exposed, to allow said part to freeze.

In accordance with another exemplary embodiment of the invention there is provided a method of freezing at least a portion of an RF absorbing body (e.g. a body containing biological matter) comprising:

exposing the at least a portion of the body to a coolant having a temperature below the freezing point of the body, and at the same time operating an electromagnetic heater comprising a resonator to heat inside said resonator at least a part of said portion of the body, as to maintain said at least part of said portion of the body at a uniform temperature above its freezing point; and reducing the electromagnetic heating to allow said at least a part of the body to freeze.

According to a preferred embodiment of the invention, operating an electromagnetic heater comprising operating the heater to produce electromagnetic waves having a frequency that is at least the resonant cutoff of said resonator. Optionally, the frequency is at least 10 MHz.

Optionally, exposing to a coolant comprises putting in a freezer. Alternatively or additionally, the coolant comprises a solid. Optionally, the coolant is solid.

Optionally, reducing the EM heating comprises taking said at least a part of the body out of the resonator.

In an exemplary embodiment of the invention, operating an electromagnetic heater comprises applying electromanetic radiation absorbed more efficiently by the body than by the coolant. Optionally, the electromagnetic radiation comprises microwave radiation. Alternatively or additionally, the electromagnetic radiation comprises RF radiation.

In an exemplary embodiment of the invention, heating comprises heating to a substantially uniform temperature. Optionally, the substantially uniform temperature is above the freezing point of the body, in at most 20° C. Optionally, the uniform temperature is above the freezing point of the body in at least 2° C. Optionally, the uniform temperature is above the freezing point of the body in at most 2° C.

In an exemplary embodiment of the invention, reducing the heating comprises reducing the heating of the entire body at once. Alternatively, reducing the heating comprises reducing the heating in at least one region so that said at least one region freezes, and then reducing the heating in at least one other region, so that the at least one other region freezes. Optionally, said one other region is adjacent to said one region. Optionally the heating of one region is reduced responsive to a signal indicative of the temperature of an adjacent region or presence of frozen aqueous portion in an adjacent region.

Optionally, in the border between a region where the heating is reduced and a region where the heating is not reduced a freezing front is created, and the freezing front is moved as the heating is selectively reduced. Optionally, the freezing front is moved in a rate responsive to a signal indicative of the temperature or presence of frozen aqueous portions in a region where the heating is reduced, said region being at the freezing front or adjacent thereto.

In an exemplary embodiment of the invention, reducing the heating applied to a region of a body comprises shielding said region of the body from the heating. Optionally, shielding a region of the body comprises moving the region of the body, into a cut-off wave guide, which cuts off the radiation used for heating the body to an extent that the body region inside the cut-off wave guide freezes. Optionally, the shielding comprises shielding with a hollow absorbing body, which by itself absorbs at least part of the selective heating, and this way prevents the at least part of heating from reaching to the shielded body.

In an exemplary embodiment of the invention, heating comprises creating a heating zone inside the heater, and reducing the heating comprises changing the shape of the heating zone.

In an exemplary embodiment of the invention, heating comprises creating a heating zone inside the heater, and reducing the heating applied to a region of the body comprises moving said region out of the heating zone. Alternatively or additionally, heating comprises creating a heating zone inside the heater, and reducing the selective heating applied to a region of the body comprises changing the location of the heating zone.

In exemplary embodiments of the invention, the body is selected from a blood unit, a tissue, an organ, an organism, food, or any portion thereof. Optionally, the food is selected from fruit, vegetables, dairy produce, sea food, partially prepared food, ready-to-eat food, ground meat, and bread.

In an exemplary embodiment of the invention, the body is bulky. Optionally, the body is a fish. Optionally, said fish is a tuna fish.

It is also provided in accordance with an exemplary embodiment of the invention an apparatus for controlled freezing of an RF absorbing body (e.g. a body comprising biological material), the apparatus comprising:

a cooler, with a coolant at a temperature below the freezing point of the body;

a heater, comprising a resonant cavity, configured to create a heating zone in said body, such that regions of the body that are within the heating zone are selectively heated; and a control mechanism, configured to control one or more of the cooler, the position of the body and the heater to bring the body to a uniform temperature above the body's freezing point while the coolant is below said freezing point.

Optionally, the apparatus comprises a shield for shielding at least a region of the body from being selectively heated.

In a preferred embodiment of the invention, the heater heats regions of the body by applying to the regions microwave energy absorbed by the regions.

In an exemplary embodiment of the invention, the apparatus has a control mechanism configured to control the location of the heating zone.

Optionally, an apparatus according to an embodiment of the invention comprises a control mechanism configured to control the shape of the heating zone.

In an exemplary embodiment of the invention, the cooler comprises a cooling fluid, which is less susceptible to heat generated by the heater than is a heated portion of the body. Optionally, the cooler comprises at least one solid block.

BRIEF DESCRIPTION OF THE DRAWINGS

FIG. 18A and FIG. 18B are graphic representations of uniform and non-uniform heating of a chunk of meat, cut as a steak, in which FIG. 18A shows the temperature changes during heating at two locations within the steak, a fat portion and a meat portion; and FIG. 18B depicts the temperature differences between the two locations; and FIG. 19A and FIG. 19B are graphic representations of uniform heating of a chunk of meat, in which FIG. 19A shows the temperature changes during heating at three different locations within the meat and FIG. 19B depicts the temperature differences between two pairs of the above three locations.

DETAILED DESCRIPTION OF EXEMPLARY EMBODIMENTS

Figure 1A:
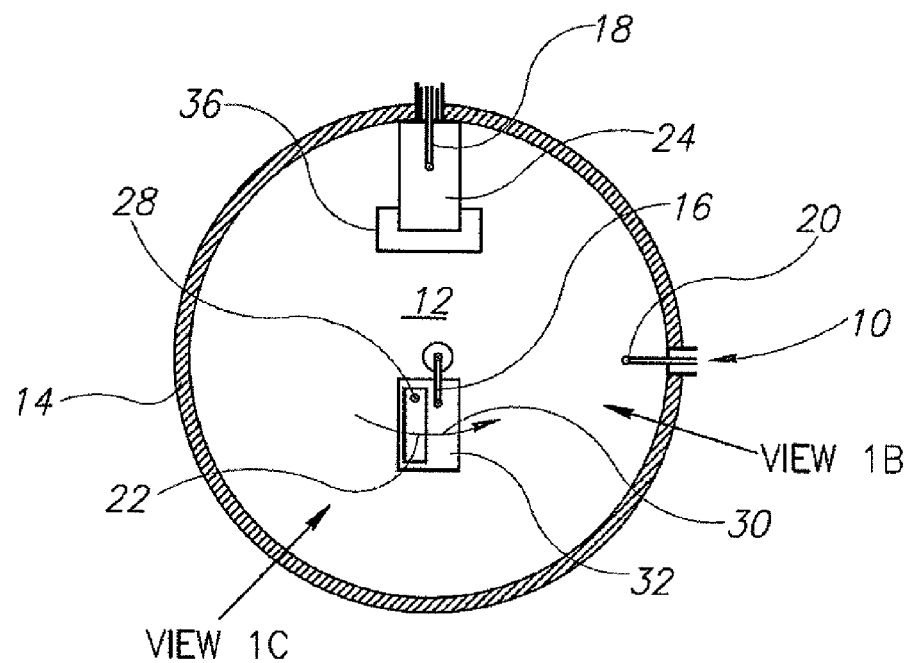
FIGS. 1A, 1B and 1C are respective schematic top and side section views of a cavity 10, in accordance with an exemplary embodiment of the invention.

The present application describes a number of advances in the field of RF heating (e.g. microwave or UHF) heating. While, for convenience these advances are described together in the context of various apparatus and methods, each of the advances is generally independent and can be practiced with prior art apparatus or method (as applicable) or with a non-optimal version of the other advances of the present invention. Thus, for example, parts of the method of adjusting the input power can be used with the prior art apparatus of Penfold, et al., referenced above. Conversely, the inventive apparatus of the present invention (or parts thereof) can be used with the method of Penfold et al. It is expected that these combinations will not be ideal, but they are expected to give improved results over the prior art apparatus and methods.

Furthermore, advances described in the context of one embodiment of the invention can be utilized in other embodiments and should be considered as being incorporated as optional features in the descriptions of other embodiments, to the extent possible. The embodiments are presented in somewhat simplified form to emphasize certain inventive elements. Furthermore, it is noted that many features that are common to most or all embodiments of the invention are described in the Summary of the Invention and should also be considered as being part of the detailed description of the various embodiments.

The following are believed to be novel features or variations present in some or all the embodiments described. It is understood that not all of these features may be present in any particular embodiment and that not all features are described for every embodiment for which they are applicable.

1) An apparatus and method that allow for RF heating an irregular object such that the temperature of the object is uniform within 50° C. (optionally, to within 10, 6, 4 or 2° C.) when heating is completed. Exemplary embodiments provide this uniformity mainly by directly RF heating the object such that over 50% of the heating is by direct RF heating and not by conduction from other portions of the device. In some embodiments of the invention, such direct RF heating can reach 70, 80, or 90 or more percent.

2) An apparatus that includes field adjusting elements inside the cavity and method of designing and using same.

3) A heating apparatus with one or more coupling antenna for coupling energy into the cavity; a method of designing said antenna; and method of feeding energy to the heater including a method of tuning the radiated pattern of the antenna. This includes, utilizing an antenna array (with one or more feeds, having controlled phases), loop antenna, wide band antenna, fractal antenna, directional antenna, helix antenna, operating the antennas separately or coherently, designing the antenna to obtain a desired radiated pattern etc.

4) An apparatus and method to gain knowledge of a heating process before, and potentially also several times during, heating (e.g. several times a second) using a measurement of the efficiency of absorption of energy in the object being heated as function of frequency 5) An apparatus and method that is adapted to control one or more characteristics of the heating process, for example the amount of power absorbed in the heated object, based on the measurement of energy absorption efficiency (e.g. by transmitting power to compensate for the variations of energy absorption). This may be done by adjusting, for example, input power at each transmitted frequency and/or choosing frequencies to be transmitted and/or moving the field adjusting element's and/or moving the heated object and/or changing the antennas characteristics. This may be done before operation, and preferably also one or more times during operation (e.g. several times a second), based on measurements of energy absorption during heating or during a short hiatus in the heating.

6) An apparatus and method for applying a DC or low frequency electric (e.g. below 300 MHz, or below some other value substantially lower that the heating frequencies used) or magnetic field to the object during RF heating. Such application is believed to change the dielectric properties of the object being heated and this provides yet another method of adjusting the power provided to the object being heated.

7) An apparatus and method in which during operation the transmitted frequencies and/or power from one or more feeds are varied in a controlled manner to get a desired heating pattern (e.g. by more than 1, 2 or 5 MHz). This variation may occur several times during operation (e.g. several times a second). In an embodiment of the invention, the desired pattern is a uniform heating pattern.

8) Apparatus and method of controlling heating based on reading of dielectric characteristics of the heated object. Reading may be obtained one or more times during heating (e.g. several times a second). For example end of thawing or boiling process, when a phase change is sensed. This can implement a cessation of heating.

9) An electromagnetic heater including multiple inputs in which the frequencies of the inputs are different by more than 5, 10 or 25 MHz.

10) An electromagnetic heater including multiple inputs in which the frequencies of at least one of the inputs changes dynamically during heating such that the frequencies at the inputs vary by 5 MHz or more.

11) An apparatus that utilizes a wideband and high efficiency (above 40%) solid state microwave amplifier to feed energy into the cavity and optionally utilize waste heat generated by the generator to heat the air in the cavity.

12) An apparatus that utilizes wasted heat generated by the RF energy generator to heat a medium, for example air in the cavity, or water, as in a water heater.

13) A method of causing a resonance structure and/or designed pattern, inside a resonator to radiate by (selectively or generally) irradiating said resonance structure and/or designed pattern thus using it as a radiation source (i.e. creating a passive source) and an apparatus comprising same.

14) Apparatus and method of using RF reflecting object, such as metals, for concentration of energy in close environment of these objects, inside a resonator, for example within the heated object or in the close environment of the heated object.

15) Apparatus and method of high-efficiency (at least 50%, at times above 70% or even 80%) RF heater. The efficiency is defined as power absorbed in the object versus power at the output of the power source. This opens the possibility of a heater that operates from a solar energy source.

16) An RF heater weighing less than 15 Kg, or even less than 10 Kg. In accordance with some embodiments of the invention a the use of a high efficiency solid state amplifier rather than a microwave tube allows for using a low weight DC power source instead of the heavy duty transformer. This heat saving is additional to the replacement of a heavy magnetron with a light solid state amplifier. Furthermore, the high efficiency eliminates the need for a heat sink, e.g. by using the resonator as a heat sink. In some embodiments of the invention, the requirement for a heat sink is obviated or partly reduced by feeding the waste heat from the amplifier back into the microwave cavity.

17) Apparatus and method of temperature information of a heated object using a TTT (a temperature sensitive, preferably passive Temperature transmitting tag the resonance of which changes due to temperature changes or which transmits the temperature information using a modulated response). This may be done if the TTT frequency is remote from the transmittal range of the device, or if the TTT's frequency is within the device's band width, and avoiding the specific TTT frequencies during heating. In some embodiments of the invention a tag having two resonant elements, one that is temperature sensitive and one that is not can be used since measurement of frequency difference is more accurate than measurement of absolute frequency.

18) An apparatus and method for RF heating including means for chamber environment control (e.g. introduction and/or removal of humidity, cooling and/or warming etc.). For example, in the case of an egg being boiled, heating would reduce the temperature gradient (and therefore stress) across the egg shell, thus reducing the chances of cracking and bursting. Optionally, the air temperature in the chamber may be varied with time, depending on the present temperature of the object and objectives such as causing condensation that closes the object being heated (such as meat).

19) An apparatus in which the power absorbed by the object being heated can be calculated based on knowledge of power input and efficiency of power transfer to the object being heated. This allows for the calculation of a current temperature and/or a turn off-time based on actual heating rather than some estimated heating time as presently used with microwave cookers.

Figure 1B:
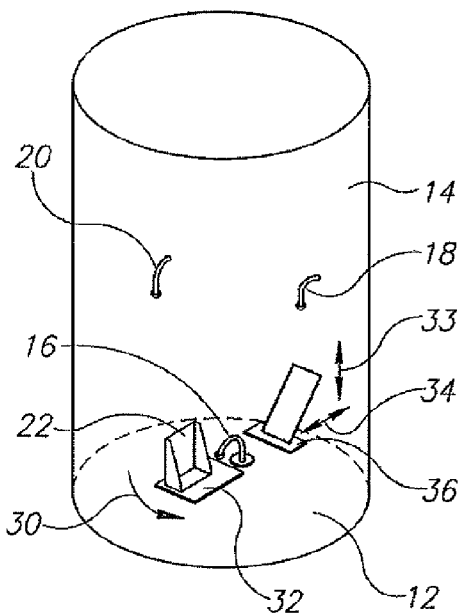
Figure 1C:
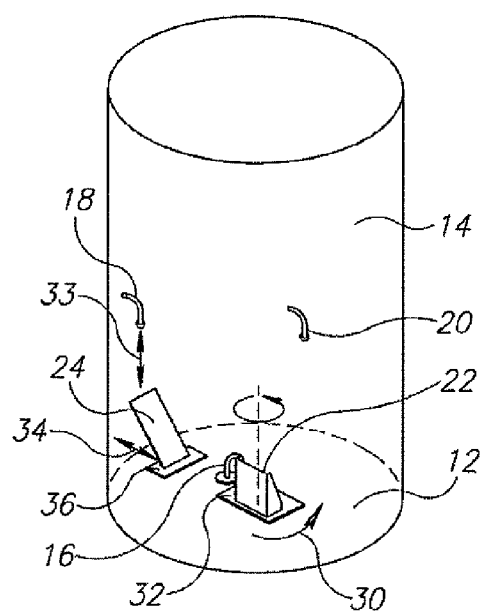

FIGS. 1A, 1B and 1C show respective top and side section views of a cavity 10, in accordance with an exemplary embodiment of the invention.

Cavity 10, as shown is a cylindrical cavity made of a conductor, for example a metal such as aluminum, and is resonant in the UHF or microwave range of frequencies, optionally between 300 MHz and 3 GHz, more preferably between 400 MHz and 1 GHZ. In some embodiments of the invention, the cavity is a spherical, rectangular or elliptical cavity. However, it should be understood that the general methodology of the invention is not limited to any particular resonator cavity shape. Cavity 10, or any other cavity made of a conductor, operates as a resonator for electromagnetic waves having frequencies that are above a cutoff frequency which depends, among other things, on the geometry of the cavity. The dependence of the cutoff frequency on geometry is well known in the art.

Figure 4A:
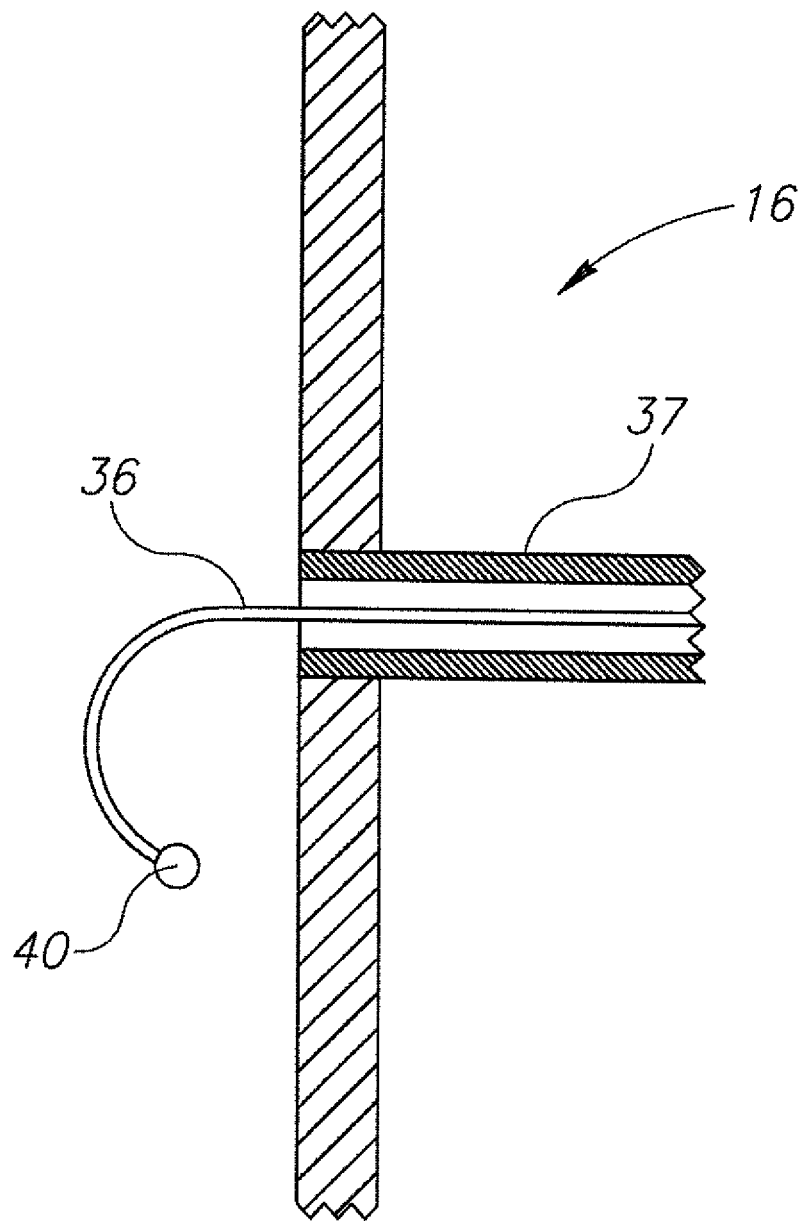
FIG. 4A is a schematic drawing of an antenna useful for coupling energy into the cavity, in accordance with an embodiment of the invention.
Figure 4B:
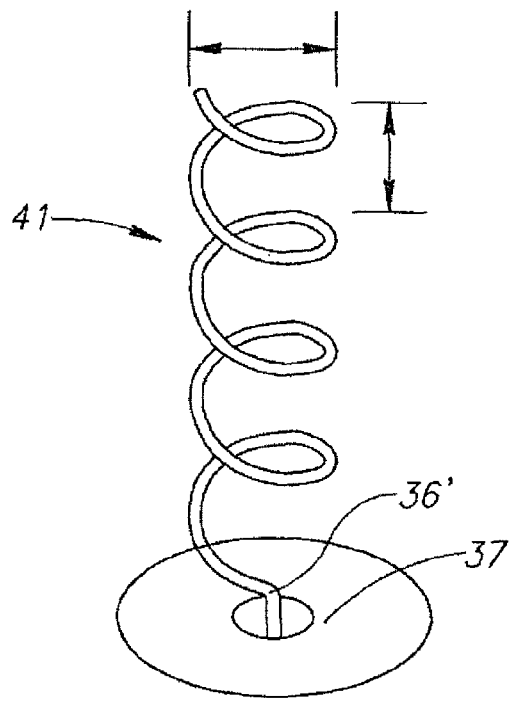
FIG. 4B is a schematic drawing of a helical antenna useful for coupling energy into the cavity, in accordance with an embodiment of the invention.
Figure 4C:
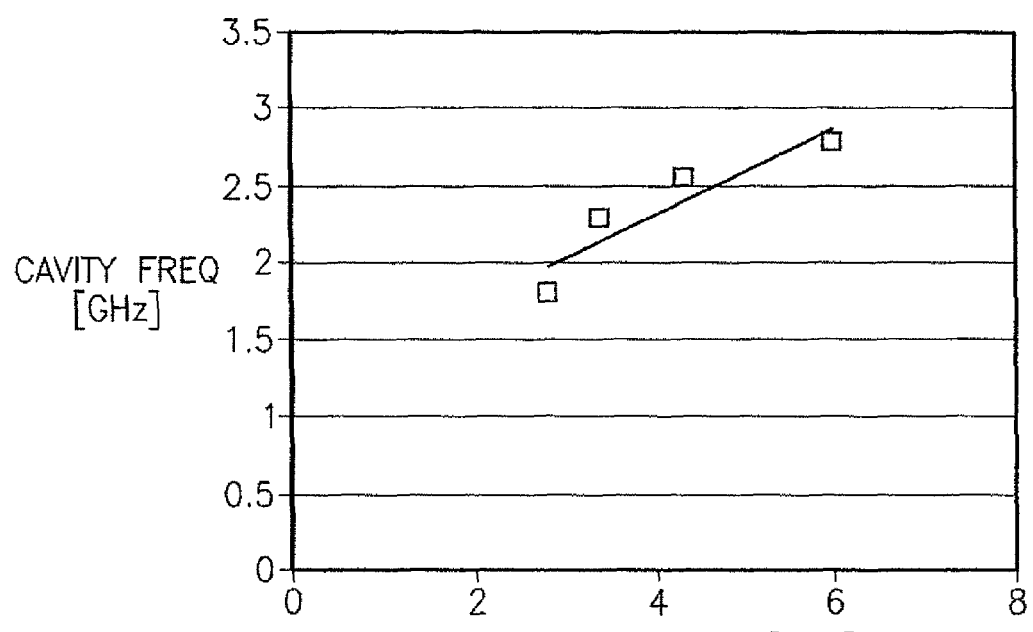
FIG. 4C shows a graph of correlation of free space matched frequencies and cavity matched frequencies of a helical antenna feed.

On one end 12 of the cylinder and on two sides of the cylindrical portion 14 feed antennas 16, 18 and 20 are positioned to feed energy at a frequency which is optionally chosen using the methods described below. Exemplary but not limiting antennae useful in carrying out the invention are shown in FIGS. 4A-4C.

Figure 2A:
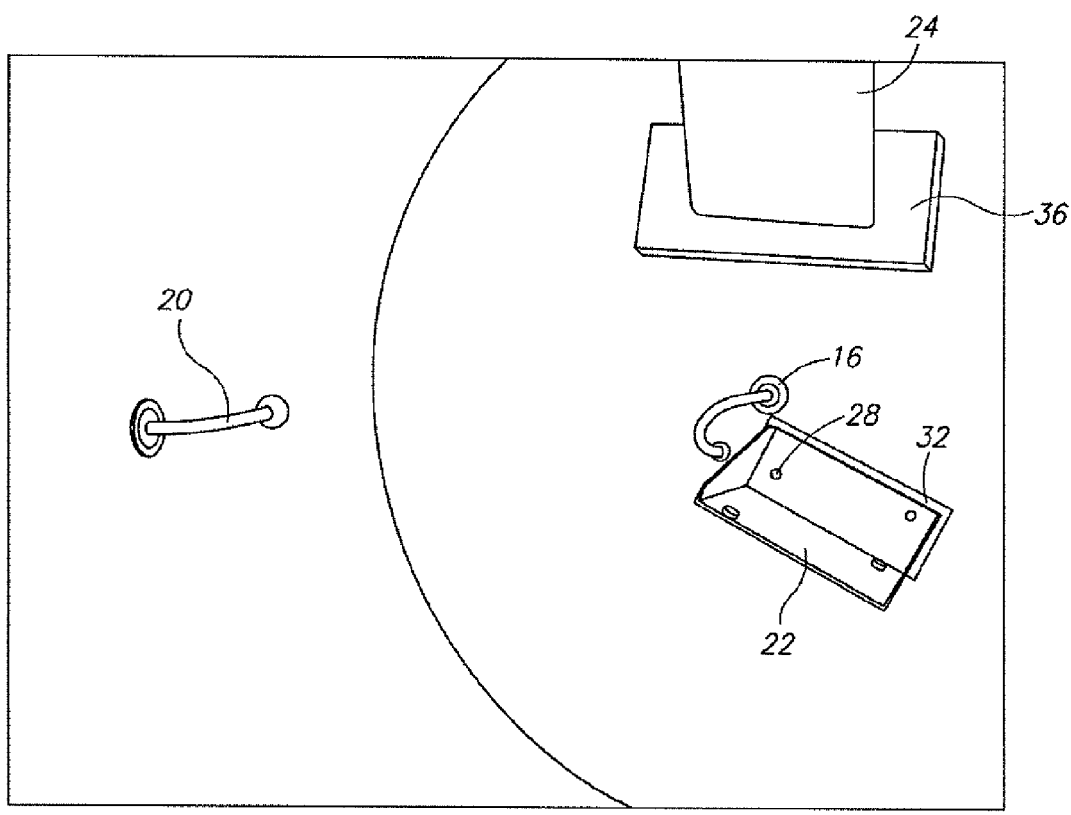
FIGS. 2A and 2B show two exemplary matching elements, in accordance with an embodiment of the invention.

In an exemplary embodiment of the invention, one or more matching elements 22, 24 are placed inside the cavity, optionally near the feed antennas. Two types of field adjusting elements are shown, however, other shapes and materials can be used. First field adjusting element 22, shown more clearly in FIG. 2A is situated on end 12 of cavity 10. In this embodiment the element is rotatable about an axis 28 attached to the end, in a direction 30. Optionally, it is insulated from the end by an insulating sheet 32 which couples element 22 capacitively to end 12. Alternatively it is conductively attached.

It is believed that element 22 (as well as the other field adjusting element) has a dual effect, when properly adjusted. On the one hand it changes the modes of the cavity in a way that selectively directs the energy from the feeds into the object to be heated. A second and related effect is to simultaneously match at least one of the feeds and reduce coupling to the other feeds.

Figure 2B:
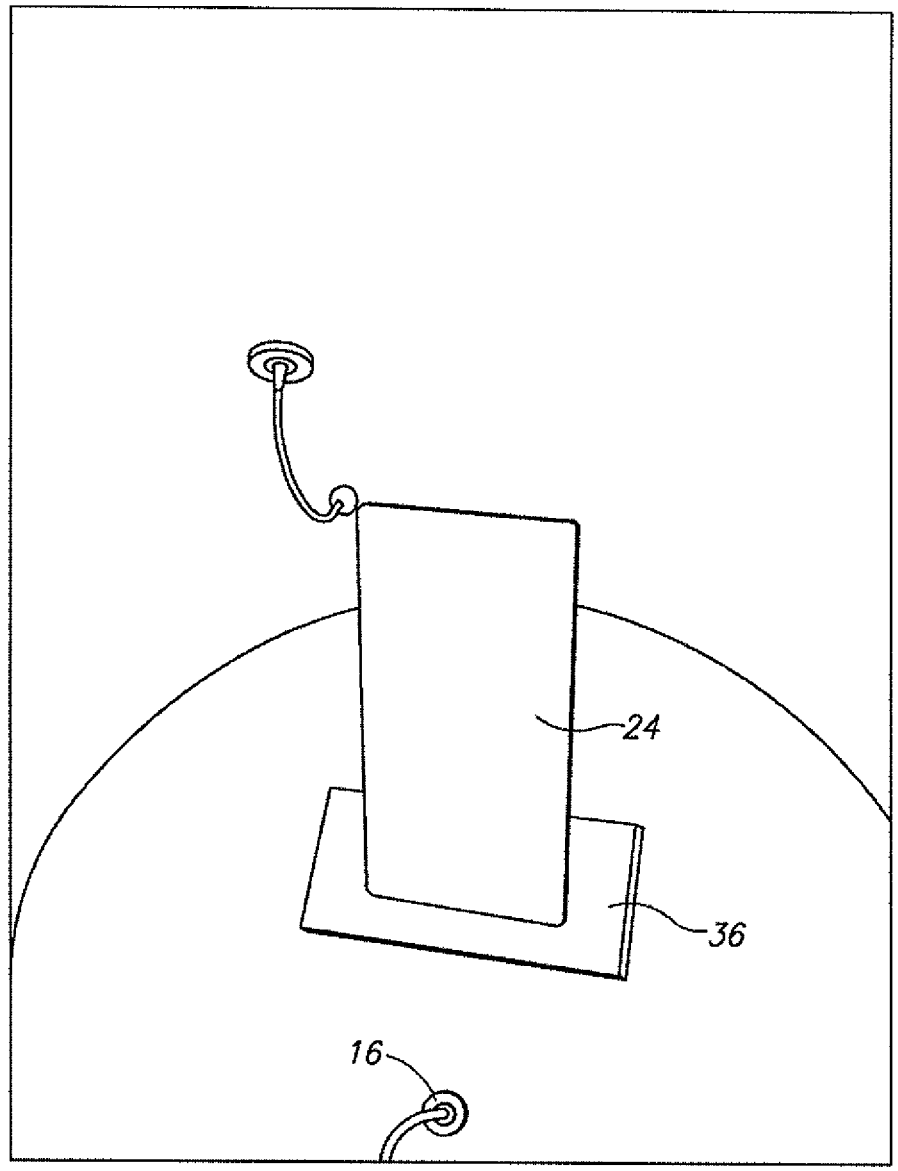

Field Adjusting element 24, shown more clearly in FIG. 2B is situated between feed 18 and end 12. One end of the element optionally is electrically attached to cylindrical portion 14 of the cavity. The other end of element 24 is spaced and insulted from end 12 by insulating material 36. It is free to slide along end 12 and cylindrical portion as shown by arrows 33 and 34. This sliding changes the spectral variation of the energy absorption efficiency.

Figure 3:
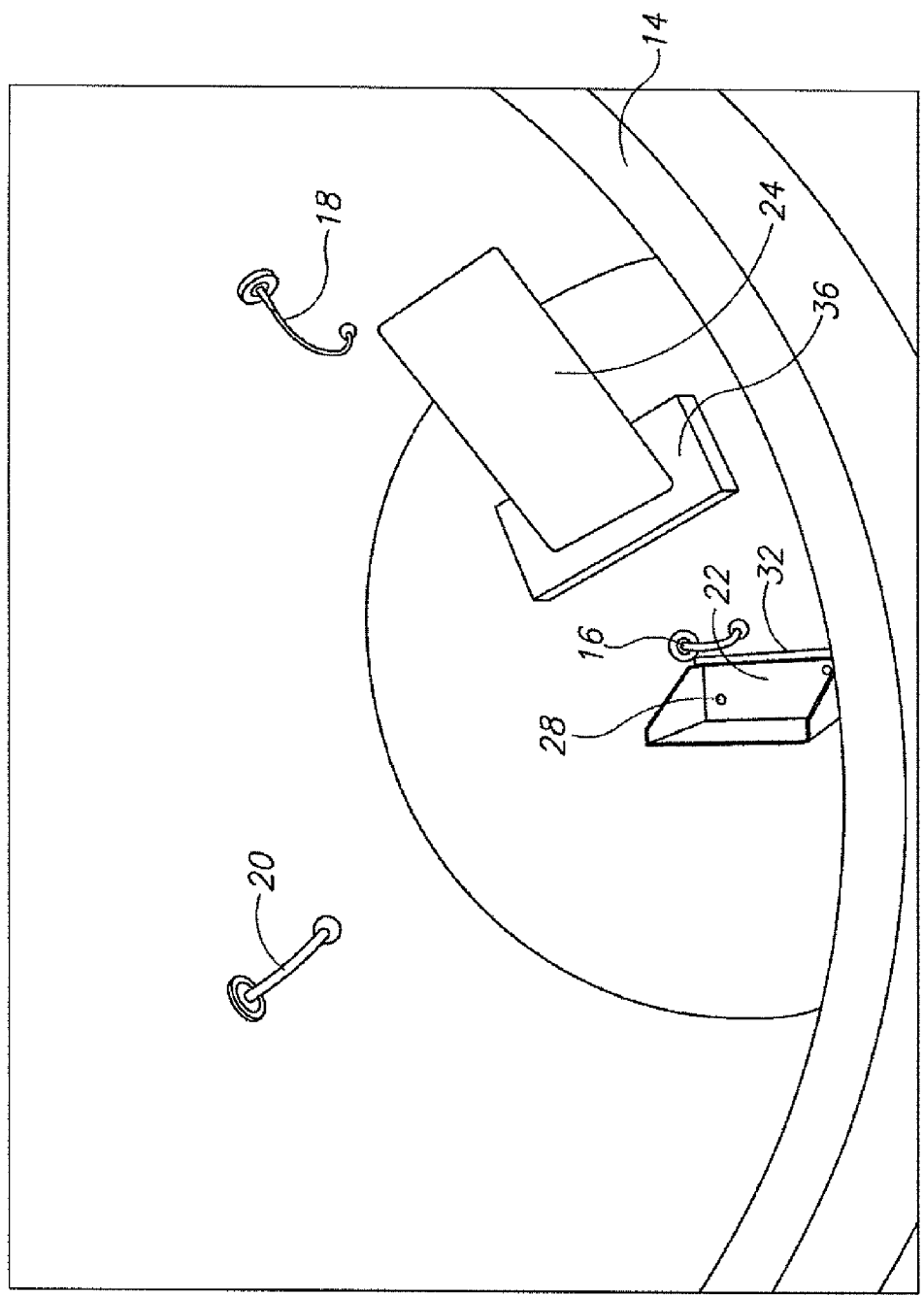
FIG. 3 is a schematic isometric drawing of the interior of the cavity of FIG. 1.

FIG. 3 is a perspective drawing of the interior of the cavity to more clearly show the position and orientation of the feed and elements.

FIGS. 4A-4H show three different types of antennas that are useful in carrying out the invention. These antennas are either novel per se, or if known have never been used for feeds in a microwave oven or heater, especially in a cavity type heater. In general, in most microwave cavity type heaters, the feeds used are not directional to any great extent and not wideband, as defined in free air. The object of the feeds is to excite the modes of the cavity. Since the cavities of the prior art are excited at a single frequency or a narrow band of frequencies, the antennas were designed specifically to excite these modes. In addition, prior art microwave cavities, use waveguides or loop antennas which are not designed to lower the coupling of energy from one feed to another (they generally have only a single feed). The present inventors have discovered that the use of directional antennae and/or wideband antennae allows for better coupling to the heated object and lower coupling to other feeds.

In some embodiments the antennas are supplied as arrays. There are some advantages in using an antennas array. The band may be larger and there is a lower dependence of the heated object location on the results. The directivity may be controlled, even adjusted during heating. It is possible to control the phase of every single antenna of the array, controlling the RF mode. It is possible to alter the antenna structure, for example, using the helix antenna, the radius and the height of the antenna may be changed in order to tune the impedance and change the RF mode.

FIG. 4A shows an antenna useful for coupling energy from feeds 16, 18 and 20 into cavity 10, in accordance with an embodiment of the invention. As shown, feed 16 includes a coaxial feed 37 with its center conductor 36 bent and extending into the cavity. The center conductor is bent but does not touch the walls of the cavity. Optionally, the end of the wire is formed with a conductive element 40 to increase the antenna bandwidth. The present inventors have found that antennas of the type shown are able to couple energy better to an irregular object in the cavity. It is believed that such antennas transmit directionally and if the bend is aimed toward the object being heated, then coupling to the object (as opposed to coupling to the cavity) will be improved.

FIG. 4B shows a helix antenna useful for coupling energy from feeds 16, 18 and 29 into cavity 10, in accordance with an embodiment of the invention. As shown feed 16 include a coaxial feed 37 with its center conductor 36' having an extension that is formed into a helix. This antenna can be designed for matching into free space over a relatively wide band of frequencies (such as that useful for the present invention) and can be made more or less directional by changing the number of turns. The free space design is then adjusted for the presence of the cavity as described below with respect to FIG. 4C. The graph of FIG. 4C shows experimental results for a helix of 7 turns, with a diameter equal to the free space wavelength and a turn pitch of less than 0.2 wavelengths. However, the present inventors have found that curves of the type shown in FIG. 4C can be found, by experimentation, for other turn characteristics as well.

Fractal antennas are known in the art. Reference is made to Xu Liang and Michael Yan Wan Chia, "Multiband Characteristics of Two Fractal Antennas," John Wiley, MW and Optical Tech. Letters, Vol. 23, No. 4, pp 242-245, Nov. 20, 1999. Reference is also made to G. J. Walker and J. R. James, "Fractal Volume Antennas" Electronics Letters, Vol. 34, No. 16, pp 1536-1537, Aug. 6, 1998. These references are incorporated herein by reference.

Figure 4D:
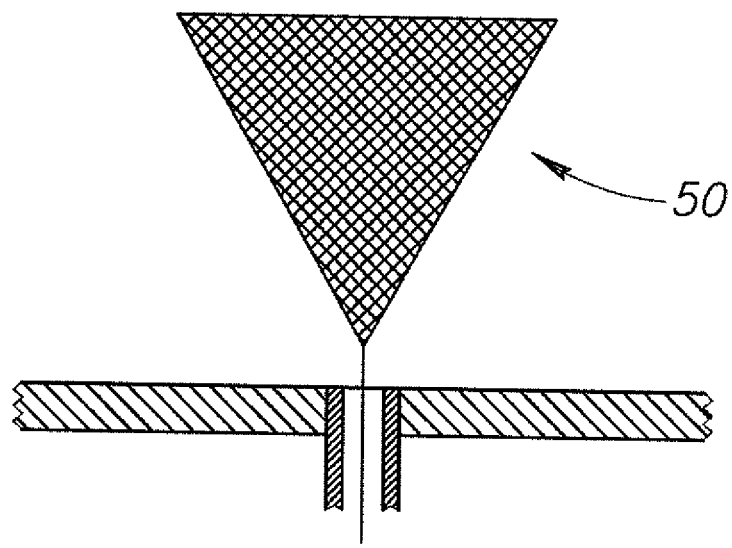
FIG. 4D-4H are schematic drawings of various fractal antenna useful for coupling energy into the cavity, in accordance with an embodiment of the invention.

FIG. 4D shows a simple bow-tie antenna 50 as known in the art, for radiation into free space. The Bandwidth of the bow-tie (in free space) is: 604 MHz @ 740 MHz center frequency (−3 dB points) and 1917 MHz @ 2.84 GHz center frequency. This antenna has a monopole directivity pattern but a broadband one (being an advantage over the narrow BW of a dipole antenna). However, monopole directivity does not irradiate in a direction parallel to the feed.

The band width (BW) of this antenna varies between 10 MHz and maximum of 70 MHz depends of the load (object) position inside the cavity.

This and the following fractal antennas can be useful in the present invention to feed energy into a cavity.

Figure 4E:
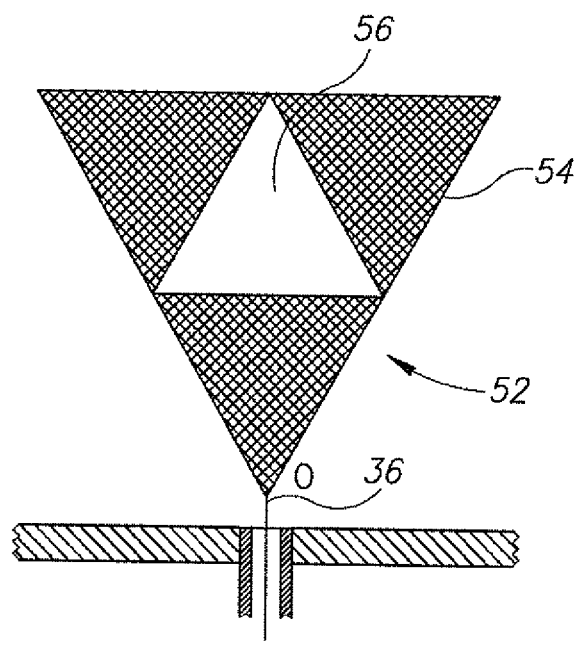

FIG. 4E shows a simple Sierpinski antenna 52, useful in the practice of the present invention. Generally, the cross-hatched areas 54 are metal plate and the white central area 56 is a non-conducting region. The metal plates are mounted on a preferably low dielectric constant dielectric and are connected at the corners and to center conductor 37 of coaxial feed 36, as shown. It's characteristics in the cavity are similar to those of the bow-tie antenna.

Figure 4F:
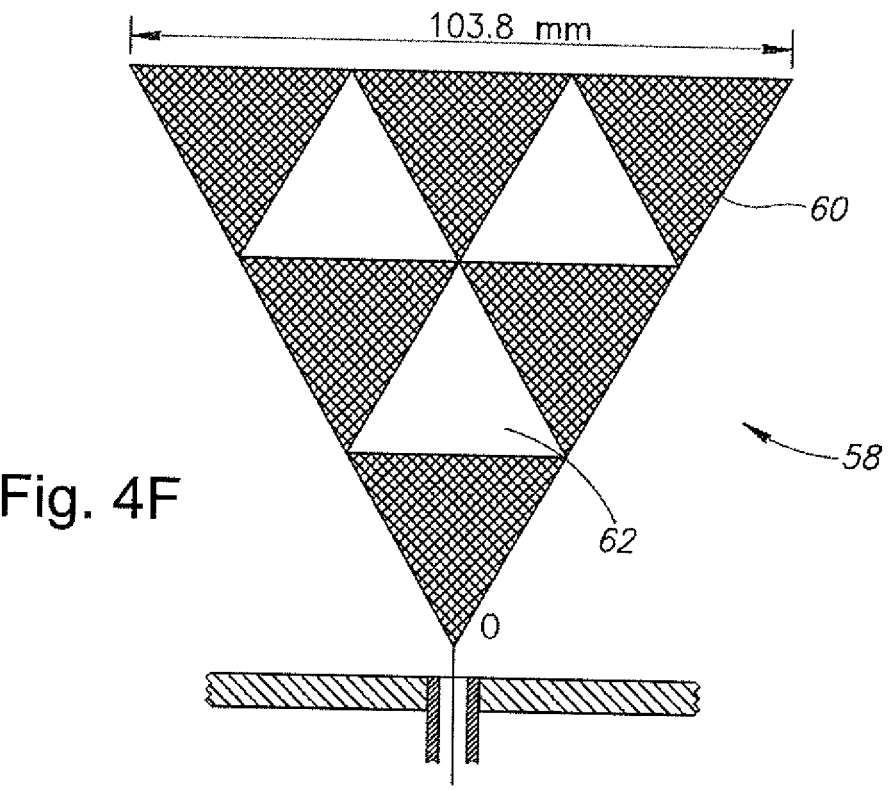

FIG. 4F shows a modified Sierpinski antenna 58, useful in the practice of the present invention. Generally, the cross-hatched areas 60 are metal plate and the white areas 62 are non-conducting regions. The metal plates are mounted on a preferably low dielectric constant dielectric and are connected at the corners and to center conductor 37 of coaxial feed 36 as shown.

For an overall extent of 103.8 mm utilizing equal size equilateral triangles, the center frequency of this antenna is about 600 MHz inside the cavity.

Figure 4G:
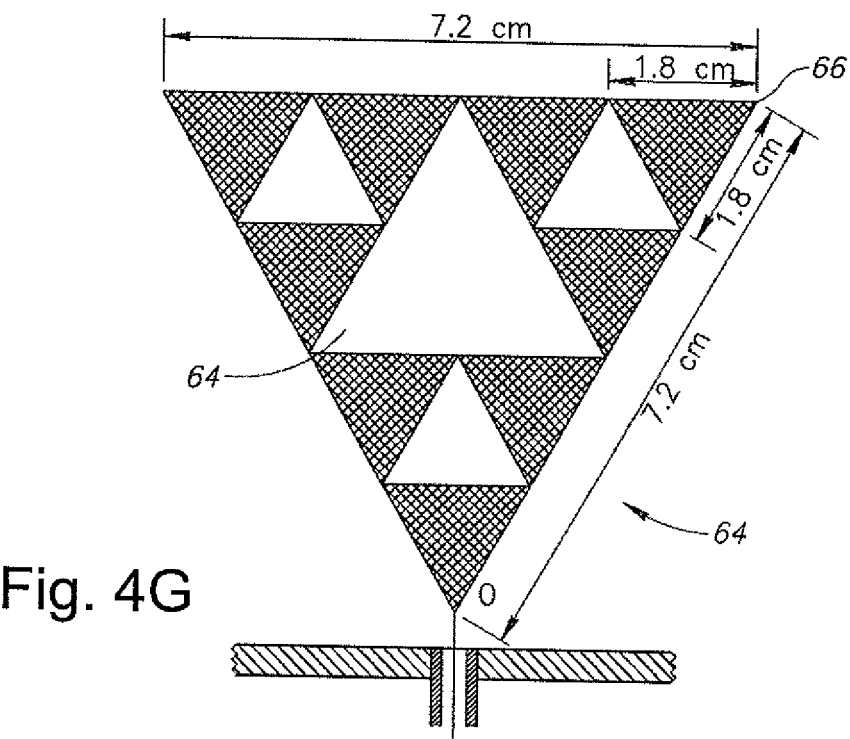

FIG. 4G shows yet another modified Sierpinski antenna 64, useful in the practice of the present invention. Generally, the cross-hatched areas 66 are metal plate and the white areas 68 are non-conducting regions. The metal plates are mounted on a preferably low dielectric constant dielectric and are connected at the corners and to center conductor 37 of coaxial feed 36.

Dimensions are shown on FIG. 4G for an antenna having a center frequency of 900 MHz in the cavity.

Figure 4H:
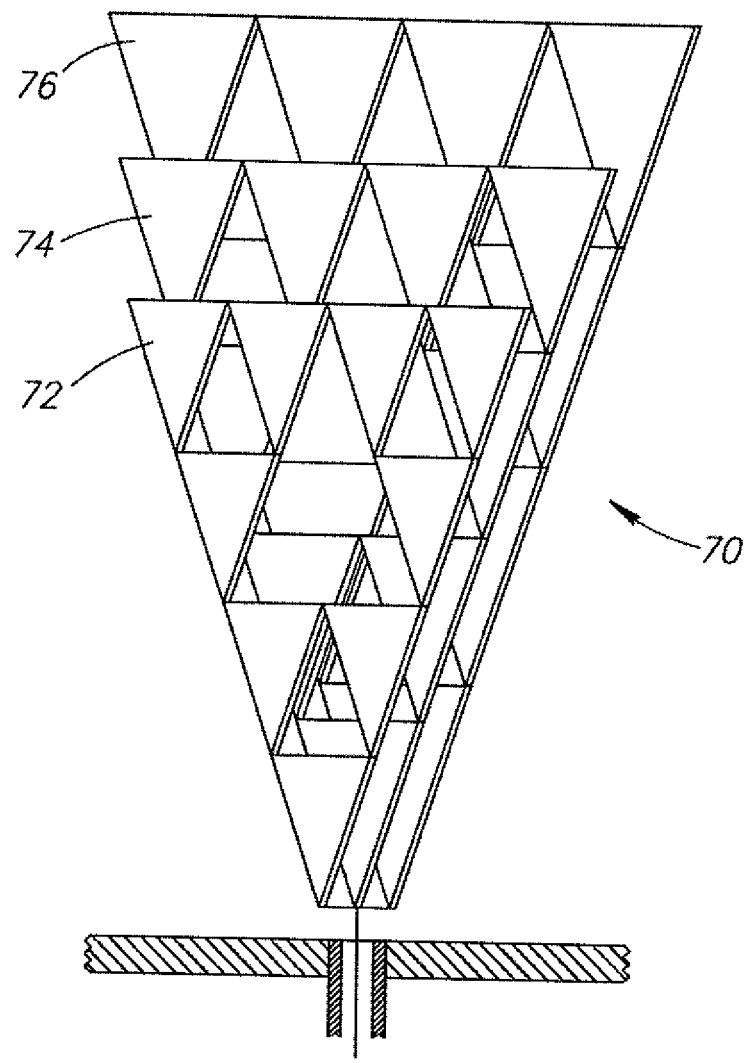

FIG. 4H shows a multi-layer fractal antenna 70 made up of three fractal antennas spaced a small distance (e.g. 2 mm) from each other.

The size of each of these antennas is staggered in order to broaden the bandwidth of the antenna. In the example shown a first antenna 72 is scaled to 0.8 of the dimensions given in FIG. 4G. A second antenna 744 has the same dimensions as the antenna of FIG. 4G and a third antenna 76 is increased in size over antenna 74 by a factor of 1.2. The volume fractal antenna (FIG. 4G) has an overall bandwidth of 100 MHz—this is an improvement over the 70 MHz maximum BW achieved in prior single fractal antenna (FIGS. 4D-4H).

Fractal antennas also show a center frequency change when placed in a cavity. This difference is used (as with the helical antenna to design antennas for use in cavities by scaling the frequencies.

In general, it is desired to utilize wideband, directional antennas to feed power into the object being heated such antennas include patch antennas, fractal antennas, helix antennas, log-periodic antennas and spiral antennas.

FIGS. 5A to 5D are schematic block diagrams of an electromagnetic heating system, in accordance with an embodiment of the invention.

Figure 5A:
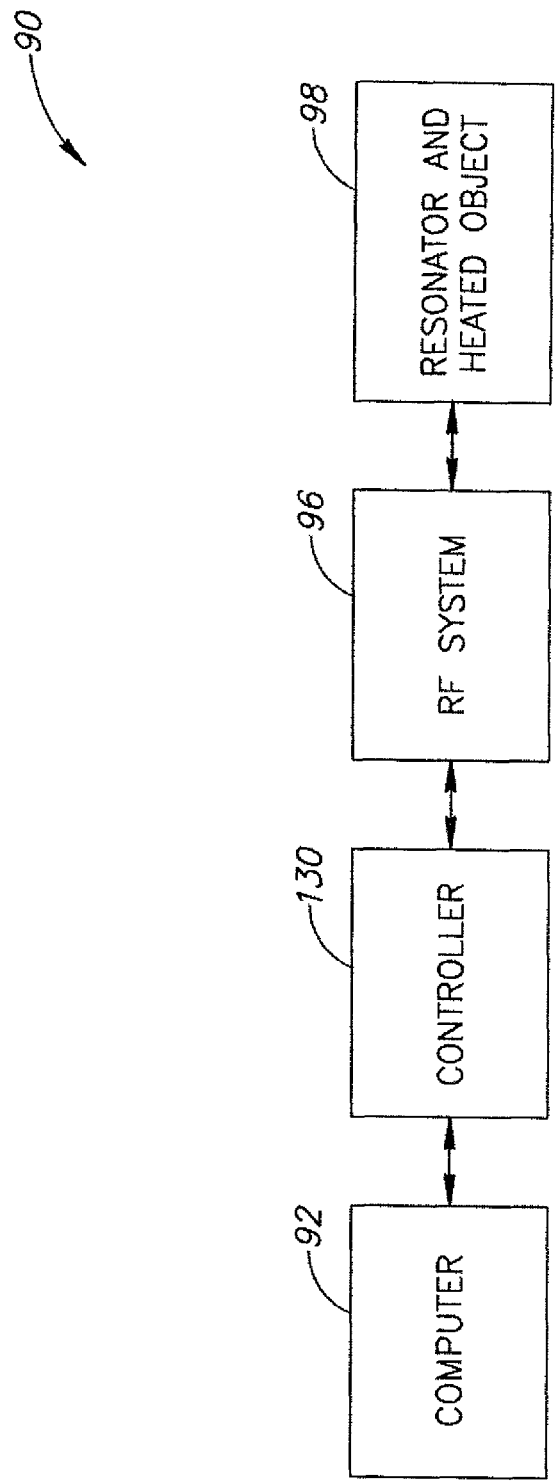
FIGS. 5A-5C are schematic block diagrams of electromagnetic heating systems, in accordance with an embodiment of the invention.

FIG. 5A shows a general block diagram of each of the power feeds 90 of the system, in an exemplary embodiment of the invention. The system is controlled by a computer 92 which via a control interface (Controller) 130 controls an RF system 96 which provides power to the heated object 98.

Figure 5B:
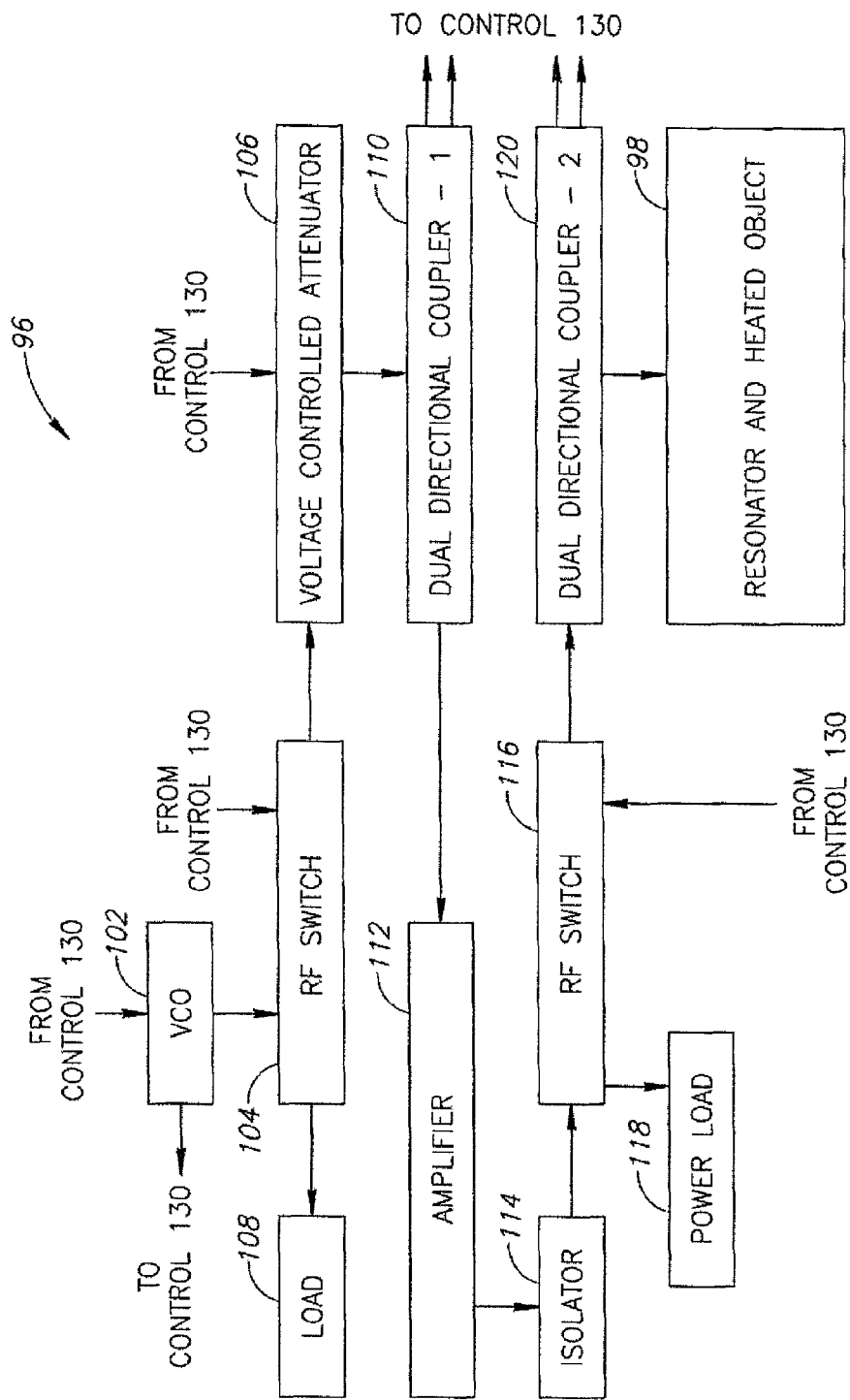

FIG. 5B is a block diagram of the electronics of one of the RF feed systems 96, in accordance with an exemplary embodiment of the invention. A VCO 102 receives a signal from a control circuit 130 (FIG. 5C) which sets the frequency of the energy into the port. This energy is passed through an RF switch 104 and a voltage controlled attenuator (VCA) 106, both of which are controlled by control circuit 130. After passing through the VCA, the power and frequency of the signal have been set. A load 108 is provided for dumping the signal generated by VCO 102 when the signal from VCO 102 is not switched to the VCA.

The signal is then sent through the main line of an optional first dual directional coupler 110.

The output of the VCA is then amplified by a power amplifier 112 and after passing though an isolator 114. A signal proportional to the power reflected from amplifier 112 is also fed to the control circuit.

Coupler 110 feeds back a portion of the signal entering it (after detection or measurement of power) to control circuit 130. A signal proportional to the power reflected by amplifier 112 is also sent to controller 130. These signals enable supervision of VCO/VCA and the amplifier. In a production system, the directional coupler may not be necessary.

An RF switch 116 switches the power either to a load 118 or to the feed of resonator 98, via a second dual directional coupler 120. Dual directional coupler 120 samples the power both into and out of the resonator and sends power measurement signals to controller 130.

In an embodiment of the invention, RF amplifier 112 is a solid state amplifier based on the LDMOS technology. Psat=300W, Efficiency=about 22%, Effective band–800-1000 MHz. Such amplifiers either have a relatively narrow bandwidth or a low efficiency (<25%) or both. This limits the optimal utility of the advances of the present invention. Recently, amplifiers have become available based on SiC (silicon carbide) or GaN (gallium nitride) semiconductor technology. Transistors utilizing such technologies are commercially available from companies, such as Eudyna, Nitronex and others. Amplifiers having a maximum power output of 300-600 W (can be built from low power (50-100 Watt) modules) and a bandwidth of 600 MHz (at 700 MHz center frequency) or a bandwidth of 400 MHz (at 2.5 GHz center frequency are available, for example. Such amplifiers have a much higher efficiency than prior art amplifiers (efficiency of 60% is available) and much higher tolerance to reflected signals, such that isolator 114 can often be omitted for these amplifiers. A particular configuration utilizing this type of amplifier is described below in conjunction with FIGS. 12A-D.

Figure 5C:
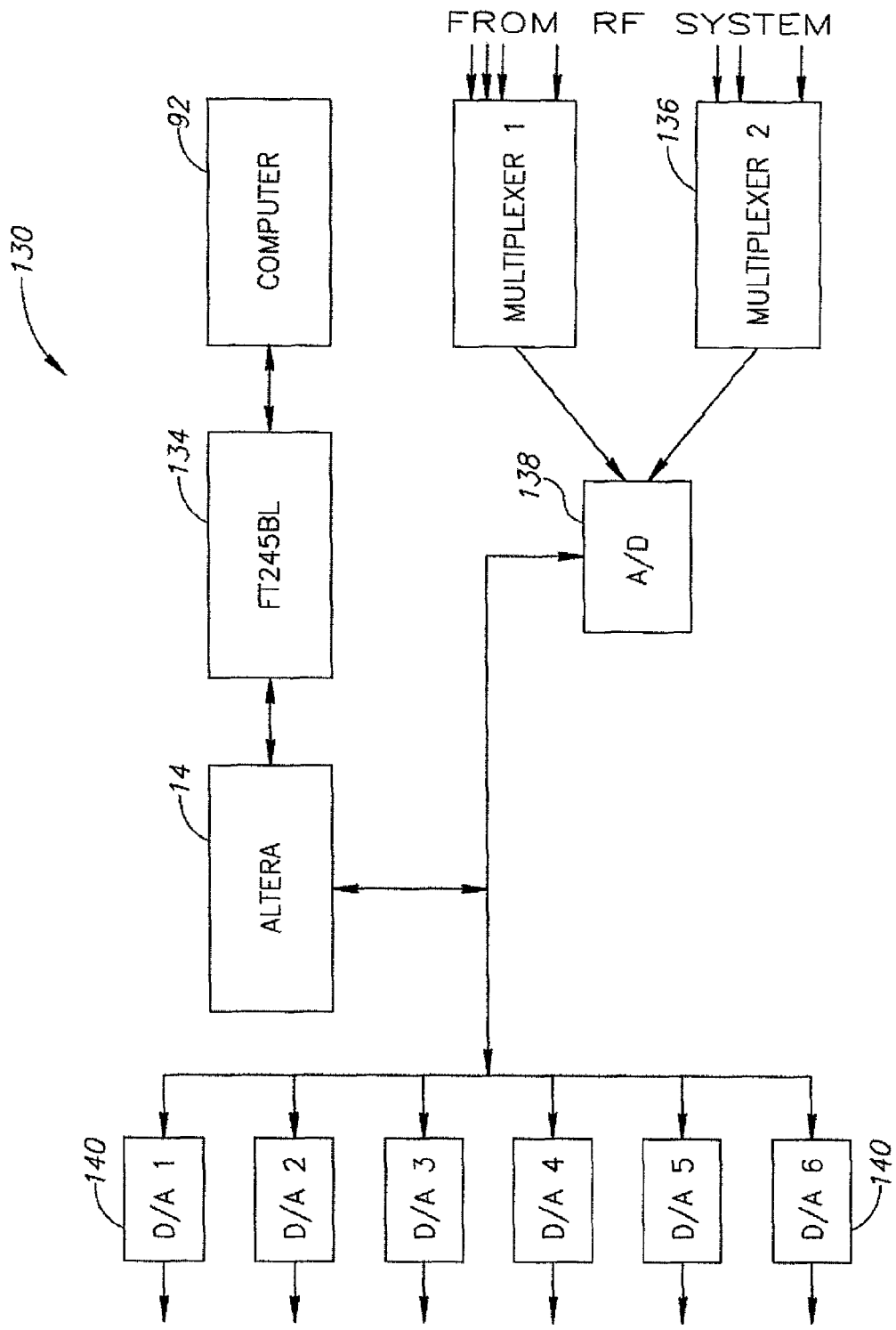

Turning now to FIG. 5C controller 130 comprises computer 92 which performs computations and provides a logging function of the system as well as acting as a user interface. It also controls the rest of the elements in performing the calibration and control method of the flow charts of FIG. 7.

Computer 132 is coupled to the rest of the system through an interface 134 which is designed to provide communication to, for example, an ALTERA FPGA 140, which interfaces with and provides control signals to the various elements of the RF system. The Altera receives inputs (as described above with respect to FIGS. 5A-5C), via one or more multiplexers 136 and an A/D converter 138. In addition, it sets the frequency and power of each of the feeds (also described with respect to FIGS. 5A and 5B) via D/A converters 140 and the positions of the field adjusting element optionally utilizing the method described with aid of the following flow charts. In a production system, the computer may not be necessary and the Altera or a similar controller may control and process all the necessary data. In some embodiments of the invention, the frequency is swept as described below.

Figure 6:
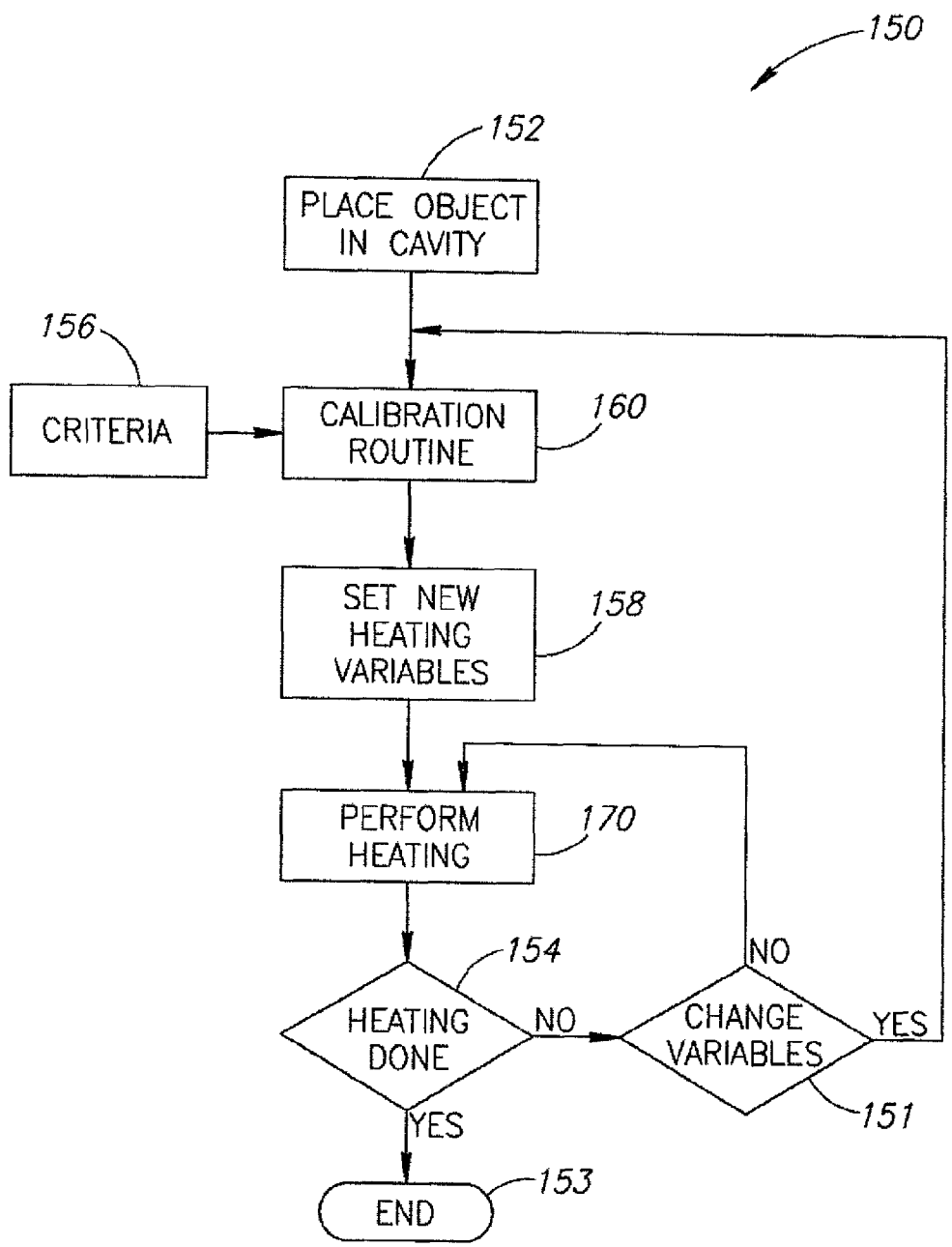
FIG. 6 is a simplified flow chart of the operation of the system, in accordance with an embodiment of the invention.
Figure 7:
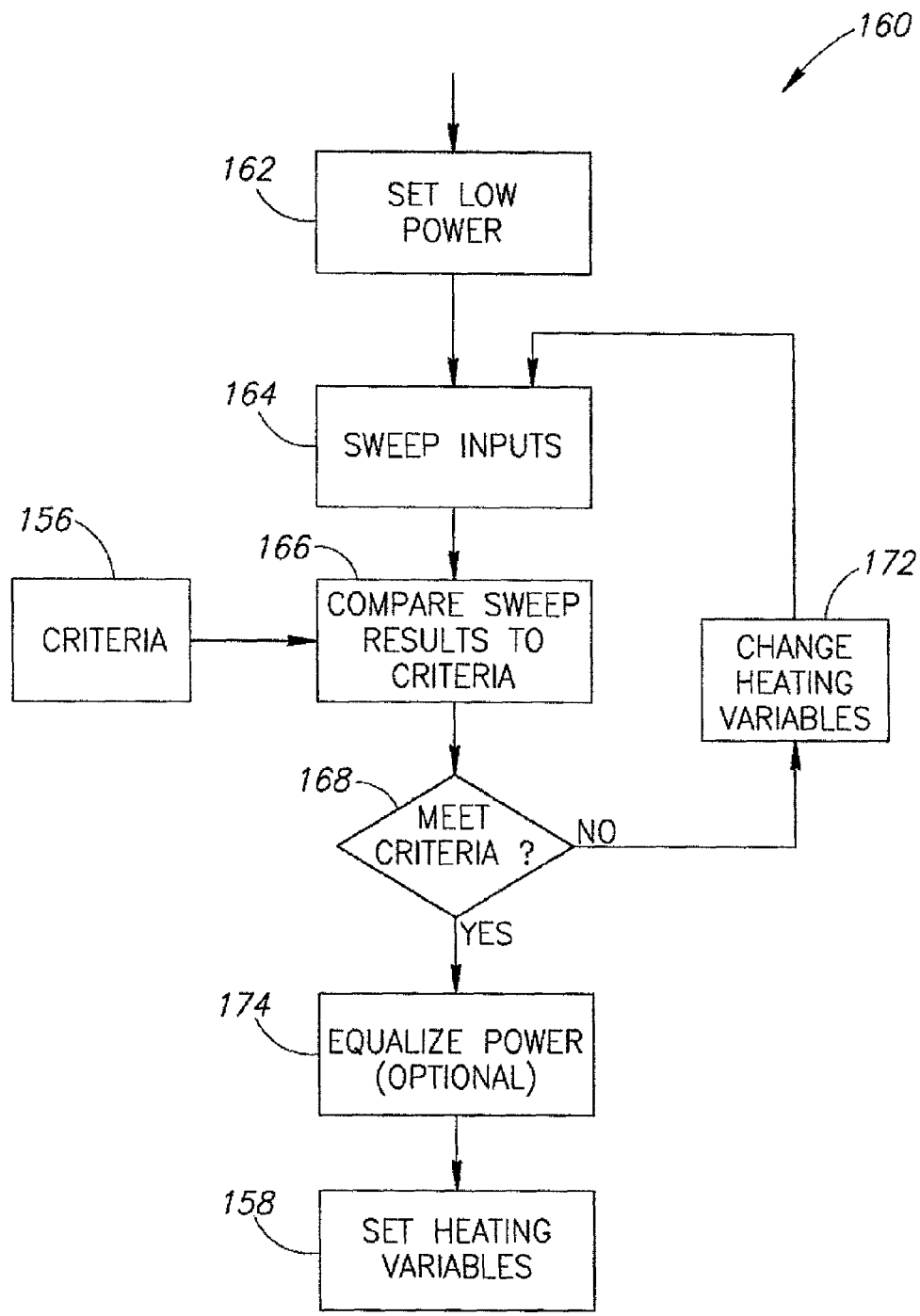
FIG. 7 is a flow chart of a process of adjusting elements and frequency in the heating system illustrated in FIG. 5, in accordance with an embodiment of the invention.

FIG. 6 is a simplified flow chart 150 of the operation of a heating system having the structure described above. FIG. 7 is a simplified flow chart of calibration 160 of the system. As will be evident, the method operation and calibration of the system is also usable with only minor changes for operating systems with lesser or greater numbers of power feeds and/or a greater or less number of matching elements.

At 152 an object, for example a frozen organ or frozen or non-frozen food object, is placed in cavity 10. A calibration or adjustment routine is then optionally performed to set the variable elements in the system. These can include power output of the amplifiers 112 in each of the power feeds to the cavity at each frequency, chosen to be transmitted, the finite set of sub-bands of frequencies of each VCO 102, the method of providing energy at the various frequencies (for example sweep or other frequency variation, or the provision of a pulsed signal embodying the desired frequency and power characteristics), positioning of the matching elements (e.g., 22, 24), position of the heated object and any other variables that affect the various characteristics of the heating process, for example—the uniformity and/or efficiency of power transfer to the object. A memory contains the criteria 156 for calibrating the system. Exemplary criteria are described below. Calibration is carried 160 out to determine the new heating variables. An exemplary calibration routine is outlined in the flow chart of FIG. 7, discussed below.

After the new variables are determined, the new variables are set 158 and heating commences 170.

Periodically (for example a few times a second), the heating is interrupted for a short time (perhaps only a few milliseconds or tens of milliseconds) and it is determined 154, optionally based on a method described below, whether heating should be terminated. If it should, then heating ends 153. If the criterion or criteria for ending heating is not met, then the calibration (or re-adjustment) routine 160 is entered. If not, the heating 170 is resumed. It is noted that during the measurement phase, the sweep is generally much broader than during the heating phase.

Calibration routine 160 for each individual channel will be described, with reference to the flow chart of FIG. 7.

In order to perform calibration, the power is optionally set at a level low enough 162 so that no substantial heating takes place, but high enough so that the signals generated can be reliably detected. Alternatively, calibration can take place at full or medium power. Calibration at near operational power levels can reduce the dynamic range of some components, such as the VCA, and reduce their cost.

Each of the inputs is then swept 164 between a minimum and a maximum frequency for the channel. Optionally, the upper and lower frequencies are 430 and 450 MHz. Other ranges, such as 860-900 MHz and 420-440 can also be used. It is believed that substantially any range between 300-1000 MHz or even up to 3 GHz is useful depending on the heating task being performed. When the broadband, high efficiency amplifiers described above are used, much larger bandwidth of several hundred MHz or more can be swept, within the range of the amplifiers. The sweep may be over several non-contiguous bands, if more than one continuous band satisfies the criteria for use in heating.

The input reflection coefficients $S_{11}$, $S_{22}$, and $S_{33}$ and the transfer coefficients $S_{12}=S_{21}$, $S_{13}=S_{31}$, $S_{23}=S_{32}$ are measured during the sweep and a net power efficiency is determined as (for port I for example), as:

$$\eta_1 = 1 - (\text{Reflected power from port 1} + \text{coupled power to ports 2 and 3})/\text{Input power}.$$

The present inventor has found that under many operating regimes it is desirable to maximize certain criteria.

In a first embodiment of the invention, the maximum net power efficiency for each port is maximized, in the sense, that the net power efficiency at a point of maximum efficiency within the sweep range is made as high as possible. The efficiency and the frequency at which the efficiency is a maximum are noted. Optionally, the width of the efficiency peak and a Q-factor are noted as well.

A second embodiment of the invention is based on a similar criterion. For this embodiment the area under each resonance peak of the net efficiency of transfer is determined. This area should be a maximum. The efficiency, the center frequency of the resonance having the maximum area and its width are noted.

In an embodiment of the invention, the criteria for determining if the variables are properly set is when the peak net efficiency (first embodiment) or the area or a width (second embodiment) is above some predetermined level or a Q-factor is below some predetermined level. For example, there may be a restriction that the area above 60% net efficiency is maximized for each of the feeds.

It is noted that energy that is neither reflected nor transmitted to the other ports is absorbed either in the walls of the cavity or in the object being heated. Since absorption in the conducting walls is much lower than that in the object by a large factor, the net efficiency is approximated by the proportion of the input power that is absorbed in the object. It is also noted that the frequency of maximum net efficiency is not necessarily the same as the frequency at which the match is best.

In an embodiment of the invention, the frequency is swept, optionally while adjusting the power. The term swept should be understood to include serial transmission of individual non-contiguous frequencies, and transmission of synthesized pulses having the desired frequency/power spectral content.

The present inventors have discovered that each frequency has maximal absorption at a specific location within an object within a cavity, which locations may vary between different frequencies. Therefore sweeping a range of frequencies may cause movement of the peak heating region within the object, Computer simulations have shown that, at least when the Q factor of a peak is low (i.e., a lot of energy is dissipated in the object being heated) the movement of the peak heating region can be quite substantial. Furthermore, the inventors have found that each mode (represented by a different peak of efficiency) acts differently when swept.

Figure 11A:
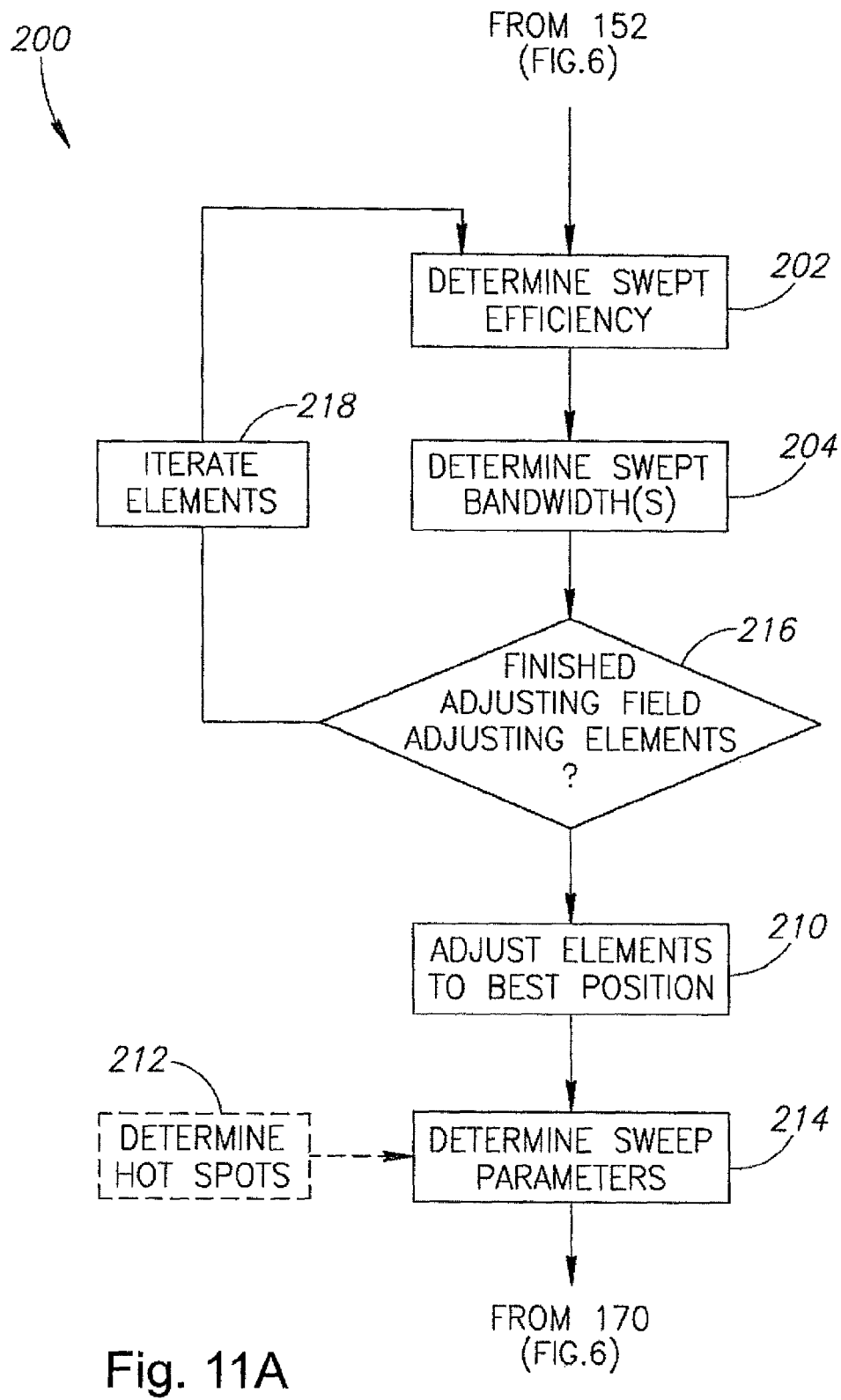
FIG. 11A is a simplified flow chart of a method of determining swept power characteristics, in accordance with an embodiment of the invention.

FIG. 11A is a simplified flow chart 200 of a method of determining swept power characteristics, in accordance with an embodiment of the invention. This method corresponds to acts 160 and 158 of the flow chart of FIG. 6.

After placing the object in the cavity (152) the cavity is swept to determine the input efficiency as a function of frequency (202) (e.g., obtain a spectral image). Determination of input efficiency is described in detail above. Alternatively, a pulse of energy, having a broad spectrum in the range of interest is fed into the input. The reflected energy and the energy transmitted to other inputs are determined and their spectrums are analyzed, for example using Fourier analysis. Using either method, the net power efficiency as a function of frequency can be determined.

Under some conditions, where similar objects have been heated previously, a set of tables for different types and sized of objects can be developed and used as a short-cut instead of closely spaced measurements.

Figure 11B:
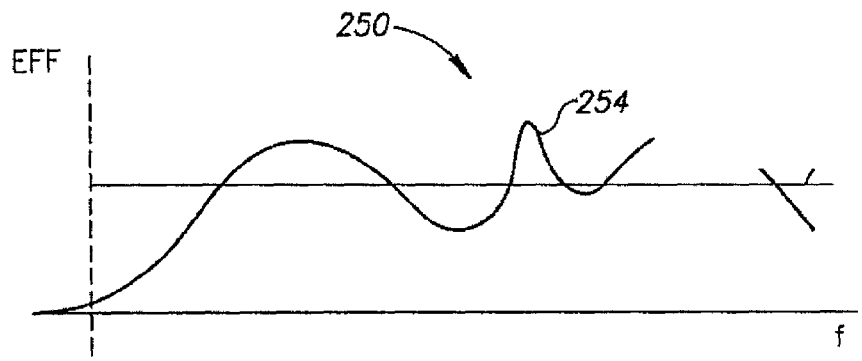
FIGS. 11B and 11C illustrate how a swept power spectrum is determined, in accordance with an embodiment of the invention.

FIG. 11B shows a simplified net power efficiency curve 250 at an input. It is noted that there are regions in which the efficiency is high and others in which the efficiency is low. Furthermore, some of the efficiency peaks are broader and others are narrower.

Next, the overall swept bandwidth (BW) is determined (204). This may include sweeping across a single peak or across several peaks.

In an embodiment of the invention, during the heating phase, the frequency is swept across a portion of each of the high efficiency peaks. For example, to provide even heating of objects it is believed that the power inputted to the cavity at each frequency should be the same. Thus, in an embodiment of the invention, the power at each frequency is adjusted such that $P*\eta$ is a constant for all the frequencies in the sweep. Since the power available is always limited to some value, this may set a limit on the available bandwidth for the sweep. An example of a lower limit to efficiency is shown as dashed line 252 in FIG. 11B. The sweep may be limited to frequencies having efficiency above this value.

Next, the positions of the field adjusting elements are set. This adjustment is optional and in some situations, even where such elements are present, they do not need to be adjusted. In general, the criterion for such adjustment is that the peaks have as high efficiency as possible with as broad a peak as possible Specific applications may introduce additional goals, such as moving the peak to a certain band.

An iterative process (206, 208) is used to determine a desired position and/or orientation of the field adjusting elements. When the search process which may be any iteration process as known in the art, is completed the elements are set to the best position found. (210).

In an embodiment of the invention, the sweep is adjusted (212) to avoid feeding excess power into certain parts of the object. For example, if the object contains a metal rod or a metal zipper, a high peak in efficiency 254 may be generated. A metal rod can cause a concentration of energy near the ends of the rod. Avoiding irradiation at this peak can sometimes reduce the effects of such objects on even heating.

Next, the sweep parameters are determined (214).

Figure 11C:
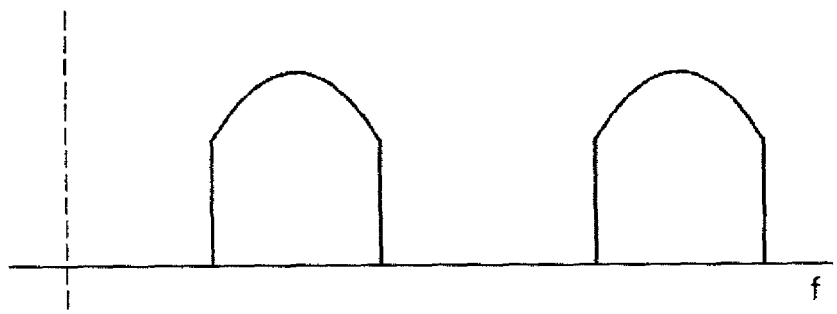
Figure 11D:
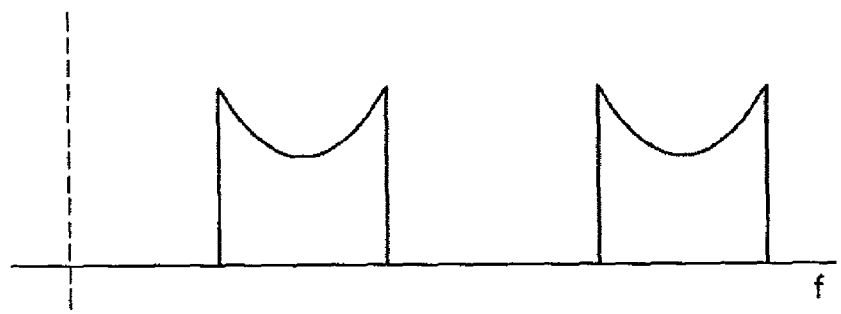
FIG. 11D shows a pulse shape, for a pulse operative to provide the spectrum shown in FIG. 11B, in accordance with an embodiment of the invention.

FIG. 11C shows the power spectrum 256 of energy to be fed to the input, in accordance with an embodiment of the invention. It should be noted that no energy is transmitted at the frequency characteristic of the rod and that for other frequencies for which the efficiency is above the minimum shown at 252 in FIG. 11B. The power has a shape that is such that the product of the efficiency 11 and the power fed is substantially constant.

In an alternative embodiment of the invention, the energy is fed to the port in the form of a pulse rather than as swept energy. First a pulse, such as that shown in FIG. 11C is generated by a pulse synthesizer. This pulse is amplified and fed into the input. The pulse synthesizer would then replace VCO 102 (FIG. 5B). It is understood that the pulse synthesizer can also be programmed to produce a sweep for use in determining the frequency dependence of η (act 164 of FIG. 7).

A search is performed for a position of the matching elements at which the net power efficiency at all of the feeds meets the criteria. This is indicated at boxes 214 and 216, which represent a search carried out by changing the positions and/or orientations of the matching elements. Standard search techniques can be used (iteration) or a neural network or other learning system can be used, especially if the same type of object is heated repeatedly, as is common for industrial uses.

When the criteria are met, then the power is raised to a level suitable for heating and optionally swept. The power into the respective amplifiers is optionally normalized to provide a same net power into the cavity (and therefore, into the object) for each port. Optionally, the least efficient port determines the power to the object. While in prior art ovens, the user decides on the heating time, in some embodiments of the present invention the desired heating time can generally be predicted.

Returning again to FIG. 6, there are a number of methodologies for performing the heating 170.

In one embodiment of the invention, power is fed to all of the feeds at the same time. This has the advantage that heating is faster. It has the disadvantage that three separate sets of circuitry are needed.

In a second embodiment of the invention, the power is fed to the feeds seriatim, for short periods. Potentially, only a single set of most of the circuitry is needed, with a switch being used to transfer the power from feed to feed. However, for calibration, a method of measuring the power transmitted from port to port should be provided. This circuitry could also be used to match the feeds when power is not being fed to them. A different type of circuitry for providing both the heating and calibration functionality, in accordance with an embodiment of the invention, is shown in FIG. 8, corresponding to the circuitry of FIG. 5B.

The same reference numbers are used in FIG. 8 as for FIG. 5B, except as indicated below. Such a system has the advantage of being much less expensive. It is, of course, slower. However, it does allow for an additional method of equalization, in which the time duration (either alone or in conjunction with changing the input power) during which each feed is fed is adjusted so that the energy into each feed is the same (or different if that is desired).

Figure 8:
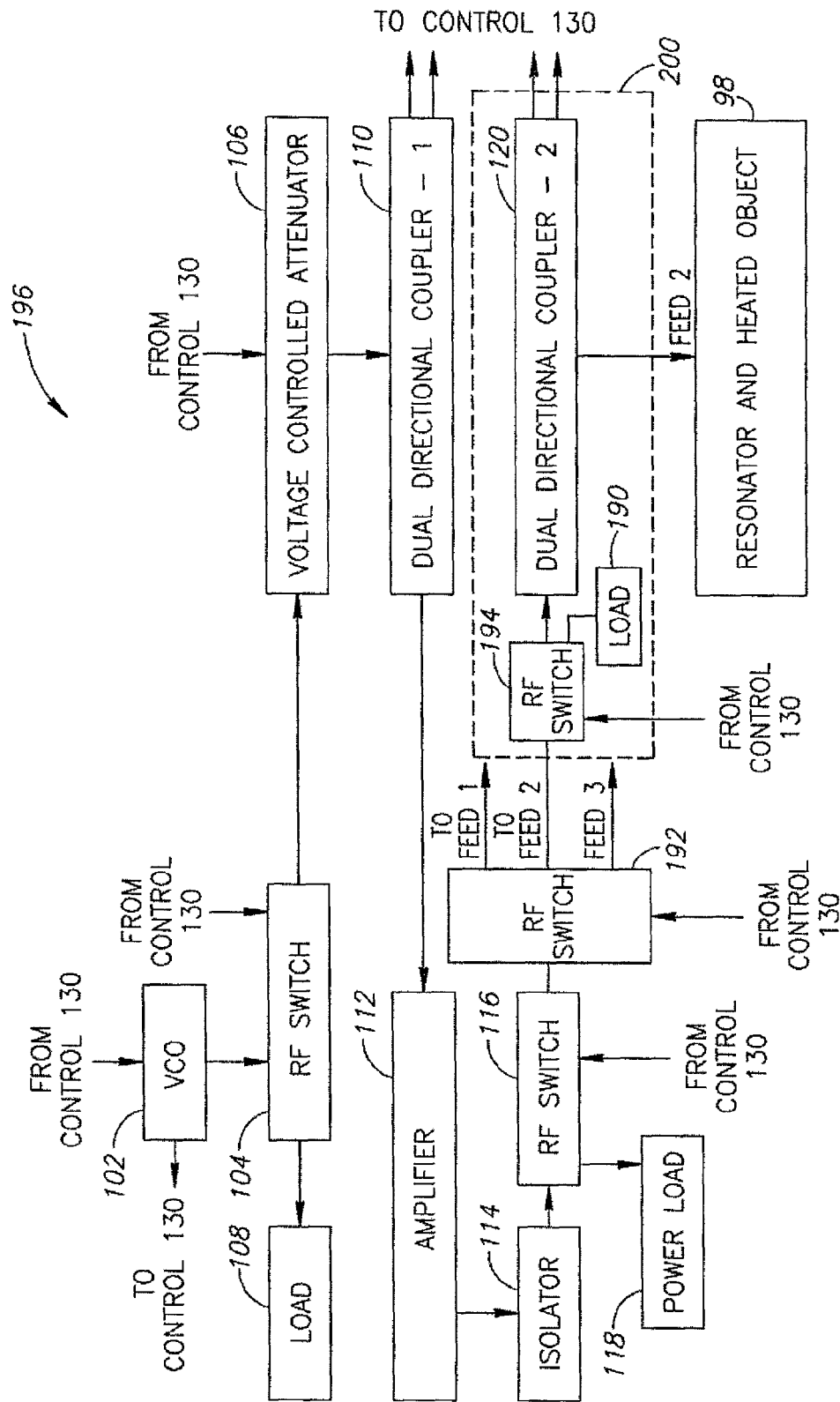
FIG. 8 illustrates alternative RF circuitry, in accordance with an embodiment of the invention.

FIG. 8 is similar to FIG. 5B up to the output of RF switch 116. Following RF switch 116 a second RF switch 192 transfers the power delivered by amplifier to one of the feeds. Only circuitry 200 related to feed 2 is shown.

Circuitry 200 operates in one of two modes. In a power transfer mode, a signal from control 130 switches power from RF switch 192 to dual directional coupler 120, via an RF switch 194. The rest of the operation of the port is as described above. In a passive mode, the input to RF switch 194 does not receive power from amplifier 112. Switch 194 connects a load 190 to the input of dual directional coupler 120. In the passive mode, load 190 absorbs power that is fed from the cavity into the feed. For production systems additional simplification of directional coupler 120 may be possible, replacing the dual directional coupler with a single directional coupler.

It should be noted that switches 116 and 192 and optionally the local switches can be combined into a more complex switch network. Alternatively or additionally, RF switch 194 can be replaced by circulator such that power returned from the feed is always dumped in load 190.

In either the embodiment of FIG. 5B or the embodiment of FIG. 8, the frequency of the power fed to a port can be fed at the center frequency of the resonance mode that couples the highest net power, i.e., the point of maximum efficiency of energy transfer to the object being heated. Alternatively, the frequency can be swept across the width of the resonance or, more preferably along a portion of the width, for example between the −3 dB points of the power efficiency curve, or as described above with respect to FIGS. 11A-11C. As indicated above, optionally, the power is adjusted during this sweep so that the net input power remains constant or more nearly constant during the sweep. This can be accomplished by changing the power amplification of the power amplifier inversely to the power efficiency of the instantaneous frequency being fed.

Figure 9:
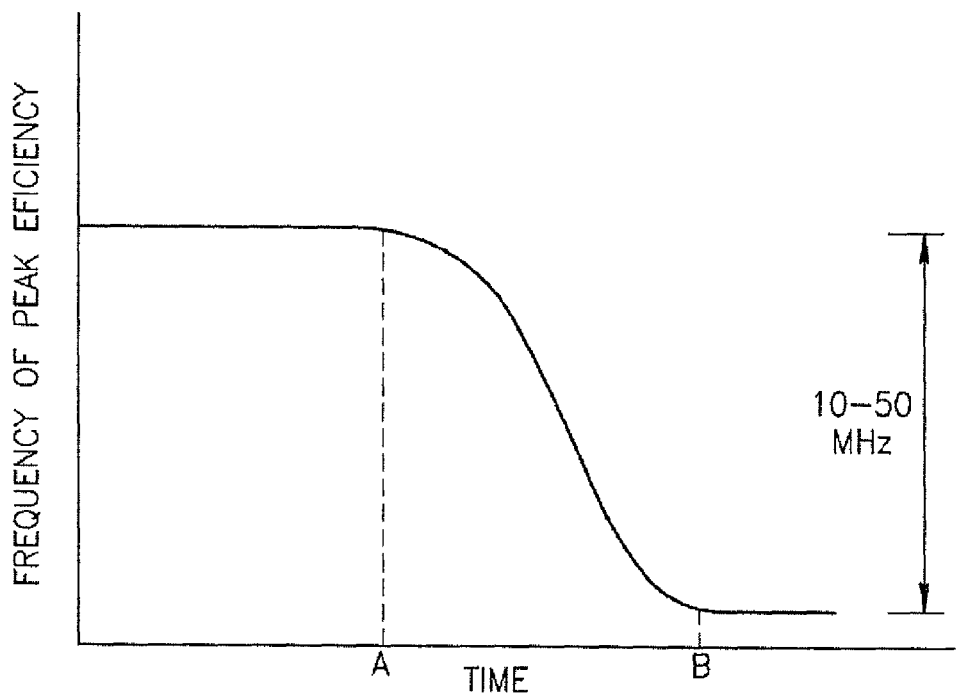
FIG. 9 is a graph of frequency vs. time for a typical thawing process, illustrating an automatic turn-off capability in accordance with an embodiment of the invention.

Returning again to FIG. 6, reference is additionally made to FIG. 9, which shows a graph of frequency of a particular peak with time for a typical thawing process. This graph illustrates one method of using the changes in the properties of the object during a thawing process to determine when the process is complete.

The ordinate of FIG. 9 is the frequency chosen as an input for one of the feeds. The abscissa is time. During thawing of an object, the ice in the object turns to water. Ice and water have different absorption for microwave or UHF energy, resulting in a different return loss and coupling as a function of frequency. Not only does this change the match, but at least after rematching by adjustment of the matching elements, the frequency of the absorption efficiency peak changes. At point A, some of the ice has started to change into water and the frequency of match changes. At point B, all of the ice has changed to water and the frequency of match stops changing. By monitoring the frequency described above and especially its rate of change, the point at which all of the ice is turned into water can be determined and the heating terminated, if only thawing is desired. It is noted that the frequency change during thawing is large, as described herein, compared to allowed frequency changes in the prior art.

One of the problems of thawing a solid mass of irregular shape and irregular internal structure is that it is generally impossible to determine when all of the ice has been turned to water. Thus, in general, in the prior art, one overheats to assure that no ice is left, which, considering the uneven heating of the prior art, would enhance re-crystallization, if any were left.

Heating methods and apparatus of the present invention, which allow for both even heating and provide knowledge of the progress of the thawing, can result in much lower or even non-existent re-crystallization.

Apparatus and method according to the present invention have been used to defrost a pig's liver, Sushi or Maki and to cook an egg in the shell.

The following table shows a comparison of thawing of a cow liver by the system of the present invention and using a conventional microwave oven.

TABLE 1

Comparison of Inventive Method and Conventional Microwave- Cow Liver

| Measurement | Inventive Method | Conventional Microwave |
|---|---|---|
| Initial Temperature | −50° C. | −50° C. |
| Final Temperature after thawing | 8° C. to 10° C. | −2° C. to 80° C. |
| Power | 400 Watt | 800 Watt |
| Thawing time | 2 Minutes | 4 Minutes |
| Visible damage | None | The texture of the thawed sample was destroyed. There are frozen regions along side burned ones. No chance of survival of living cells. |

The following table shows a comparison between thawing of Maki containing raw fish covered by rice and wrapped in seaweed, by the system of the present invention and using a conventional microwave oven.

TABLE 2

Comparison of Inventive Method and Conventional Microwave-Maki

| Measurement | Inventive Method | Conventional Microwave |
|---|---|---|
| Initial Temperature | −80° C. | −80° C. |
| Final Temperature after thawing | 2° C. to 6° C. | −5° C. to 60° C. |
| Power | 400 Watt | 800 Watt |
| Thawing time | 40 Seconds | 1 Minute |
| Visible damage | None | The thawing process cooked part of the salmon, therefore it was not Maki anymore. |

An egg was cooked using the present method. Generally, eggs burst if an attempt is made to cook them in a microwave oven. However, using the system described above an egg in the shell was cooked. The white and yellow were both well cooked, and the white was not harder than the yellow. Neither part was dried out or made rubbery, and the taste was very good, with little if any difference from a conventional hard cooked egg. In addition, deep frozen fish have been defrosted without leaving any frozen portions and without any portions being heated above cooking temperatures.

In each of the above experiments, the frequency and power were adjusted automatically and the matching elements were adjusted manually, in accordance with the method given above for automatic adjustment.

The inventors believe that the methodology of the present invention is capable of thawing objects that are deep frozen to just above freezing with a temperature variation of less than 40° C., optionally less than 10° C., 5° C. and even as low a difference as 2° C. Such results have been achieved in experiments carried out by the inventors, for a cow liver, for example.

Thawing objects such as meat and fish with such low differences and at high speed has the potential for prevention of development of salmonella, botulism and other food poisons. Controlled, uniform thawing has important implications in thawing organs for transplanting, without tissue destruction.

Figure 10:
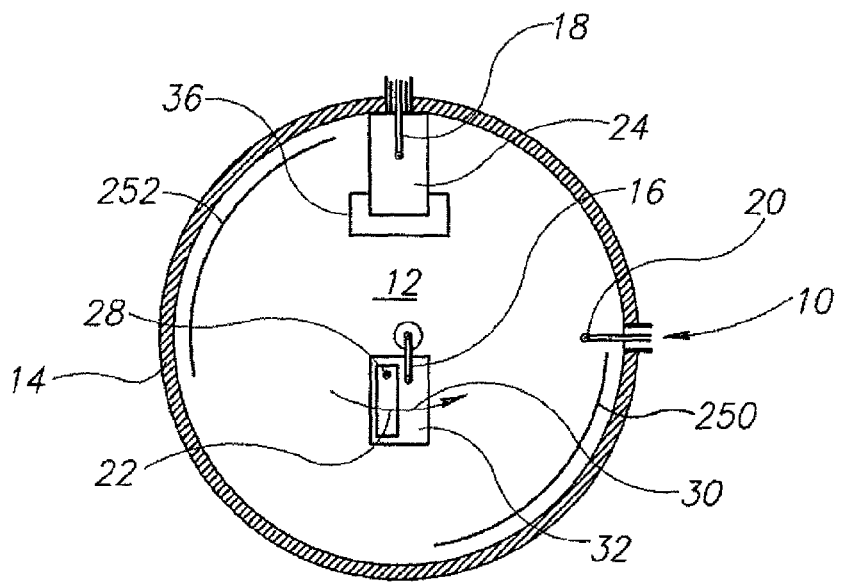
FIG. 10 shows the layout of a low frequency bias structure, in accordance with an embodiment of the invention.

FIG. 10 shows apparatus for applying a DC or relatively low frequency (up to 100 kHz or 100 MHz) to an object in the cavity, in accordance with an embodiment of the invention. This figure is similar to FIG. 1, except that the cavity includes two plates 250 and 252. A power supply (not shown) electrifies the plates with a high differential voltage at DC or relatively low frequency. The objective of this low frequency field is to reduce the rotation of the water molecules. Ice is water in a solid state therefore its rotational modes are restricted. A goal is to restrict the rotational modes of the liquid water in order to make the heating rate be determined by that of the ice. The present inventors also believe that the low frequency fields may change the dielectric constant of the materials making up the object being heated, allowing for better match of the input to the object.

In an alternative embodiment of the invention a DC or low frequency magnetic field is applied by placing one or more coils inside or preferably outside the cavity to cause alignment of the molecules in the object. It is possible to combine low frequency or DC electric and low frequency or DC magnetic fields with possible different phases from different directions.

Figure 12A:
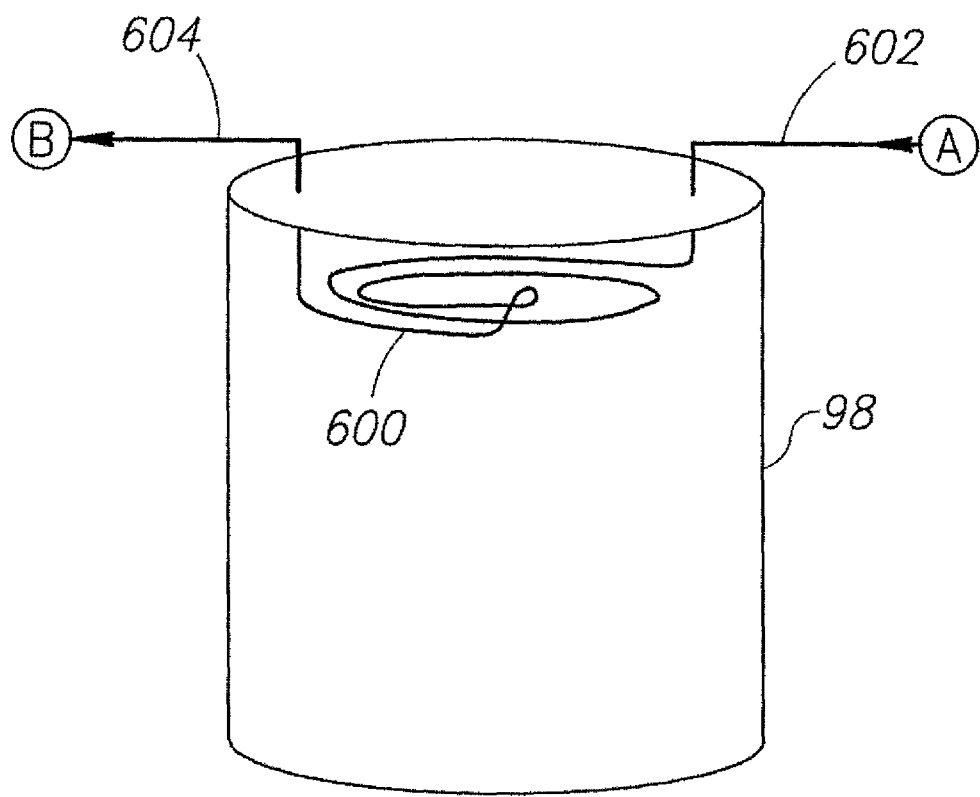
FIG. 12A shows an RF heater with an auxiliary heating coil, in accordance with an embodiment of the invention.

FIG. 12A shows a cavity 98 with an internal heater coil 600 placed inside the cavity. An inlet 602 and an outlet 604 allow for feeding a hot fluid through the coil to heat the air within the cavity.

Figure 12B:
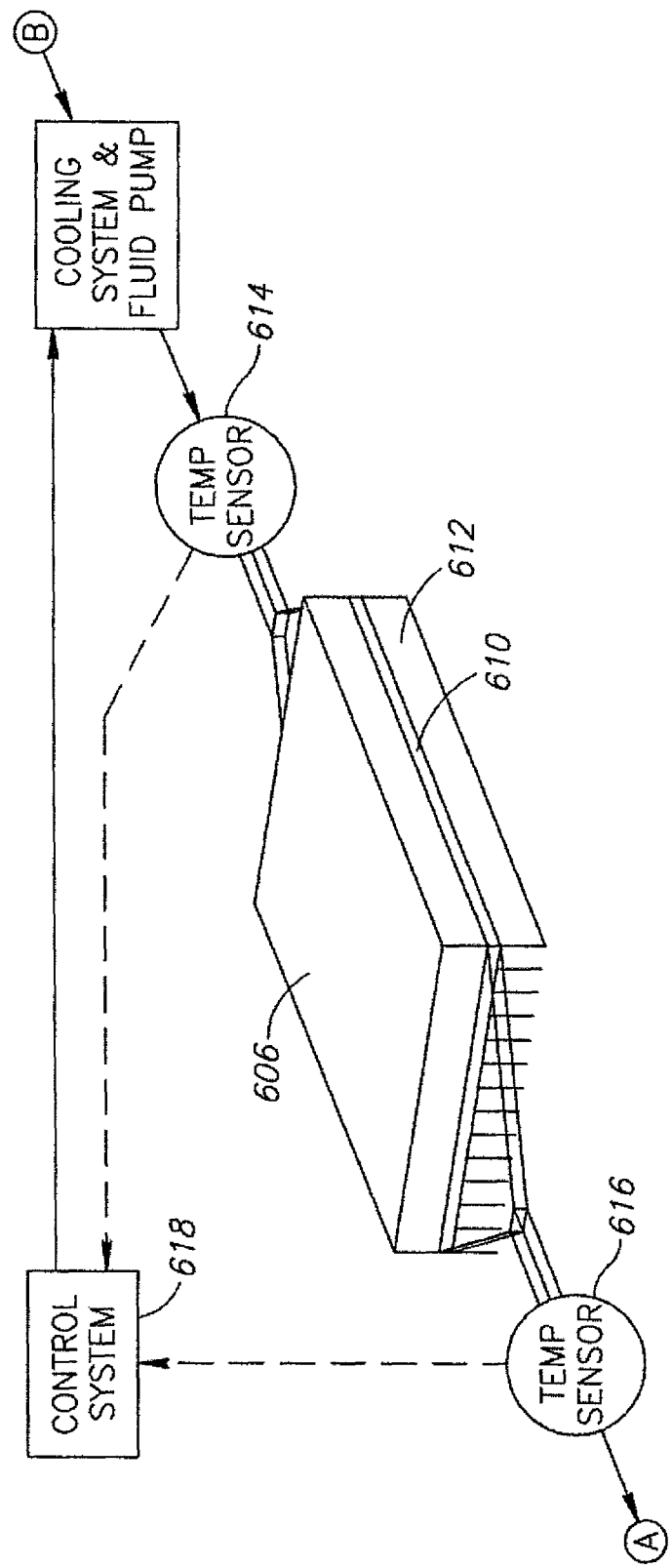
FIGS. 12 B and 12C schematically illustrate a scheme for transferring waste heat from an amplifier to the heater of FIG. 12A.
FIG. 12D shows an external view of a low weight, high efficiency RF heater, in accordance with an embodiment of the invention.
Figure 12C:
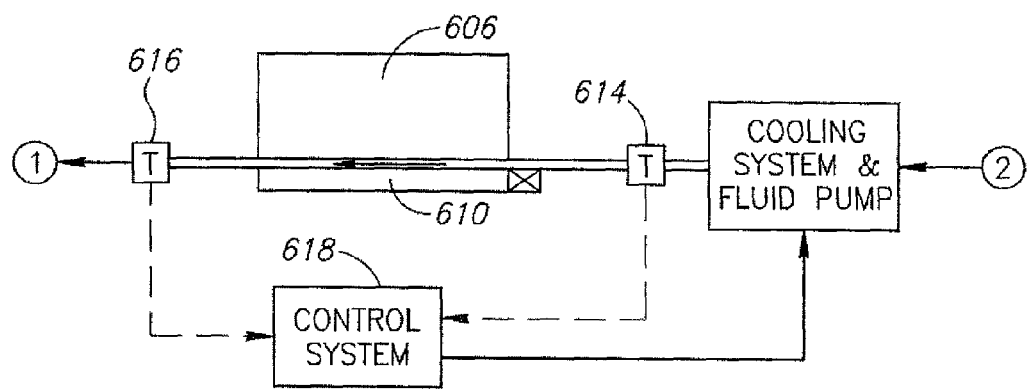

FIGS. 12B and 12C show two schematic illustrations of a system for transferring heat from a high power amplifier 606 to the coil. Even at an efficiency of 60%, the amplifier can generate several hundred watts. This energy (or at least a part of it) can be transferred to heat the air and to produce infrared radiation (as a resistive coil does) in the cavity to increase the efficiency of heating.

FIG. 12B shows a very schematic diagram to illustrate how waste heat from an amplifier 606 can be captured. FIG. 12C shows a block diagram of the same system. Element 608 represents a cooling system for returning fluid and a fluid pumping system. It receives return fluid from outlet 604, cools the liquid (if necessary) and pumps the liquid into a gap 610 between the between amplifier 606 and an optional heat sink 612. The temperature at the input to the gap and at its output are preferably measured by sensors 614 and 616 and fed to a control system 618, which controls one and optionally more than one of the cooling and pumping rate to provide a desired heat transfer to the cavity. A fan 620 may be provided to cool the heat sink as necessary. The fluid passing between the amplifier and the heat sink also functions to transfer heat from the amplifier and the heat sink. Optionally heat conducting rigs may transfer heat between the amplifier and the heat sink with the fluid passing between the ribs to collect heat.

Alternatively, heat pipes or other means can be used to collect and transfer energy to the cavity. Alternatively, hot air could be passed over the amplifier and/or heat sink and passed into the cavity.

Use of high efficiency amplifiers with or without heat transfer to the cavity can result in highly efficient systems, with an overall efficiency of 40-50% or more. Since amplifiers with relatively high (40V-75V) voltages are used, the need for large transformers is obviated and heat sinks can be small or even no-existent, with the amplifier transferring heat to the housing of the heater.

Figure 12D:
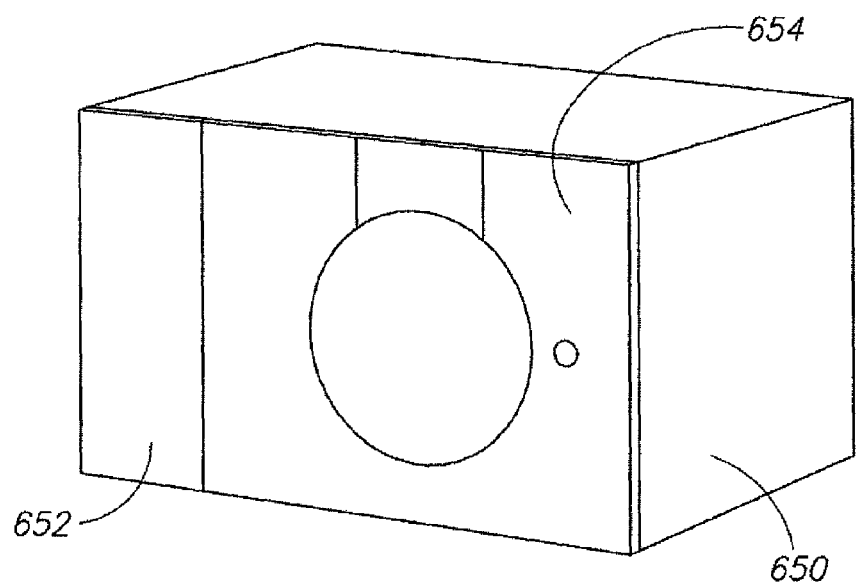
Figure 13A:
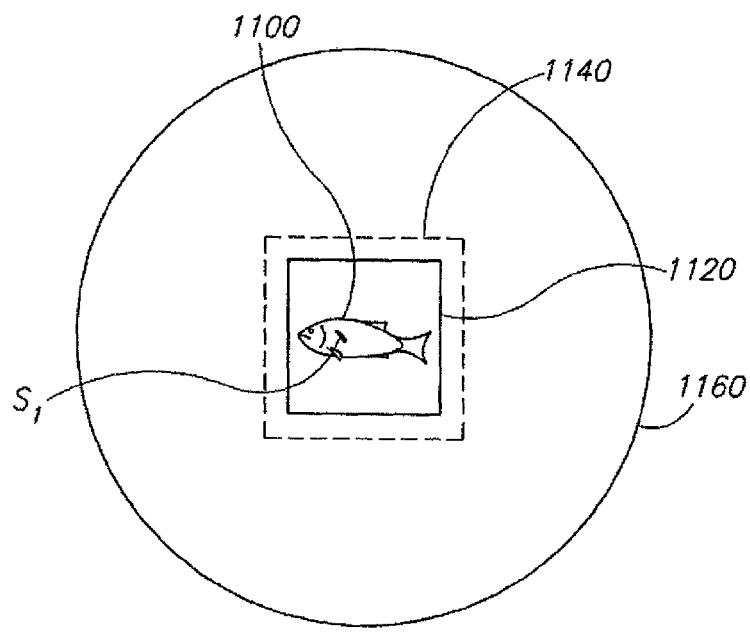
FIG. 13A is a schematic illustration of apparatus for freezing body in operation according to an embodiment of the invention.
Figure 13B:
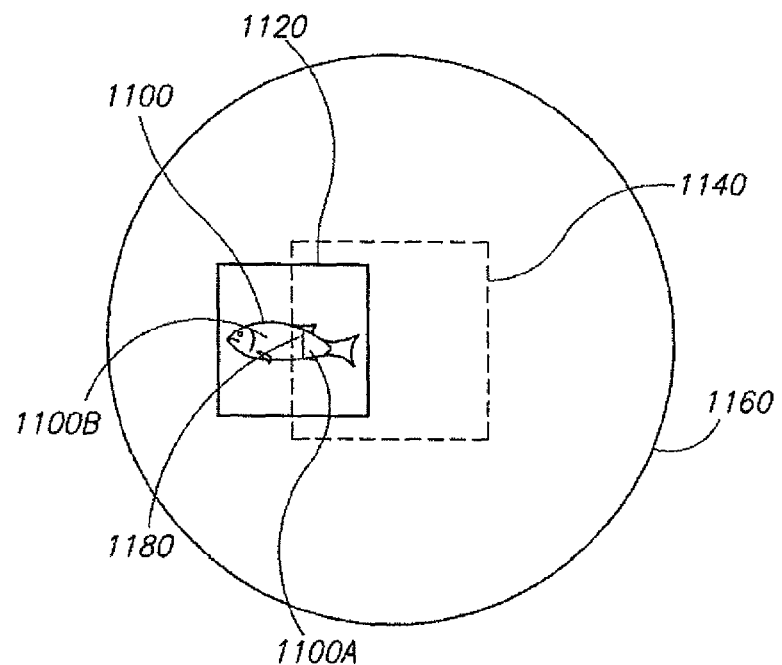
FIG. 13B is a schematic illustration of apparatus for freezing body in operation according to an embodiment of the invention.
Figure 13C:
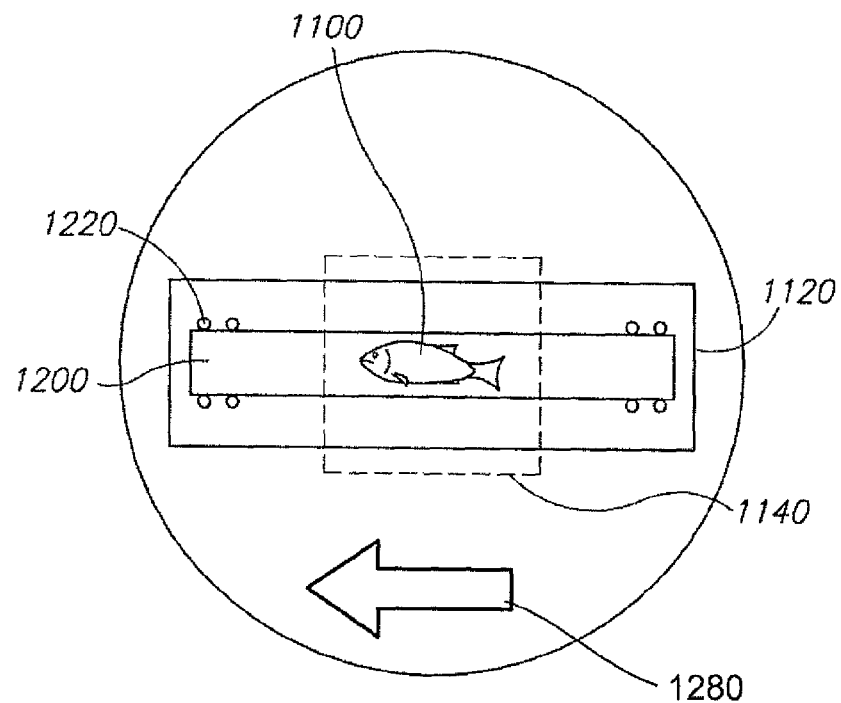
FIG. 13C is a schematic illustration of apparatus for freezing body in operation according to an embodiment of the invention.

By optimizing the system, a heater as shown in FIG. 12D, including a housing 650, amplifiers and controller, as well as a user interface 652 and a door 654, as normally found on a microwave oven can weigh as little as 10 or 15 Kg or less.

While applicants have utilized UHF frequencies for heating in the examples described above, rather than the much higher 2.45 GHz used in the prior art, for heating applications other than thawing, a different frequency may be desirable. UHF frequencies are absorbed preferentially by ice and have a longer wavelength than the higher frequencies, so that the fields within the object are more uniform and the ice is preferentially heated as compared to the water. This provides for preferential heating of the ice and more even thawing.

Additional measures that may be taken to improve the uniformity are:

1) Various types and sizes of conducting materials such as tiny grains of powdered conductive material (gold) may be inserted into the sample preceding the freezing process (e.g. through the circulation of the blood or cooling fluid) and serve as reflecting sources. The insertion can be done using some template of non-conducting material (absorbing or not) holding the conducting objects. These passive energy sources can improve the uniformity of EM radiation absorption.

2) Penetration of materials that change their dielectric characteristics dependent upon temperature in a fashion that is different than that of the sample. Injecting these materials will enable changes in the dielectric characteristics of the sample in the direction desired for achieving uniform and fast warming.

3) Use of probes for measurement of various parameters of the warming process such as temperature, pressure, and so on: These probes can be inserted inside the sample preceding the freezing process or attached adjacent to the sample at any stage of the process. Measurement of these parameters provides a means for supervision (control) of the warming process such that if the warming is not optimal it will be possible to make changes in various parameters of the process. There are probes available that are suited for measurement during warming in a microwave device. These probes can also serve as an indication of when to stop a thawing or cooking process.

Such probes may be included in a bag in which the object to be heated is placed and may include a resonant element whose resonant frequency is made to vary with temperature by the inclusion of a temperature dependent element such as a temperature dependent resistor or capacitor.

Probes may be provided with resonant circuits whose frequency depends on temperature. Such probes may be scanned during the scanning used for setting sweep parameters to determine temperature. During power transfer, these frequencies should generally be avoided. In an embodiment of the invention, a temperature sensitive tag is paired with a temperature insensitive tag and the changes in the frequency of the temperature sensitive tag are determined by a difference frequency between the two. This allows for a more accurate measurement of temperature that utilizing an absolute measurement of the frequency of the temperature sensitive tag.

4) Wrapping of the sample in material that does not absorb EM radiation at the specified frequencies: This type of wrapping can serve as packaging for the sample during transportation and as part of the probe system by which it is possible to measure temperature and additional parameters at the edges of the sample. This wrapping can serve as local refrigeration for the outer surfaces of the sample (which usually have a tendency to warm faster than the rest of the sample) in order to achieve uniformity in the warming of the sample.

Further, the wrapping can include identification of the object to help track the object and also to provide an indication to the system of a preferred protocol for heating the object. For example the wrapping may be provided with a number of resonant elements which can be detected when the cavity is swept during calibration. The frequencies of the elements can be used to provide an indication of the identity of the object. This allows for the automatic or semi-automatic setting of the starting parameters for calibration and/or for a particular heating protocol, optimized for the particular object and conditions.

Alternatively or additionally, to resonant circuits, a recording/storage element of a different type is provided, for example, in the form of an RFID element or a bar-code, which includes thereon an indication of the content of a package or wrapper including the object, suggested treatment thereof and/or heating instructions. In an exemplary embodiment of the invention, the instructions are actually provided at a remote site, indexed to a key stored by the recording element. Such instructions may be, for example, stored in a table or generated according to a request, based on information associated with the identification.

A reader is optionally provided in the heater, for example, an RFID reader or a bar-code reader to read information off a package or a wrapper thereof.

In an exemplary embodiment of the invention, after the object is prepared, various types of information are optionally stored on (or in association with) the recording element, for example, size, weight, type of packing and/or cooking/thawing/heating instructions.

In an exemplary embodiment of the invention, the recording element has stored therewith specific cooking instructions. Alternatively or additionally, the recording element has stored therein information regarding the platter shape and/or dielectric properties of its contents. It is noted that for industrial shaped portions, if the shape of the food is relatively regular between platters, movement of the food and/or changes in size and/or small changes in shape will not generally affect the uniformity by too much, for example, shifting a heating region/boundary by 1-2 cm. Optionally, the platter includes a depression and/or other geometrical structures which urge the food item to maintain a desired position relative to the platter borders.

During heating of the food, the parameters of the heating are optionally varied. The effect of the varying may cause non-uniformity in space and/or in time. In an exemplary embodiment of the invention, a script is provided which defines how and what to vary. Optionally, the script includes decisions made according to time (e.g., estimation of an effect) and/or food state (e.g., measurement). Various measuring methods are described above. Estimation is optionally based on a simulation or on empirical results from previous heating cycles. Optionally, the script is conditional (e.g., modified, generated and/or selected), for example, based on the position of a platter in the oven and/or personal preferences (which may be stored by the oven).

In an exemplary embodiment of the invention, a script is provided on the recording element or at a remote location. Optionally, a script is selected by a user selecting a desired heating effect.

In one example, a single food item may experience different power levels for different times, in order to achieve a desired texture/flavor.

In an exemplary embodiment of the invention, a script is used to set different energy levels and/or different times to apply such energies.

In one example, a script is as follows:
(a) Heat all platter so that the food reaches a relatively uniform temperature of 5 degrees Celsius.
(b) Uniformly heat whole platter at 80% for 5 minutes and then full power for 10 minutes.
(c) Heat to 40 degrees Celsius.
(d) Maintain heat for 10 minutes. It is noted that a desired heat can optionally be maintained by estimating the energy absorption while applying a known amount of cooling. Alternatively, actual heat absorption may be estimated based on a known amount of energy absorption and a measurement of air temperature leaving the cavity. Optionally, the oven includes a source of cooling air and/or has coolable walls and/or tray.
(e) Reduce heat to 30 degrees Celsius.
(f) Wait 10 minutes.
(g) Report "done" but leave at 30 degrees Celsius until removed.

In an exemplary embodiment of the invention, the script includes other conditions, for example, detecting changes in color (e.g., browning), steaming (e.g., by phase change of water), volume (e.g., dough rising will change the behavior of the cavity in ways that can be anticipated).

Optionally, the script includes a request to the user to add ingredients (e.g., spices), or to mix or reposition object.

In an exemplary embodiment of the invention, the script takes into account the quality of uniformity control achievable by the oven. For example, if a higher level of uniformity is desired than basically provided by the oven, heating may include pauses where power is reduced, to allow heat to even out in the object. The length of the delays is optionally pre-calculated for the food substances and a calibrated lack of uniformity of the oven. Alternatively or additionally to reducing power, the food and/or the heating areas may be moved one relative to the other so as to better distribute heating.

In an exemplary embodiment of the invention, no script is provided. Instead, the heating times and/or parameters are based directly on the desired results, measured food properties and/or measured heating properties. Such desired results may be user provided or indicated by the recordable element.

5) Liquid injection: (similar to cooling liquid) that is suitable for a biological sample, the purpose of which is to cause uniform warming: This liquid is used in the field of hyperthermia. In this field warming of a biological area is done in order to remove a cancerous growth. From knowledge derived from this field it is possible to understand that a liquid such as this can cause a drastic change in the warming uniformity and can enable use of a warming device that is more simplified than would be required without its use.

6) Penetration of active radiation sources in the sample during the freezing process: These sources are active, which means connected to an external supply line that will be used as a source of EM radiation that will emanate from within the sample.

The present invention has been described partly in the context of thawing. The inventors believe that based on the results shown above, it can be expected that the methods of the present invention, can be used for baking and cooking, areas in which conventional microwave ovens are notoriously weak or for other heating operations, especially those for which a high level of uniformity or control is needed and/or in which a phase change takes place.

Utilizing various embodiments of the invention, the UHF or microwave energy may be deposited uniformly in an object to within less than ±10%, ±20% or ±30% over 80% or 90% or more of the object.

U.S. 60/775,231 describes among other things, a system for uniform or controlled defrosting or warming of an object. Additional relevant descriptions may be found in PCT/IL2007/000235, PCT IL2007/000236, and U.S. 60/924,555, all of which are incorporated herein by reference. The present application describes uniform or controlled freezing of an object. In many embodiments of the present invention, providing a temperature (at times a uniform temperature), above freezing, of the object is part of the freezing process.

The incorporated by reference applications describe a number of advances in the field of microwave (or UHF) heating.

In an embodiment of the present invention, the ability to heat non-uniform bodies (or portions thereof) in a controllable way is utilized for making a controllable freezing of biological tissue or body. In this embodiment, the tissue is put in a freezing device (for instance, in a bath full of cooling fluid, such as a cold gas, at −20° C.), and at the same time, RF heating is applied to the tissue to keep it above the freezing point (for instance, at 5° C.). Then, heating is stopped, and the body freezes rapidly.

Alternatively, after the entire body is at a low temperature above freezing, the heating is progressively limited to only a portion of the body, and the rest of the body is allowed to freeze. This alternative creates at least one well defined freezing front between the heated portion(s) and the non-heated portion(s) of the body. Optionally, each of this at least one freezing front is narrow, such that at each moment only a very small part of the body goes a phase change and emits latent heat. Moving the freezing front to create uni-directional or multi-directional freezing of the body optionally comprises manipulating the heating to be limited to different portions of the body.

Figure 15:
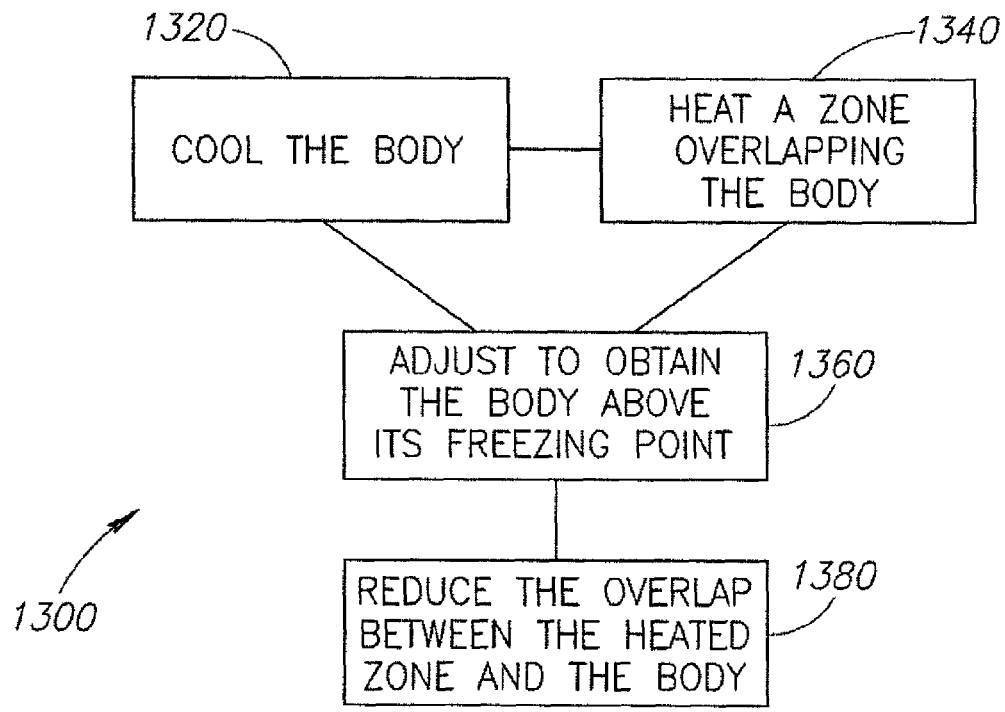
FIG. 15 is a flowchart showing actions to be taken when freezing a body according to an embodiment of the invention.
Figure 16:
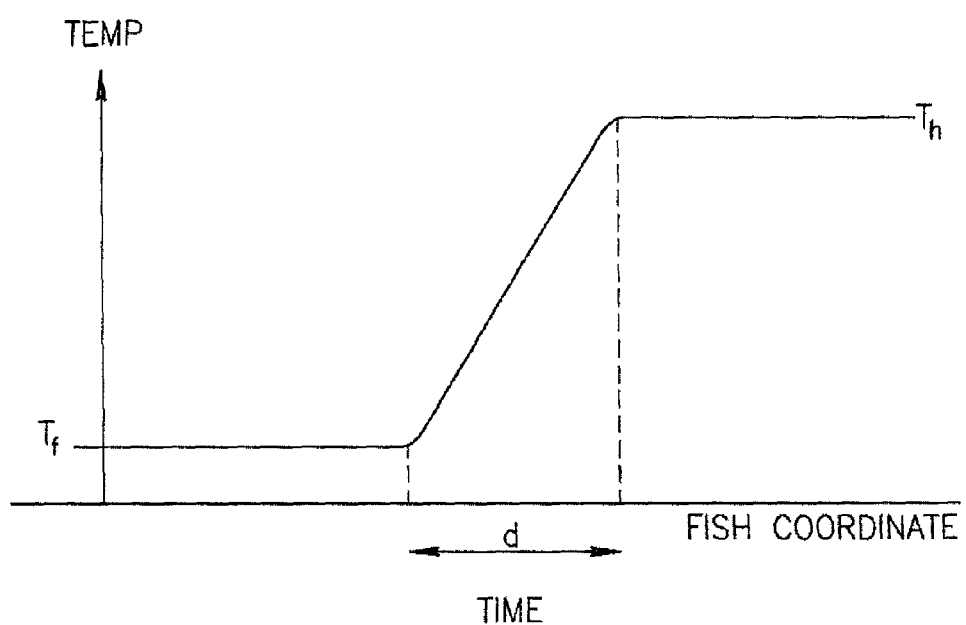
FIG. 16 is a graph showing a temperature profile at and near a freezing front.

FIG. 15 is a flowchart describing the actions to be taken in a method (1300) for directionally freezing a body according to an embodiment of the invention. The method (1300) comprises simultaneous cooling the body (1320) and heating (1340) the body. The cooling is optionally applied with a cooling fluid having a temperature below the freezing temperature of the body, and the heating is optionally applied by RF heating as described above, or in some embodiments by an array of antennas in free space or in some embodiments by a horn antenna in free space, or in some embodiment inside a waveguide. The heating, and optionally also the cooling, is adjusted (1360) to keep the body at a uniform temperature of above its freezing point.

Adjusting the heating is optionally based on measuring the temperature developed in response to different RF frequencies. In a small and uniform object a single temperature sensor, for instance, may suffice.

Optionally, the body is heated to be at a temperature that is close to its freezing temperature, such as the lowest temperature that still prevents uncontrolled freezing, as to save heating energy and facilitate rapid freezing. Optionally, this temperature is 10, 5, 3, 2, or 1° C. above the freezing point and preferably, no higher than 35° C. or 20° C. Optionally, the cooling and heating are controlled such that deeper and deeper cooling is applied to the surrounding (for instance by cooling the coolant or replacing it with a cooler one), while more and more intense heating is applied to the body.

In an embodiment of the invention, the determination that no part of the body has frozen is taken from spectral images, as described above. It should be understood that using the method described with respect to FIGS. 1-12D, ice can be heated selectively as compared to water, so that the method has a built-in mechanism for assuring that the body does not freeze. In particular, water heats faster than ice as it absorbs energy better—therefore, once ice melts, it does not re-crystallize because after melting, its temperature rises even faster than it did before.

Optionally, alternatively or additionally, the temperature control is aided by feedback received from temperature sensors such as $S_1$ (shown on FIG. 11A), sensing the temperature at various points in the body or tissue. Optionally, the temperature sensor is an optic-fiber base sensor. A temperature sensor may be inserted in many ways. Optionally, the tissue is cut, and the sensor is put in the cut area. Optionally, the tissue is mounted on a TTT, as described above.

Optionally, one portion of the fish (e.g. the internal organs) is frozen while another (e.g. muscle or main body part) is heated. In another option, the internal organs are heated with le the muscles and main body are frozen. This may affect parasite migration and reduce/prevent its entry to the muscle (or even cause it to migrate out of the muscle).

When the desired temperature difference is obtained and the temperature of the body is relatively uniform, the heating is reduced (1380), such that at least a portion of the body is cooled without being simultaneously heated. Optionally, the heating is reduced until the entire body is frozen.

Optionally, reducing the heating is selective. For instance, after heating of a region of the body is stopped, freezing of the body in this region is optionally monitored, and when a predetermined degree of freezing is achieved (or estimated to be achieved), heating is stopped in an adjacent region Alternatively or additionally, when a predetermined degree of freezing is achieved (or estimated to be achieved), heating is turned on again, to reach a desired cooling profile. Preferably, if the freezing region is inhomogeneous in the sense that different parts thereof absorb the applied electromagnetic power differently, different power is directed to different parts of the region to maintain the freezing front. Optionally, reducing of heat is continuous as to create an advancing heating front, and the speed at which heat is reduced is controlled to ensure that the heating front moves at about the same speed of the freezing front, or a bit slower. Preferably, this speed is lower than the speed of heat removal from the body.

Optionally, the speed is controlled to correspond to the rate of removal of water through the cellular membrane during freezing (in order to reduce intracellular crystallization). Cooling speed is optionally between 0.5° C. and 4° C. per minute. This option may be advantageous in application where viability of the frozen sample is important and has to be restored after thawing. For freezing blood units, a cooling speed of 300° C. per minute may be more appropriate.

Optionally, for instance, when food is frozen, cooling speed is from about 0.1° C. per minute to about 60° C. per minute. Heating the body with electromagnetic radiation allows changing the heating much faster than in some prior art methods, where heating is by thermally contacting the body that has to be heated with a large thermal mass. Furthermore, the ability to transfer heat rapidly and to change the heat transfer rapidly allow efficient studying of the reaction of the body to heat application.

FIG. 11A schematically shows a directional freezing system in operation according to an embodiment of the invention. The system includes a fish 1100, a cooler 1120, and a heater 1160. Optionally, cooler 1120 and heater 1160 have the same geometry. For instance, the shell of a microwave heater may be cooled to get a cooler or the interior of the microwave heater may be filled with a cold fluid (such as a gas) to provide cooling. Alternatively, the entire heater can be small relative to the cooler, for example, a small heater may be placed in a large freezing room.

In the figure, the fish is in the freezer (1120), and the freezer is filled with a cooling fluid (gaseous and/or liquid), which is preferably less susceptible to heating by the heater 1160 than is the fish. The fish is shown to be in a heating zone 1140 heated by heater 1160. The temperature of the fish is optionally measured with a thermometer, such as $S_1$. Optionally, heater 1160 is microwave operated, for example, being in the form of cavity 10 shown in FIGS. 1-3. Optionally, the cavity is rectangular. For simplicity of presentation, the details of cavity 10 are not reproduced in FIG. 11A.

In an embodiment of the invention, the fluid in the cooler is at a temperature below the freezing point of the fish (for instance, −5° C., −10° C., −20° C., −80° C., −100° C., −196° C.), and when heating is stopped the entire fish rapidly freezes. The term "rapidly" is used here to denote freezing pace that is more rapid than in prior art methods using similar temperature differences. Optionally, freezing is rapid enough not to allow latent heat emitted from a freezing portion to thaw an adjacent already-frozen portion. As explained above, thawing and re-freezing of the kind omitted in this option might damage texture, viability, and/or other desirable features of the frozen body.

Alternatively, the heating is reduced slowly or gradually to control the cooling rate. It is believed that the fish freezes from the outside in with heat being carried from the center of the fish to the outside surface of the fish.

In an embodiment of the invention, the cooler cools the fish, and then, the location of the heating zone and the fish are controlled to move in respect of each other, such that in a certain region of the fish heating is reduced as to allow this region to freeze, while other portions of the fish are still heated. This relative motion can be achieved by moving the fish or the heating area or both, in various embodiments of the invention.

FIG. 11B schematically shows an embodiment of the invention, with the construction of FIG. 11A, in which the fish moves. The heating zone is preferably designed so that there is a relatively well defined border between the heated and a less heated region. In FIG. 11B only a portion 1100A of fish 1100 is inside the heating zone 1140, while portion 1100B of the fish is outside the heating zone. This creates a freezing front 1180. As illustrated in the figure, the freezing front may be displaced from the border between portions 1100A and 1100B, and freezing may be limited to areas that are far enough from the heating zone.

Figure 14A:
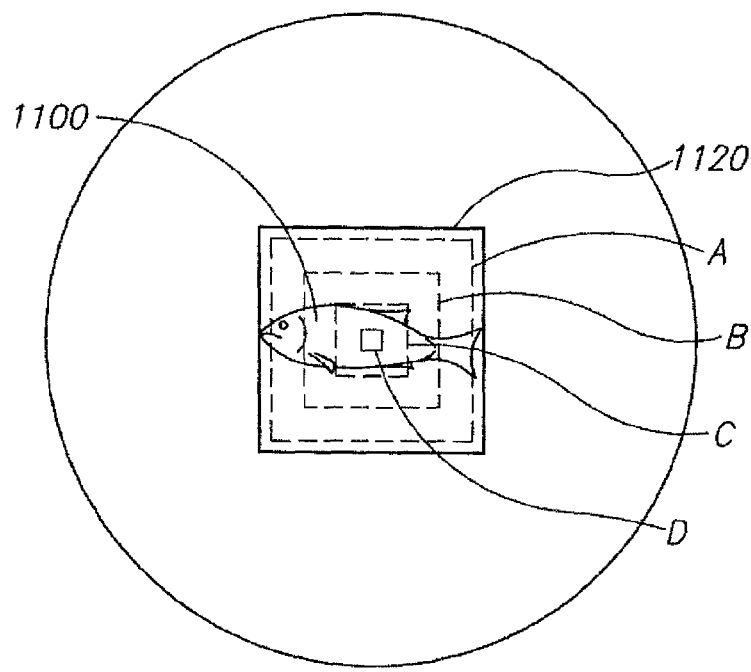
FIG. 14A is a schematic illustration of apparatus for freezing body in operation according to an embodiment of the invention.
Figure 14B:
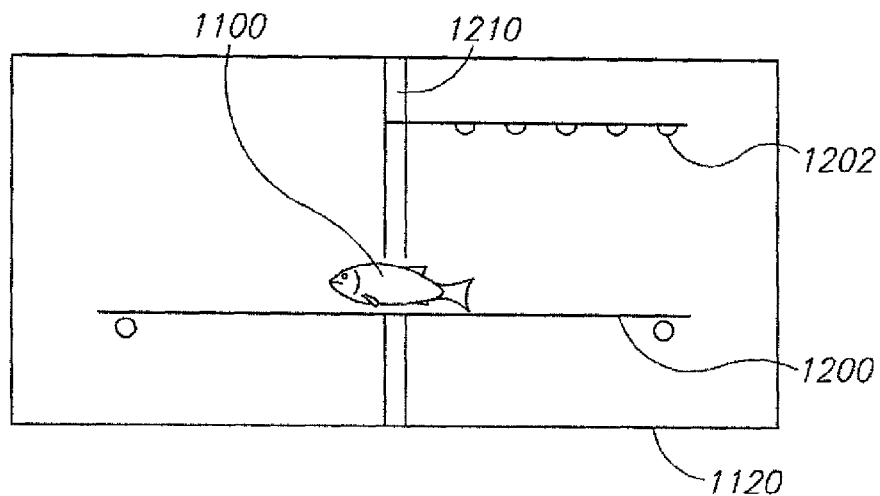
FIG. 14B is a schematic illustration of apparatus for freezing body in operation according to an embodiment of the invention.

As shown in FIG. 14, the difference between the temperature $T_h$, of the heated zone, and $T_f$, of the non-heated zone, is to some extent gradual, and the gradient between $T_h$ and $T_f$ is along of a thickness d. Optionally, the freezing is controlled such that d is from about 1 mm to about 10 cm, for instance 5, 10, 30, 50, 75, or 100 mm. The temperature gradient along d is at least 0.5° C./cm, however larger gradients may also be useful. For instance, in freezing food, a most rapid freezing may be desirable, and to achieve this, a temperature gradient of about 200° C./mm may be applied.

The movement of the fish 1100 relative to the heating zone 1140 may be achieved by moving the fish together with the freezer away from the zone 1140 (as shown), and/or moving the zone 1140, for instance by applying microwaves of different frequencies as described above. Optionally, in order to move the heating this way, the fish is imaged and measured. Imaging is optionally by CCD, laser scanner, or millimeter wave radar. The image is processed to obtain a three-dimensional shape of the fish, and this shape is used to determine, for instance by simulation, frequency and/or other parameters of waves that would have power distribution resulting in heating different zones of the fish. During freezing, the RF radiation is controlled in accordance with the determined parameters, and this way the heating zone is manipulated to move or change shape. Optionally, simulations are run in various stages of the cooling and/or freezing process, because the simulations results depend on the temperature, such that different heating powers and frequencies are required for heating different positions at different stages of the cooling process. The CST simulation program has been used by the present inventor to perform simulations of the type required. Similar objects, such as various individual Tuna fishes, may be frozen using similar sets of parameters. Therefore, when many similar objects are to be frozen, a first set of parameters may be obtained by simulation or experimentation, and this set may be used as a first estimate of the parameters, when more accurate parameters may be found by shorter simulations.

Upon continuing the relative movement between fish 1100 and heating zone 1140, freezing front 1180 moves, and all the fish in the non-heated side of the freezing front is gradually frozen. If the freezing front is moved along the fish from end to end, eventually, the entire fish is frozen.

FIG. 11C schematically shows a system similar to that described in FIGS. 11A and 11B, but here the fish 1100 itself may be moved (for instance, in the direction of the bold-face arrow 1280) within the freezer 1120 to achieve a directional freezing. The fish and/or the freezer are optionally moved in the embodiments of FIGS. 11A-11C by any moving means known, for instance, on a moving belt 1200 moved on rollers 1220 or on a rotator rotating it in some angular velocity, for instance, as known in the art of food manufacture. The moving mechanism is preferably made not to be heated by the heater, at least in the parts that are in thermal contact with the fish. For instance, the moving mechanism may be made of plastic, ceramic, ceramic glass with low iron content, etc.

FIG. 12A schematically shows a system similar to that shown in FIGS. 11A-C, but here the shape of the heating zone is changed from a large closed shape A encompassing the entire fish 1100, to smaller shape, B, concentric with A, which covers the entire fish except for the head and tail, and then becomes smaller and smaller, until in D it covers only a small central portion of the fish. No movement between the centers of the heating zone and the fish (1100) or the freezer (1120) is required for inducing directional freezing in this embodiment. The above referenced simulation program has shown that substantial movement of the heating zone may be obtained by adequate adjustments of the frequency distribution of the applied RF.

FIG. 12B shows another methodology, according to an embodiment of the invention, for forming a moving freezing front within a fish. As in FIG. 11C, fish 1100 is on a conveyer belt 1200 and is moved, for example to the left. Optionally, conveyer belt 1200 comprises cooling blocks, however, the system is within a freezer 1120 with very cold air. An absorbing (or reflecting) barrier 1210 is formed with an aperture through which the belt can move the fish. A series of antennas 1202 irradiate the fish on one side of the barrier only. On this side the antennas' power and/or frequencies are adjusted to keep the temperature of the fish above freezing. As a portion of the fish passes the barrier, said portion is no longer subjected to the microwave energy and is quickly frozen.

Figure 17:
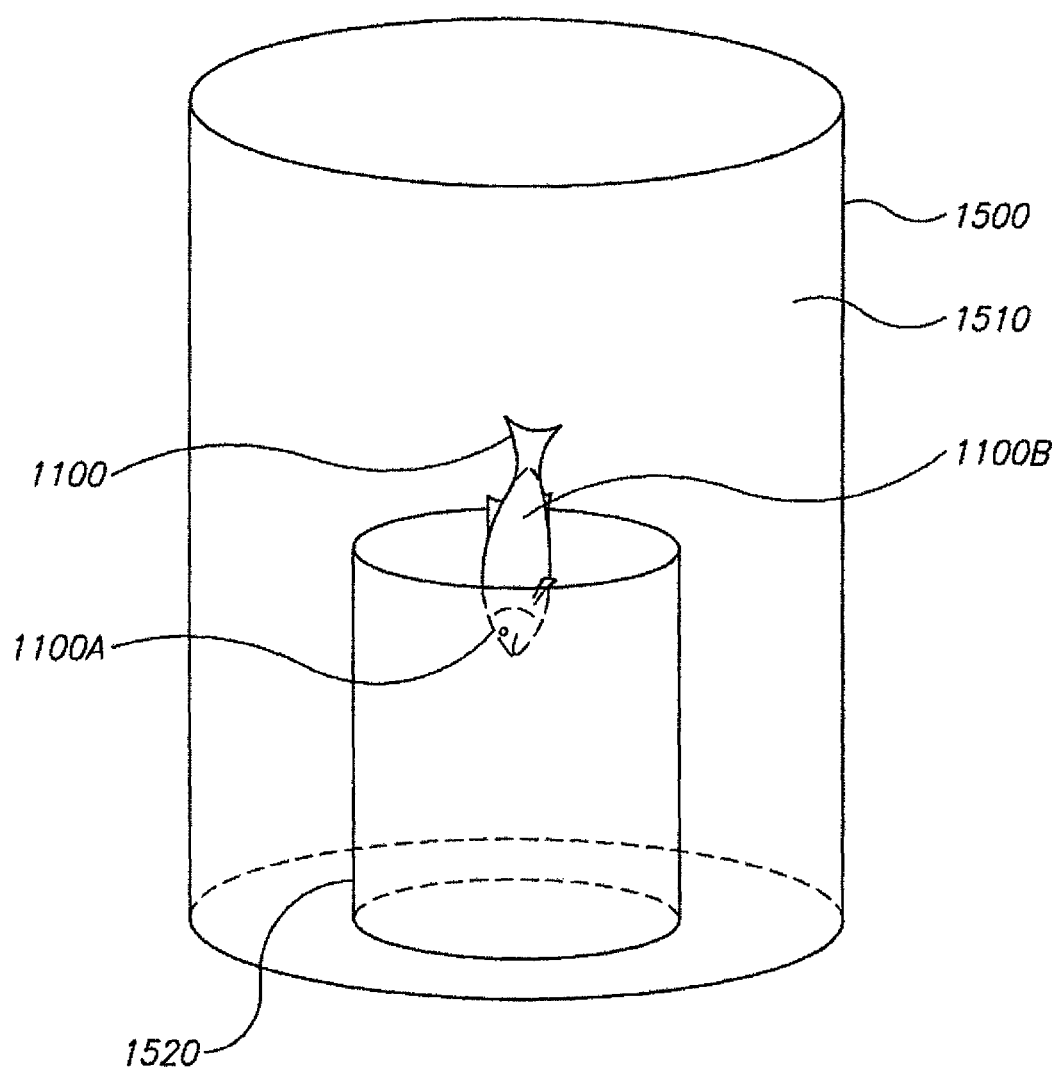
FIG. 17 is a schematic illustration of apparatus for freezing of a body according to an embodiment of the invention.

FIG. 15 schematically illustrates an apparatus in operation of freezing a region of a fish according to an embodiment of the invention. The apparatus includes a microwave cavity (1500), for example, of the kind shown in FIGS. 1A-1C as cavity 10. For simplicity, details of the cavity, such as feed antennas, and matching elements are omitted from FIG. 17. Heater cavity 1500 is full of cooling liquid 1510. The figure also shows a fish 1100, the freezing temperature of which is higher than the temperature of the cooling liquid. A region of the fish (shown with dashed line) is inside a shield 1520. The entire fish is in contact with cooling fluid 1510. Cooling fluid 1510 is optionally of a kind that does not absorb RF radiation, for instance, liquid nitrogen or solid carbon dioxide, also known as "dry ice". A shield 1520 shields the fish from microwave radiation. The regions of the fish that are out of the shield are kept non-frozen by the microwave radiation. The regions of the fish that are inside the shield freeze due to cooling liquid. Moving the fish deeper into the shield freezes further regions thereof. The shield is optionally a cut-off wave guide. Optionally, the shield is a hollow absorber, for instance, a hollow cylinder, with for example a double wall filled with water. Alternatively, the cut off waveguide is external to cavity 1500 and the fish actually moves out of the cavity as it moves.

In an embodiment of the invention, a portion of the fish (or any other body that contains biological material) is frozen, while RF is employed to maintain the rest of the fish unfrozen. This embodiment may employ any of the above methods, ended before the entire fish is frozen. This embodiment allows keeping a part of the fish fresh, ready for immediate use, while the rest is frozen for later use. Likewise, thawing, described in the above-mentioned PCT patent application No. PCT/IL2007/000236 or PCT/IL2007/000235, may be performed on a portion of a body, while the rest of the body remains frozen. For instance, a portion of a ground meat block may be thawed and used, while the rest of the block remains frozen and kept for use in another time.

In an embodiment of the invention, a piece of RF reflective material (for example, a metal), which uniformly reflects RF radiation transmitted thereto from the RF heater, is inserted into the body to be frozen. Such reflective material may be helpful for improving the uniformity of the heating provided by the RF.

Additionally or alternatively, a body to be frozen may be skewed on a spike having at its center a dynamic patch and/or a resonance structure, such as a passive source or TTT. For example, most of the skewer may be plastic except for a small resonant structure, located deep within the object to be frozen. Such resonance structure may provide a temperature transmitting tag (TTT), as described above and in PCT applications PCT/IL2007/000236, and PCT/IL2007/000235.

Example of Intentionally Uneven Heating

Into a chunk of meat (cylinder of ca. 30 cm long/ca. 10 cm diameter, at about 30° C.) three optic fibers were inserted and heating begun at 400 W. During heating the temperature change at each fiber was measured. After scanning for the dissipation, the RF frequencies that would provide the best absorption were selected. Within these frequencies power was transmitted in sequence at bands of ca. 20 MHz about each of the relevant peaks. The following method was applied. If there is no heating (detected almost immediately) this means that none of the sensed areas are heating, and then a different sub-band is assayed. If heating is detected, it is followed until there is a rise of up to 2° C. and the temperature is followed in all sensed areas. If none of the peaks provides the desired differential heating, peaks of lower dissipation may be assayed. Once the proper sub-bands are selected, heating may commence, and the energy provided in each frequency defines how sharp the temperature gradient would be. In an actual experiment, the frequencies chosen for transmission were between 810-850 MHz, and between 900-930

Figure 19A:
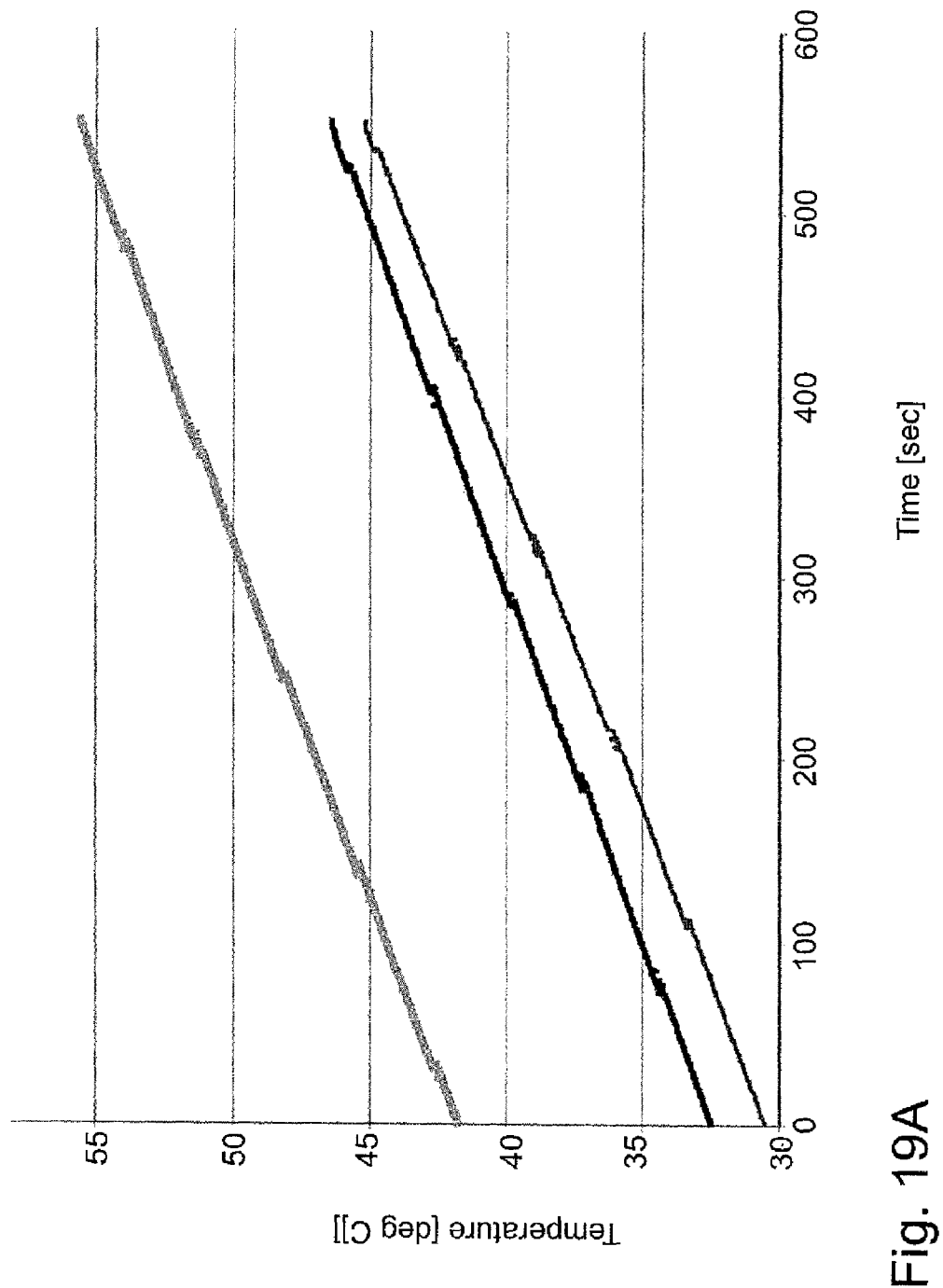
Figure 19B:
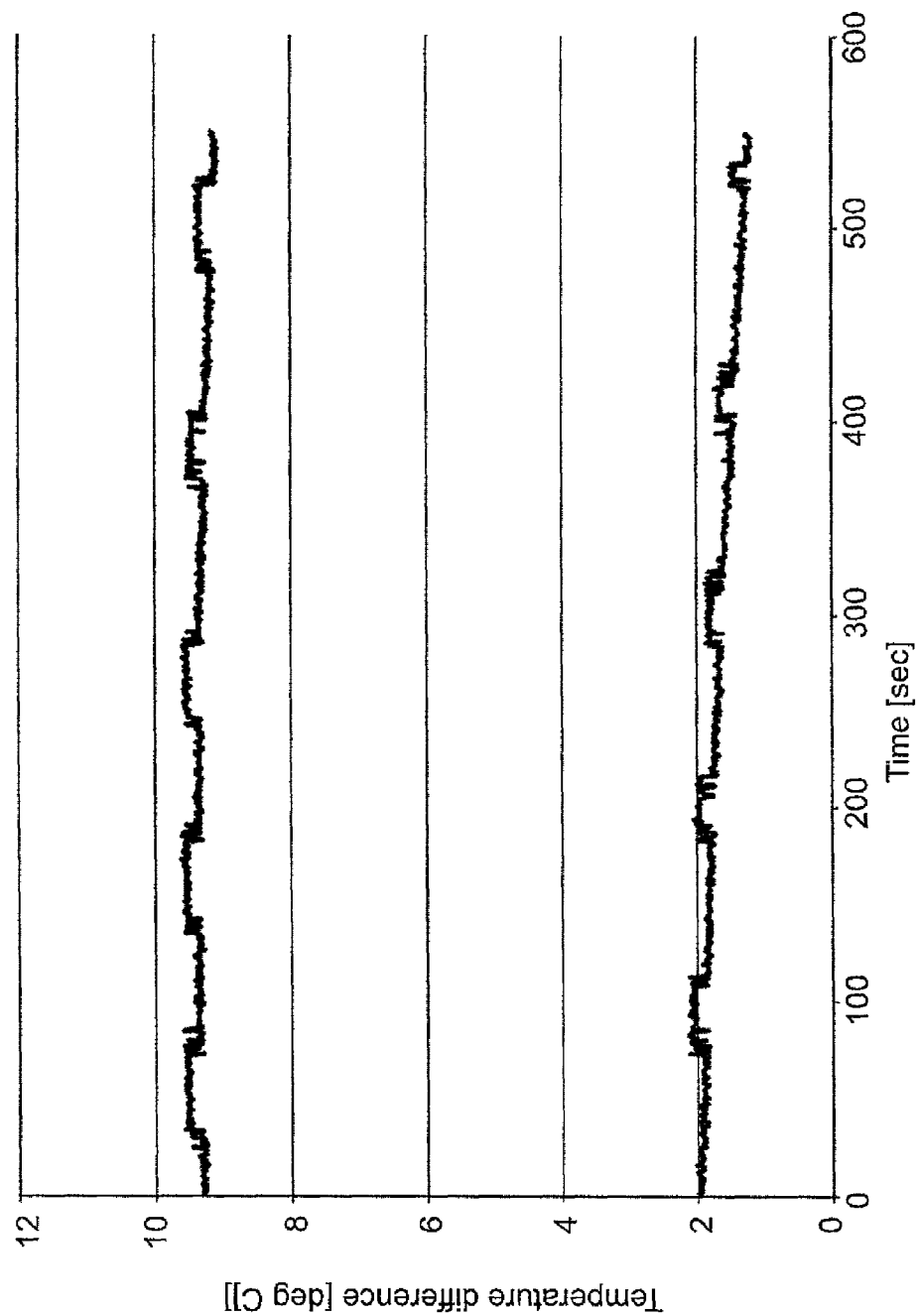

MHz, which corresponded to two of the sensors. The third sensor was relatively non-heating at these frequencies. The meat was heated non-uniformly, until the warmest spot was about 42° C. and the coldest about 30.5° C. This is shown in FIGS. 19A and 19B. It should be noted that in accordance with some embodiments of the invention, a hot spot can be moved (to obtain a greater area of uniformity by modifying the frequency by a small amount.

Figure 18A:
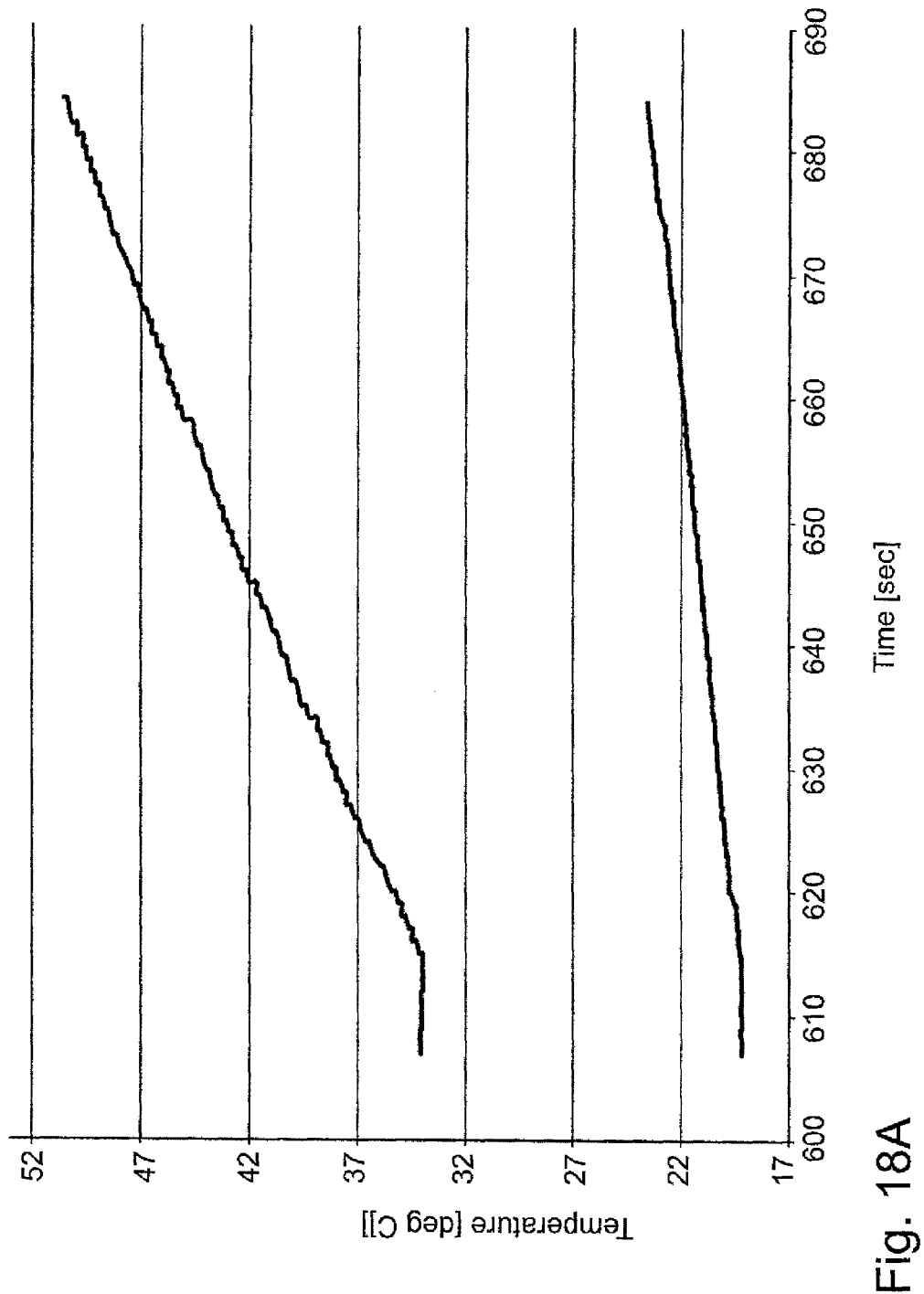
Figure 18B:
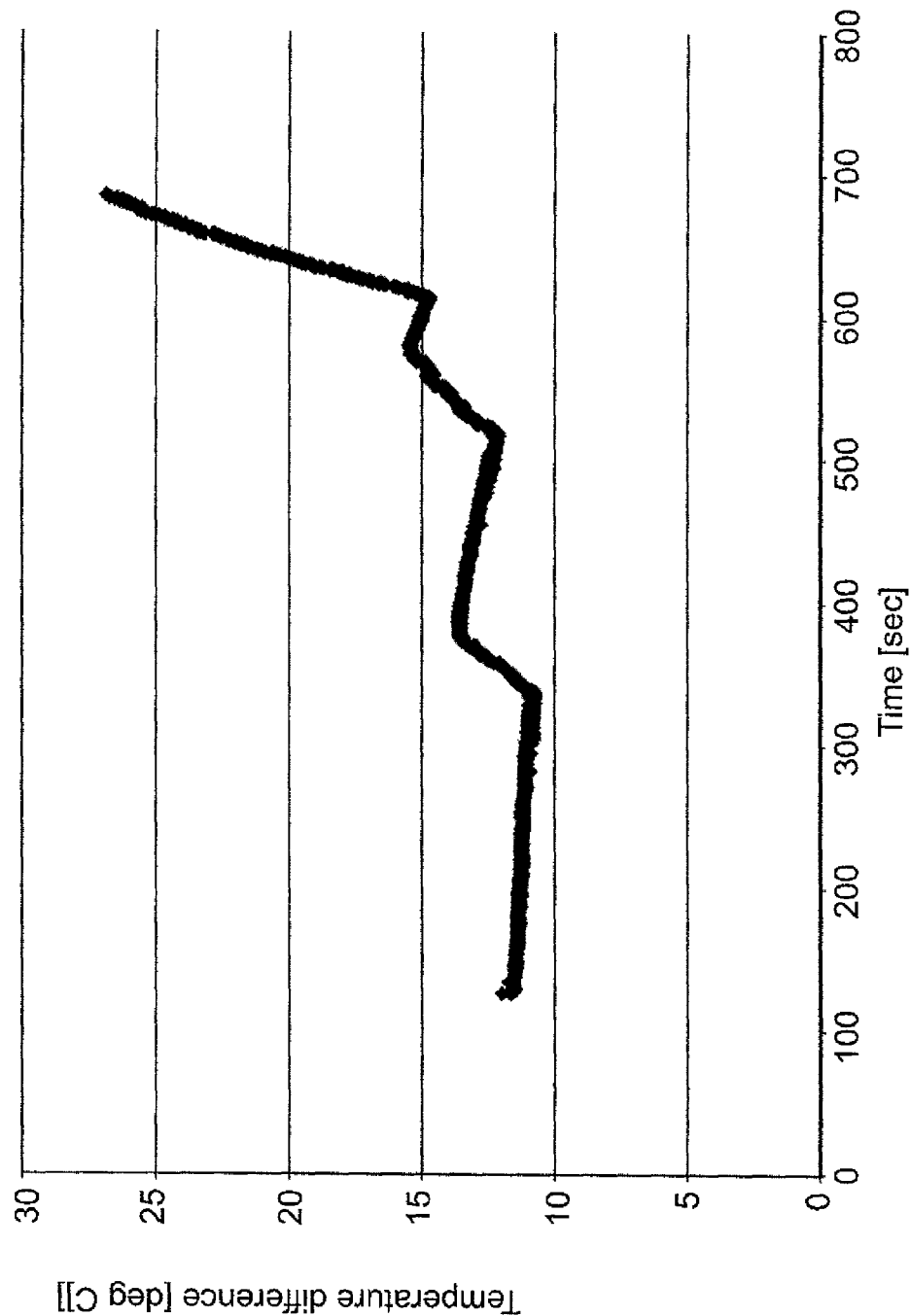

Then, the mode of mode of operation was changed and provided the same energy (calculated to compensate for the different dissipation) to all the meat. As can be seen in FIG. 19A, the meat heated linearly at all measured locations and as seen in FIG. 19B, the temperature differences between pairs of sensed locations were almost constant, with a slight decline after about 550 seconds, when the meat was heated already by about 13° C. Also seen from these Figs., is that the heat conduction between the locations was on a smaller order of magnitude than of the RF heating, (had the rates been comparable, the temperature differences would have significantly reduced). In FIGS. 18A and 18B, the experiment was performed similarly, but one sensor was placed in a fat portion and one in meat. The meat was a steak of about 150 gr. As seen in the FIG. 18B, the portions were first heated uniformly and then the mode was changed to non-uniform heating (indicating that the non-uniformity si controlled) FIG. 19A depicts the temperature during a portion of the process.

The present invention has been described mainly in the context of thawing. The inventors believe that based on the results shown above, it can be expected that the methods of the present invention, possibly at a higher frequency, can be used for backing and cooking, areas in which conventional microwave ovens are notoriously weak or for other heating operations, especially those for which a high level of uniformity or control is needed and/or in which a phase change takes place.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. For example the present invention has been described mainly in the context of thawing. The inventors believe that based on the results shown above, it can be expected that the methods of the present invention, possibly at a higher frequency, can be used for backing and cooking, areas in which conventional microwave ovens are notoriously weak. Furthermore, the terms "comprise," include," and "have" or their conjugates shall mean: "including but not necessarily limited to." The scope of the invention is limited only by the following claims:

The invention claimed is:

1. An apparatus for freezing an RF absorbing body, the apparatus comprising:
a cooler, comprising a coolant at a temperature below a freezing point of the RF absorbing body;
a heater, comprising:
a solid state amplifier as a source of at least one of microwave energy and UHF energy;
a resonant cavity, configured to create a heating zone in the RF absorbing body, such that regions of the RF absorbing body that are within the heating zone are selectively heated;
a feed configured to feed the resonant cavity with at least a portion of the at least one of the microwave energy and the UHF energy; and
a controller, configured to control one or more of the cooler, a position of the RF absorbing body and the heater to heat the RF absorbing body by the at least one of the microwave energy and the UHF energy fed to the resonant cavity through the feed to a substantially uniform temperature above the freezing point of the RF absorbing body while maintaining the temperature of the coolant below the freezing point of the RF absorbing body,
wherein the controller is configured to control the heater to produce electromagnetic waves having a frequency higher than or equal to a resonant cutoff frequency of the resonant cavity.

2. The apparatus according to claim 1, comprising a shield for shielding at least a portion of the RF absorbing body from being selectively heated.

3. The apparatus of claim 2, wherein the controller is configured to control the position of the RF absorbing body with respect to the shield so as to shield different portions of the RF absorbing body by the shield.

4. The apparatus of claim 2, wherein the shielding comprises a cut-off wave guide.

5. The apparatus of claim 2, wherein the shielding comprises a hollow absorbing body.

6. The apparatus according to claim 1, wherein the heater is configured to heat the RF absorbing body by applying microwave energy.

7. The apparatus according to claim 1, wherein the controller is configured to control a location of the heating zone.

8. The apparatus according to claim 7, wherein the controller is configured to control a shape of the heating zone.

9. The apparatus according to claim 1, wherein the coolant comprises a cooling fluid, which is less susceptible to heat generated by the heater than is a heated portion of the RF absorbing body.

10. The apparatus according to claim 1, wherein the cooler comprises at least one solid block.

11. The apparatus of claim 1, wherein the controller is configured to:
first, reduce electromagnetic heating applied in a first region of the RF absorbing body so that the first region freezes; and then
reduce the electromagnetic heating applied in a second region of the RF absorbing body, so that the second region freezes.

12. The apparatus of claim 11, wherein the first region is adjacent to the second region.

13. The apparatus of claim 12, wherein the controller is configured to reduce the electromagnetic heating applied in the second region responsive to a signal indicative of a temperature in the first region or presence of a frozen aqueous portion in the first region.

14. The apparatus of claim 11, wherein the controller is configured to selectively reduce the electromagnetic heating to move a freezing front created in a border between a region where the electromagnetic heating is reduced and another region where the electromagnetic heating is not reduced.

15. The apparatus of claim 14, wherein the controller is configured to move the freezing front in a rate responsive to a signal indicative of a temperature or presence of one or more frozen aqueous portions in the region where the electromagnetic heating is reduced, the region being at the freezing front or adjacent thereto.

16. The apparatus of claim 1, wherein the controller is configured to control the heater to:

heat with RF energy a heating zone inside the heater; and change a shape of the heating zone.

17. The apparatus of claim 1, wherein the controller is configured to control the heater to:

heat with RF energy a heating zone inside the heater; and move the RF absorbing body in or out of the heating zone.

18. The apparatus of claim 1, wherein the controller is configured to control the heater to:

heat with RF energy a heating zone inside the heater; and change a location of the heating zone.

19. The apparatus according to claim 1, wherein the at least one of the microwave energy and the UHF energy has a frequency of 300 MHz to 3 GHz.

20. The apparatus according to claim 1, wherein the at least one of the microwave energy and the UHF energy has a frequency of 300 MHz or higher.

21. An apparatus for freezing an RF absorbing body, the apparatus comprising:

a cooler, comprising a coolant at a temperature below a freezing point of the RF absorbing body;

a heater, that heats the RF absorbing body in a resonant cavity, the heater comprising:

a solid state amplifier as a source of at least one of microwave energy and UHF energy;

the resonant cavity;

a feed that feeds the resonant cavity with at least a portion of the at least one of the microwave energy and the UHF energy output by the solid state amplifier; and a controller, that controls one or more of the cooler, a position of the RF absorbing body and the heater to heat the RF absorbing body by the at least one of the microwave energy and the UHF energy fed to the resonant cavity through the feed, wherein the controller is configured to control the heater to produce electromagnetic waves having a frequency higher than or equal to a resonant cutoff frequency of the resonant cavity.

22. The apparatus according to claim 21, wherein the controller controls one or more of the cooler, a position of the RF absorbing body and the heater to heat the RF absorbing body to a substantially uniform temperature above the freezing point of the RF absorbing body while maintaining the temperature of the coolant below the freezing point of the RF absorbing body.

23. The apparatus according to claim 21, wherein the at least one of the microwave energy and the UHF energy has a frequency of 300 MHz to 3 GHz.

24. The apparatus according to claim 21, wherein the at least one of the microwave energy and the UHF energy has a frequency of 300 MHz or higher.

* * * * *